US011886129B2

(12) United States Patent
Kakigahara et al.

(10) Patent No.: US 11,886,129 B2
(45) Date of Patent: Jan. 30, 2024

(54) IMAGE FORMING APPARATUS TO WHICH SOLVENT CARTRIDGE THAT CAN ACCOMMODATE THEREIN SOLVENT IS DETACHABLY ATTACHABLE INDEPENDENTLY OF DEVELOPING CARTRIDGE

(71) Applicant: BROTHER KOGYO KABUSHIKI KAISHA, Nagoya (JP)

(72) Inventors: Yutaka Kakigahara, Nagoya (JP); Satoshi Murata, Nagoya (JP); Masataka Kamiya, Owariasahi (JP); Masaaki Furukawa, Nagoya (JP); Yasuo Fukamachi, Nagoya (JP); Kazutoshi Nakamura, Kuwana (JP); Hideshi Nishiyama, Owariasahi (JP); Keita Shimizu, Nagoya (JP); Keita Hironaka, Obu (JP); Mariko Mogi, Nagoya (JP); Naoya Kamimura, Ichinomiya (JP); Kazuma Hinoue, Nagoya (JP); Kouichi Sugimoto, Nagakute (JP); Shinya Kusuda, Nagoya (JP); Shunji Yoshimoto, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/706,861

(22) Filed: Mar. 29, 2022

(65) Prior Publication Data

US 2022/0221811 A1 Jul. 14, 2022

Related U.S. Application Data

(63) Continuation of application No. PCT/JP2020/035454, filed on Sep. 18, 2020.

(30) Foreign Application Priority Data

Sep. 30, 2019 (JP) ................................ 2019-180540

(51) Int. Cl.
*G03G 15/20* (2006.01)
*G03G 21/16* (2006.01)
(Continued)

(52) U.S. Cl.
CPC ..... *G03G 15/0875* (2013.01); *G03G 15/2007* (2013.01); *G03G 15/2096* (2013.01); *G03G 21/1633* (2013.01); *G03G 21/1839* (2013.01)

(58) Field of Classification Search
CPC ........... G03G 15/0875; G03G 15/6582; G03G 21/1839; G03G 15/2096; G03G 15/2003;
(Continued)

(56) References Cited

U.S. PATENT DOCUMENTS 6,941,094 B2 * 9/2005 Omata ............... G03G 21/1647 399/121
2004/0022556 A1 * 2/2004 Nomura ............. G03G 21/1889 399/116
(Continued)

FOREIGN PATENT DOCUMENTS

EP 3 358 424 A1 8/2018
JP 2004-109749 A 4/2004
(Continued)

OTHER PUBLICATIONS

International Search Report issued in PCT/JP2020/035454, dated Nov. 24, 2020.
(Continued)

*Primary Examiner* — Arlene Heredia
*Assistant Examiner* — Laura Roth
(74) *Attorney, Agent, or Firm* — Merchant & Gould P.C.

(57) ABSTRACT

An image forming apparatus includes: a main casing; a photosensitive drum rotatable about an axis extending in a
(Continued)

first direction; a developing cartridge; a transfer unit; a solvent cartridge accommodating solvent for dissolving toner; an applicator applying the solvent to the toner on a sheet; and a cover movable between an open position and a closed position. The developing cartridge and the solvent cartridge are detachably attachable to the main casing independently of each other. The developing cartridge and the solvent cartridge are positioned between the applicator and the cover in a second direction crossing the first direction, and the solvent cartridge is positioned closer to the applicator than the developing cartridge is to the applicator in a state where the developing cartridge and the solvent cartridge are attached to the main casing and the cover is at the closed position.

21 Claims, 38 Drawing Sheets

(51) Int. Cl.
*G03G 15/08* (2006.01)
*G03G 21/18* (2006.01)

(58) Field of Classification Search
CPC ............. G03G 15/2007; G03G 15/201; G03G 21/1633; G03G 2221/169; G03G 21/1685
See application file for complete search history.

(56) References Cited

U.S. PATENT DOCUMENTS

| | | | | |
|---|---|---|---|---|
| 2004/0126160 | A1 | 7/2004 | Keidel et al. | |
| 2007/0122187 | A1* | 5/2007 | Mase | G03G 21/1853 399/111 |
| 2007/0231027 | A1* | 10/2007 | Kamei | G03G 15/2028 399/329 |
| 2009/0022527 | A1 | 1/2009 | Nakamura et al. | |
| 2009/0067868 | A1* | 3/2009 | Arizumi | G03G 15/20 399/340 |
| 2009/0324309 | A1* | 12/2009 | Nakamura | G03G 15/2096 399/340 |
| 2017/0219995 | A1 | 8/2017 | Sato et al. | |
| 2018/0217543 | A1 | 8/2018 | Kakigahara et al. | |

FOREIGN PATENT DOCUMENTS

| | | | |
|---|---|---|---|
| JP | 2004-333866 | A | 11/2004 |
| JP | 2006-78573 | A | 3/2006 |
| JP | 2006-293169 | A | 10/2006 |
| JP | 2009-25540 | A | 2/2009 |
| JP | 2017-138387 | A | 8/2017 |
| WO | 2017/057684 | A1 | 4/2017 |

OTHER PUBLICATIONS

International Preliminary Report on Patentability and Written Opinion of the International Searching Authority issued in corresponding International Patent Application No. PCT/JP2020/035454, dated Apr. 5, 2022.

Extended European Search Report issued in corresponding European Patent Application No. 20872846.9, dated Jun. 30, 2023.

* cited by examiner

IMAGE FORMING APPARATUS TO WHICH SOLVENT CARTRIDGE THAT CAN ACCOMMODATE THEREIN SOLVENT IS DETACHABLY ATTACHABLE INDEPENDENTLY OF DEVELOPING CARTRIDGE

CROSS REFERENCE TO RELATED APPLICATIONS

This is a by-pass continuation application of International Application No. PCT/JP2020/035454 filed Sep. 18, 2020 claiming priority from Japanese Patent Application No. 2019-180540 filed Sep. 30, 2019. The entire contents of the International Application and the priority application are incorporated herein by reference.

BACKGROUND

A conventional image forming apparatus includes a main casing, a photosensitive drum, a developing cartridge, a transfer unit, and an applicator. The developing cartridge supplies toner onto the photosensitive drum. The transfer unit transfers toner that has been supplied onto the photosensitive drum to a sheet. The applicator applies solvent to the toner that has been transferred to the sheet.

SUMMARY

In the conventional image forming apparatus described above, it is desired that a cartridge that can accommodate therein solvent is provided, or solvent is supplied into the main casing.

In view of the foregoing, it is an object of the present disclosure to provide: an image forming apparatus in which a solvent cartridge that can accommodate therein solvent can be replaced independently of a developing cartridge; an image forming apparatus in which solvent can be supplied into a main casing; a drum cartridge that can accommodate therein solvent; and a developing cartridge that can accommodate therein solvent.

In order to attain the above and other objects, according to one aspect, the present disclosure provides an image forming apparatus including: a main casing; a photosensitive drum; a developing cartridge; a transfer unit for transferring the toner that has been supplied onto the photosensitive drum to a sheet; a solvent cartridge; and an applicator. The photosensitive drum is rotatable about a drum axis extending in a first direction. The developing cartridge includes a toner casing that can accommodate therein toner. The developing cartridge supplies the toner onto the photosensitive drum. The developing cartridge is detachably attachable to the main casing. The solvent cartridge includes a solvent casing that can accommodate therein solvent for dissolving the toner. The solvent cartridge is detachably attachable to the main casing independently of the developing cartridge. The applicator applies the solvent to the toner that has been transferred to the sheet. The applicator is positioned at one end portion of the main casing in a second direction crossing the first direction. The main casing has an opening through which the developing cartridge and the solvent cartridge pass when the developing cartridge and the solvent cartridge are attached to the main casing, the opening being positioned at another end portion in the second direction of the main casing. The image forming apparatus further includes a cover positioned at the another end portion in the second direction of the main casing. The cover is movable between: a closed position where the cover closes the opening; and an open position where the opening is opened. The developing cartridge and the solvent cartridge are positioned between the applicator and the cover in the second direction, and the solvent cartridge is positioned closer to the applicator than the developing cartridge is to the applicator in a state where the developing cartridge and the solvent cartridge are attached to the main casing and the cover is at the closed position.

With this image forming apparatus, the solvent cartridge that can accommodate therein solvent can be replaced independently of the developing cartridge.

According to another aspect, the present disclosure also provides an image forming apparatus including: a main casing; a photosensitive drum; a developing cartridge; a transfer unit for transferring the toner that has been supplied onto the photosensitive drum to a sheet; a solvent cartridge; and an applicator. The photosensitive drum is rotatable about a drum axis extending in a first direction. The developing cartridge includes a toner casing that can accommodate therein toner. The developing cartridge supplies the toner onto the photosensitive drum. The developing cartridge is detachably attachable to the main casing. The solvent cartridge includes a solvent casing that can accommodate therein solvent for dissolving the toner. The solvent cartridge is detachably attachable to the main casing independently of the developing cartridge. The applicator applies the solvent to the toner that has been transferred to the sheet. The applicator is positioned at one end portion of the main casing in a second direction crossing the first direction. The main casing has an opening through which the developing cartridge and the solvent cartridge pass when the developing cartridge and the solvent cartridge are attached to the main casing. The opening is positioned above the developing cartridge and the solvent cartridge in a state where the developing cartridge and the solvent cartridge are attached to the main casing. The image forming apparatus further includes a cover positioned above the developing cartridge and the solvent cartridge in a state where the developing cartridge and the solvent cartridge are attached to the main casing. The cover is pivotally movable about a cover axis extending in the first direction. The cover is movable between: a closed position where the cover closes the opening; and an open position where the opening is opened. The solvent cartridge is positioned closer to the applicator than the developing cartridge is to the applicator in a state where the developing cartridge and the solvent cartridge are attached to the main casing and the cover is at the closed position.

Even with this image forming apparatus, the technical advantages described above can be exhibited.

According to still another aspect, the present disclosure also provides an image forming apparatus including: a main casing; a photosensitive drum; a developing cartridge; a transfer unit for transferring the toner that has been supplied onto the photosensitive drum to a sheet; and an applicator. The photosensitive drum is rotatable about a drum axis extending in a first direction. The developing cartridge includes a toner casing that can accommodate therein toner. The developing cartridge supplies the toner onto the photosensitive drum. The developing cartridge is detachably attachable to the main casing. The applicator applies solvent for dissolving toner to the toner that has been transferred to the sheet. The main casing has an inlet port allowing the solvent in a solvent cartridge to enter the main casing therethrough in a state where the solvent cartridge is connected to the main casing. The inlet port is positioned on an outer surface of the main casing.

With the image forming apparatus, solvent can be supplied to the main casing through the inlet port formed on the main casing. As a result, the solvent can be supplied to the applicator. This configuration can make the image forming apparatus compact in comparison with a case where a solvent cartridge is accommodated in the main casing.

BRIEF DESCRIPTION OF THE DRAWINGS

The particular features and advantages of the embodiment(s) as well as other objects will become apparent from the following description taken in connection with the accompanying drawings, in which.

DETAILED DESCRIPTION

First Embodiment

Figure 1:
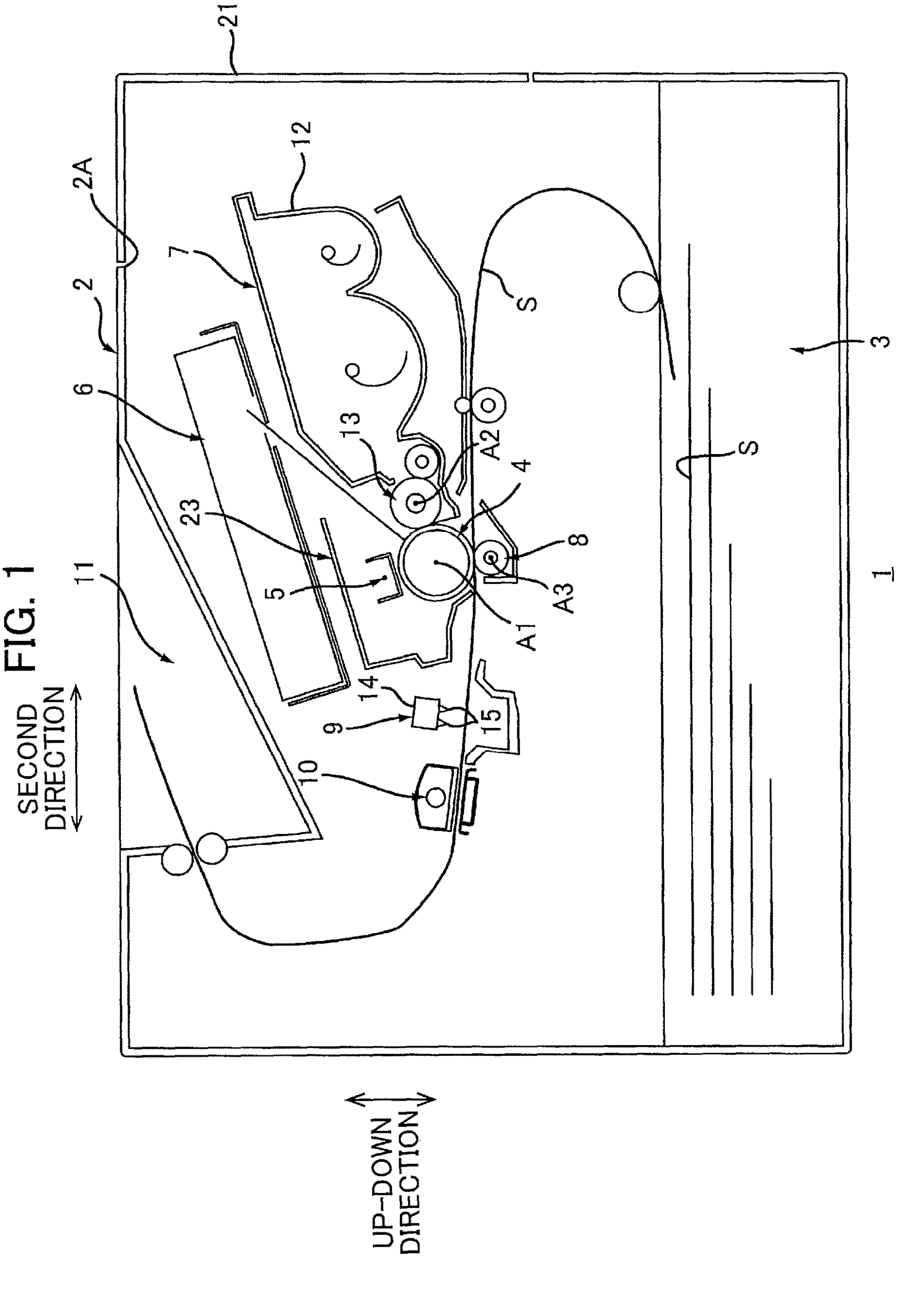
FIG. 1 is a schematic diagram illustrating a configuration of an image forming apparatus.

1. Overview of Image Forming Apparatus 1

An overview of an image forming apparatus 1 will be described with reference to FIG. 1.

The image forming apparatus 1 includes a main casing 2, a sheet cassette 3, a photosensitive drum 4, a charging unit 5, an exposure unit 6, a developing cartridge 7, a transfer unit 8, an applicator 9, a heater 10, and a discharge tray 11.

1.1 Main Casing 2

The main casing 2 accommodates therein the sheet cassette 3, the photosensitive drum 4, the charging unit 5, the exposure unit 6, the developing cartridge 7, the transfer unit 8, the applicator 9, and the heater 10.

1.2 Sheet Cassette 3

The sheet cassette 3 can accommodate therein a sheet(s) S. The sheet S is, for example, a printing paper. The sheet(s) S accommodated in the sheet cassette 3 is transferred toward the photosensitive drum 4.

1.3 Photosensitive Drum 4

The photosensitive drum 4 is rotatable about a drum axis A1. The drum axis A1 extends in a first direction. The photosensitive drum 4 extends in the first direction. The photosensitive drum 4 has a hollow cylindrical shape.

1.4 Charging Unit 5

The charging unit 5 can charge a surface of the photosensitive drum 4. Specifically, the charging unit 5 is a scorotron charger. However, a charge roller may be employed as the charging unit 5.

1.5 Exposure Unit 6

The exposure unit 6 can expose the surface of the photosensitive drum 4 to light. The exposure unit 6 exposes the surface of the photosensitive drum 4 to light in a state where the surface of the photosensitive drum 4 is charged by the charging unit 5, whereby an electrostatic latent image is formed on the surface of the photosensitive drum 4. Specifically, the exposure unit 6 is a laser scan unit. note that an LED array may be used as the exposure unit 6.

1.6 Developing Cartridge 7

The developing cartridge 7 is attachable to the main casing 2. In other words, the developing cartridge 7 is attachable to the image forming apparatus 1. The developing cartridge 7 supplies toner to the photosensitive drum 4. Specifically, the developing cartridge 7 includes a toner casing 12, and a developing roller 13.

1.6.1 Toner Casing 12

The toner casing 12 can accommodate therein toner. In other words, the developing cartridge 7 can accommodate therein toner. The toner includes toner particles, and as needed, may contain external additive as needed. The toner particles contain binder resin, and may contain colorant, pigment dispersant, parting agent, magnetic material, and electrification control agent. The binder resin is a base of the toner particles. The binder resin binds together components contained in the toner particles. The colorant colors the toner particles with a desired color. The colorant is dispersed in the binder resin. The pigment dispersant improves dispersibility of the colorant. The electrification control agent provides electrostatic property to the toner particles. The electrostatic property may be either positive electrification or negative electrification. The external additive adjusts the electrostatic property, fluidity, and preservation stability of the toner particles.

1.6.2 Developing Roller 13

The developing roller 13 can supply toner accommodated in the toner casing 12 to the surface of the photosensitive drum 4. The developing roller 13 makes contact with the photosensitive drum 4. Note that the developing roller 13 may not make contact with the photosensitive drum 4. The developing roller 13 extends in the first direction. The developing roller 13 has a solid cylindrical shape. The developing roller 13 is rotatable about a developing axis A2. The developing axis A2 extends in the first direction.

1.7 Transfer Unit 8

The transfer unit 8 transfers the toner that has been supplied onto the photosensitive drum 4 to the sheet S. The transfer unit 8 makes contact with the photosensitive drum 4. Note that the transfer unit 8 may not make contact with the photosensitive drum 4. Specifically, the transfer unit 8 is a transfer roller. The transfer roller extends in the first direction. The transfer roller has a solid cylindrical shape. The transfer roller is rotatable about a transfer axis A3. The transfer axis A3 extends in the first direction. The transfer unit 8 may be a transfer belt instead.

1.8 Applicator 9

The applicator 9 applies solvent to the toner that has been transferred to the sheet S in a state where the developing cartridge 7 is attached to the main casing 2. The solvent can dissolve the toner. Specifically, the solvent can dissolve the binder resin in the toner. The solvent is, for example, Aliphatic monocarboxylate, aliphatic dicarboxylate, carbonic ester, and the like.

The applicator 9 is a spraying device of an electrostatic spraying type. The applicator 9 applies solvent to the toner by electrostatically spraying the solvent on the toner on the sheet S. Specifically, the applicator 9 includes an applicator casing 14, and a plurality of nozzles 15. The applicator casing 14 can accommodate therein the solvent. The plurality of nozzles 15 extends downward from the applicator casing 14. The solvent accommodated in the applicator casing 14 is sprayed through the plurality of nozzles 15. Note that the applicator 9 may a device of an inkjet type to apply solvent to the toner. Alternatively, the applicator 9 may apply solvent to the toner using a roller.

1.9 Heater 10

The heater 10 heats the sheet S that has moved past the applicator 9. That is, the heater 10 heats the sheet S to which the solvent has been applied by the applicator 9. Chemical reaction between the toner and the solvent applied to the toner is facilitated by the heat applied from the heater 10. Hence, a time period required for solidifying the toner to which the solvent has been applied and fixing the toner to the sheet can be reduced.

1.10 Discharge Tray 11

The discharge tray 11 is positioned on an upper surface of the main casing 2. In a state where the developing cartridge 7 is attached to the main casing 2, the discharge tray 11 is positioned above the developing cartridge 7. The sheet S that has moved past the heater 10 is discharged onto the discharge tray 11. In other words, the sheet S that has moved past the applicator 9 is discharged onto the discharge tray 11.

2. Details of Image Forming Apparatus 1

Next, details of the image forming apparatus 1 will be described with reference to FIGS. 1 through 7.

The image forming apparatus 1 further includes a first cover 21 (see FIG. 2), a second cover 22 (see FIG. 2), a drum cartridge 23 (see FIG. 1), a solvent cartridge 24 (see FIG. 2) a supply pipe 25 (see FIG. 5), a pump 26 (see FIG. 5), a first circuit board 27 (see FIG. 7), a second circuit board 28 (see FIG. 7), and an operation panel 29 (see FIG. 2) in addition to the main casing (see FIG. 2) described above.

2.1 Details of Main Casing 2

Figure 2:
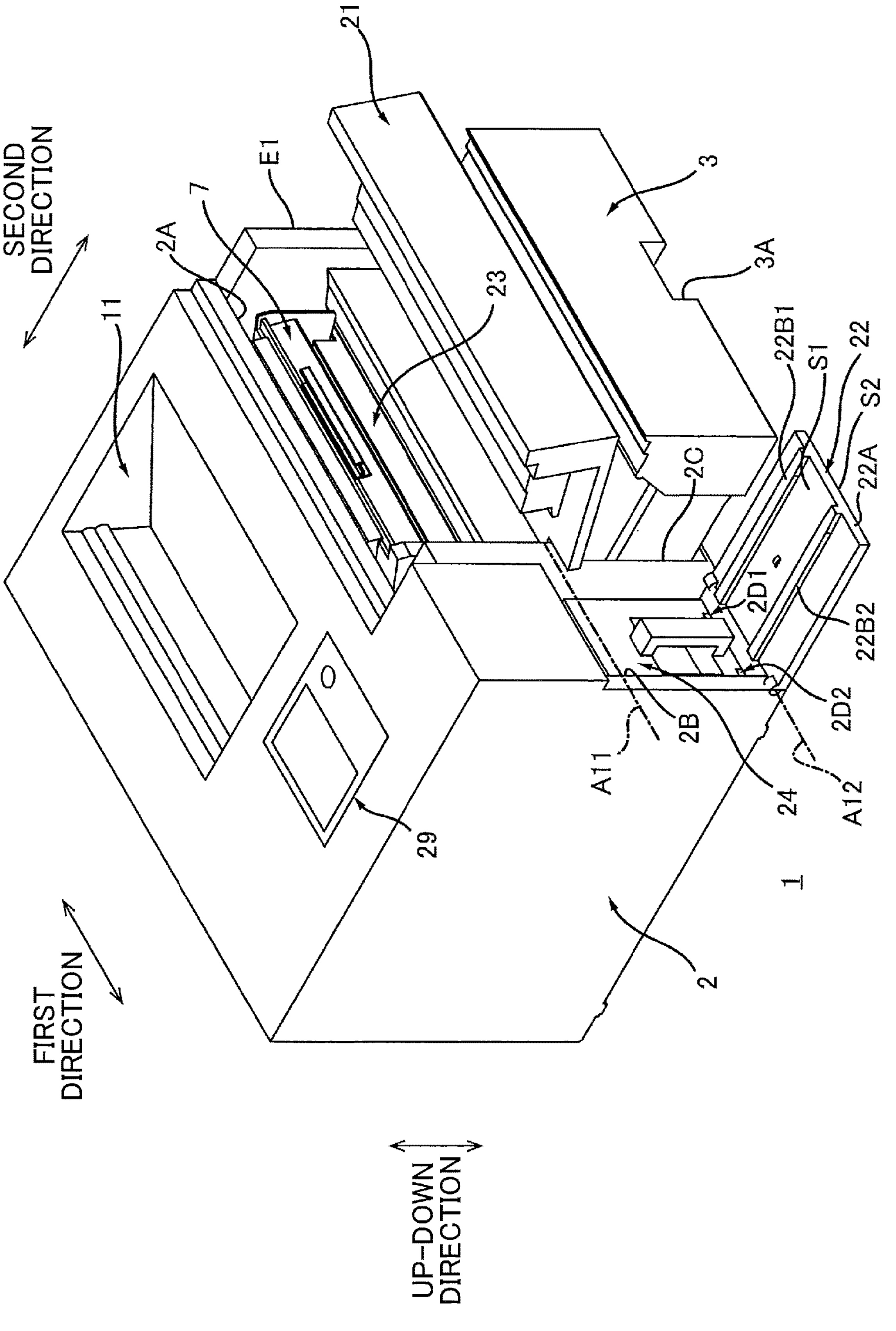
FIG. 2 is a perspective view of the image forming apparatus.
Figure 3:
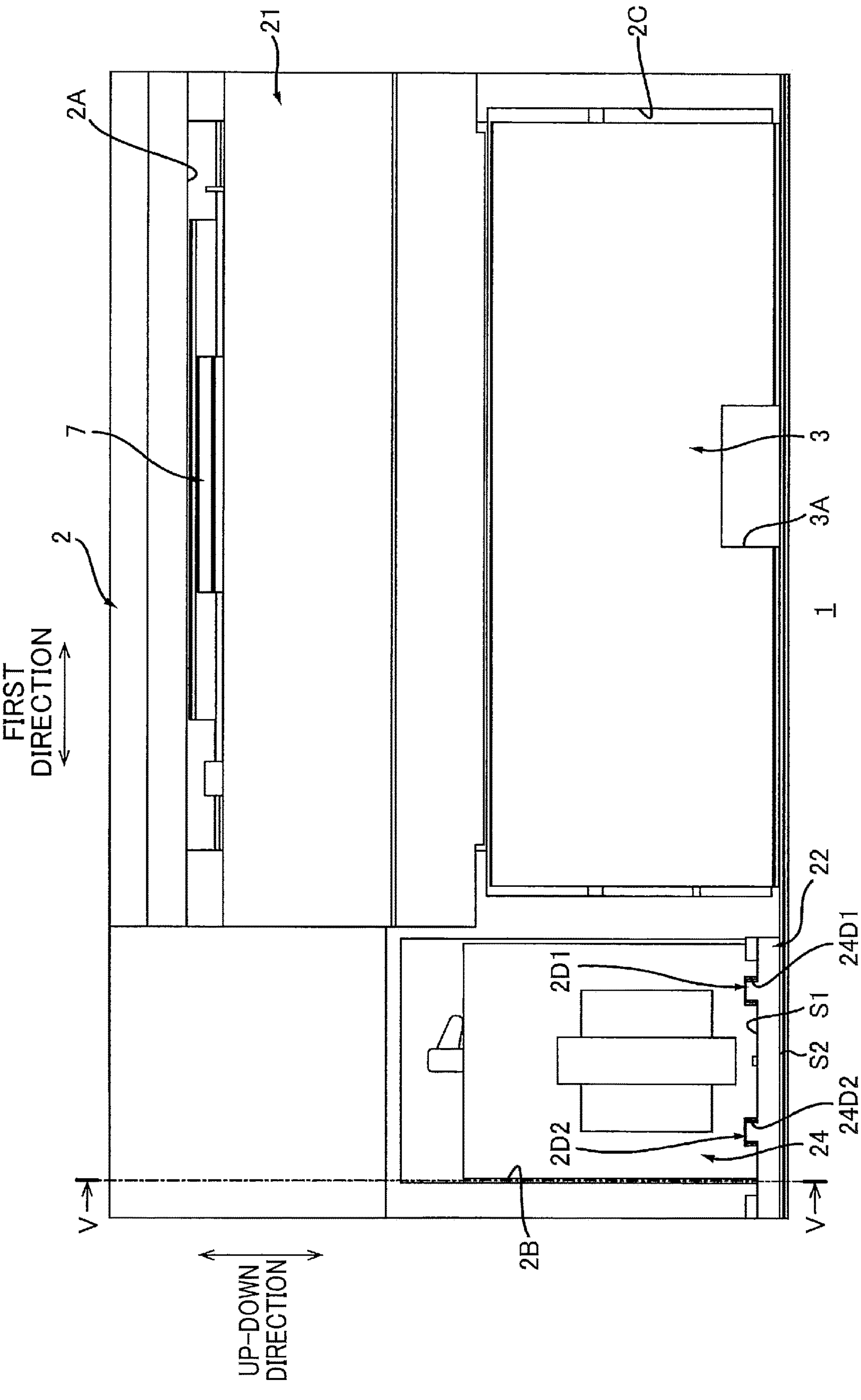
FIG. 3 is a front view of the image forming apparatus illustrated in FIG. 2.

As illustrated in FIGS. 2 and 3, the main casing 2 has a first opening 2A, a second opening 2B, and a third opening 2C. The main casing 2 includes a guide 2D1, and a guide 2D2.

2.1.1 First Opening 2A

The first opening 2A is positioned at one end portion E1 in a second direction of the main casing 2. The second direction crosses the first direction. The developing cartridge 7 passes through the first opening 2A when the developing cartridge 7 is attached to the main casing 2. Further, the drum cartridge 23 is also attachable to the main casing 2 through the first opening 2A. The developing cartridge 7 and the drum cartridge 23 are attachable to the main casing 2 in the second direction. Note that the developing cartridge 7 and the drum cartridge 23 those attached to the main casing 2 are detachable from the main casing 2 through the first opening 2A.

2.1.2 Second Opening 2B

The second opening 2B is positioned at the one end portion E1 in the second direction of the main casing 2. The second opening 2B is positioned to be spaced apart from the first opening 2A in the first direction. The solvent cartridge 24 passes through the second opening 2B when the solvent cartridge 24 is attached to the main casing 2. That is, the drum cartridge 23 and the developing cartridge 7 are attachable to the main casing 2 through the first opening 2A whereas the solvent cartridge 24 is attachable to the main casing 2 through the second opening 2B positioned away from the first opening 2A. Accordingly, the solvent cartridge 24 is attachable to the main casing 2 independently of the drum cartridge 23 and the developing cartridge 7. In other words, the drum cartridge 23 is attachable to the main casing 2 independently of the solvent cartridge 24. The solvent cartridge 24 is attachable to the main casing 2 in the second direction. Further, the solvent cartridge 24 attached to the main casing 2 is detachable from the main casing 2 through the second opening 2B.

2.1.3 Third Opening 2C

The third opening 2C is positioned at the one end portion E1 in the second direction of the main casing 2. The sheet cassette 3 is attachable to the main casing 2 through the third opening 2C. The sheet cassette 3 is attachable to the main casing 2 in the second direction. Note that the sheet cassette 3 attached to the main casing 2 is detachable from the main casing 2 through the third opening 2C.

The third opening 2C is positioned to be spaced apart from the second opening 2B in the first direction. Hence, the sheet cassette 3 is attachable to the main casing 2 independently of the solvent cartridge 24. In other words, the solvent cartridge 24 is attachable to the main casing 2 independently of the sheet cassette 3.

Further, the third opening 2C is positioned downward of the first opening 2A. Hence, the sheet cassette 3 is positioned below the developing cartridge 7 in a state where the sheet cassette 3 is attached to the main casing 2.

The sheet cassette 3 includes a sheet handle 3A. In a state where the sheet cassette 3 is attached to the main casing 2, the sheet handle 3A is positioned at the one end portion E1 in the second direction of the main casing 2.

2.1.4 Guide 2D1 and Guide 2D2

Figure 4:
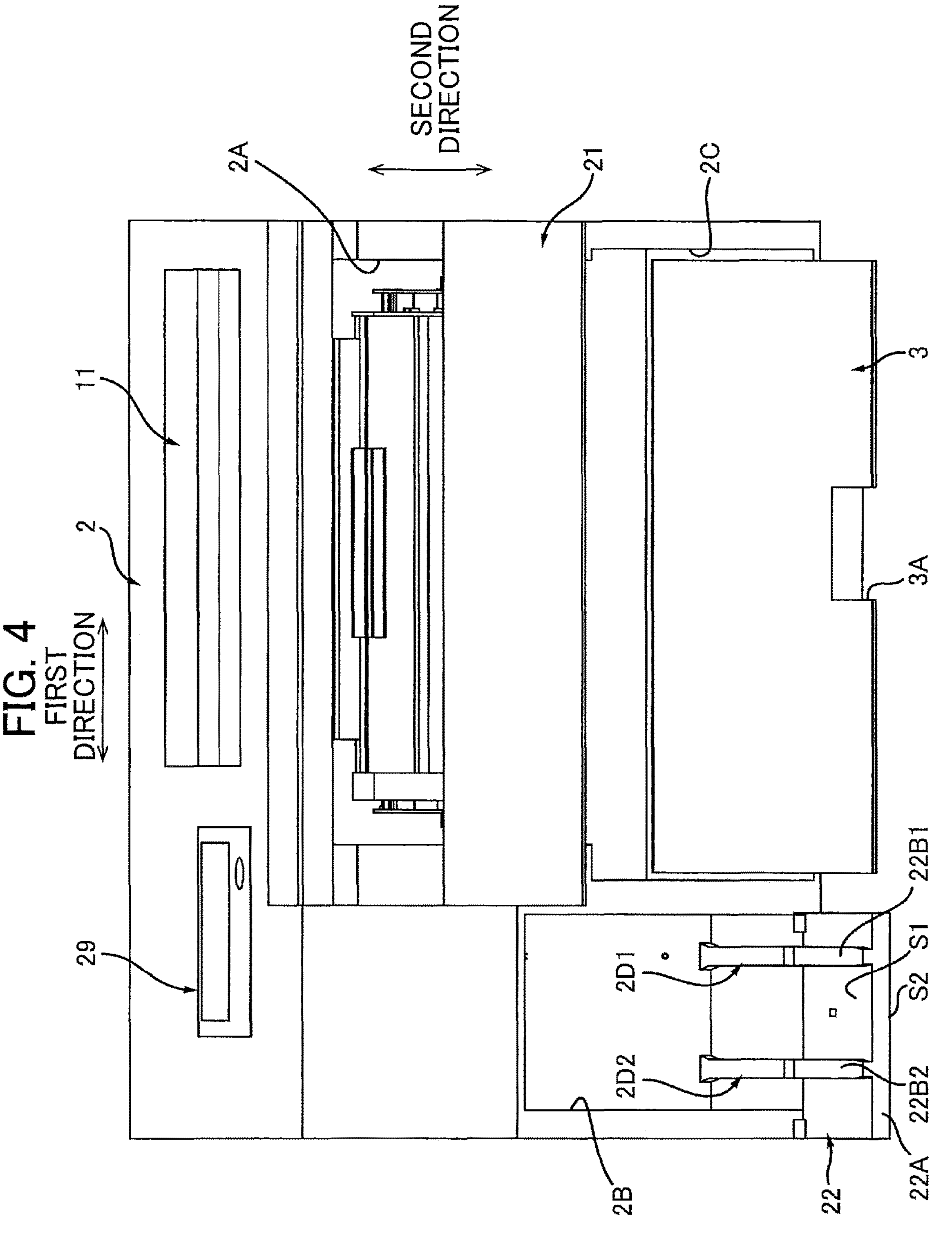
FIG. 4 is a perspective view of the image forming apparatus illustrated in FIG. 2 as viewed from an angle different from that in FIG. 2, and illustrating a state where a solvent cartridge is detached from a main casing.

As illustrated in FIG. 4, the guide 2D1 is positioned inside the second opening 2B. The guide 2D1 guides the solvent cartridge 24 (see FIG. 2) when the solvent cartridge 24 is attached to the main casing 2. The guide 2D1 extends in the second direction. The guide 2D1 is a rib protruding in an up-down direction.

The guide 2D2 is positioned inside the second opening 2B. The guide 2D2 is positioned to be spaced apart from the guide 2D1 in the first direction. The guide 2D2 guides the solvent cartridge 24 (see FIG. 2) when the solvent cartridge 24 is attached to the main casing 2. The guide 2D2 extends in the second direction. The guide 2D2 is a rib protruding in the up-down direction.

2.2 First Cover 21

As illustrated in FIG. 2, the first cover 21 is positioned at the one end portion E1 in the second direction of the main casing 2. The first cover 21 is movable between a first closed position (see FIG. 1) and a first open position (see FIG. 2). The first cover 21 is pivotally movable about a first cover axis A11. The first cover axis A11 extends in the first direction.

As illustrated in FIG. 1, in a state where the first cover 21 is at the first closed position, the first cover 21 extends in the up-down direction. The first cover 21 closes the first opening 2A in a state where the first cover 21 is at the first closed position.

On the other hand, in a state where the first cover 21 is at the first open position, the first cover 21 extends in the second direction as illustrated in FIG. 2. The first opening 2A is opened in a state where the first cover 21 is at the first open position.

2.3 Second Cover 22

The second cover 22 is positioned at the one end portion E1 in the second direction of the main casing 2. The second cover 22 is provided independently of the first cover 21.

The second cover 22 is movable between a second closed position (see FIG. 5) and a second open position (see FIG. 2). The second cover 22 closes the second opening 2B in a state where the second cover 22 is at the second closed position. The second opening 2B is opened in a state where the second cover 22 is at the second open position.

The second cover 22 is pivotally movable about a second cover axis A12. The second cover axis A12 extends in the first direction. The second cover axis A12 is positioned away from the first cover axis A11. The second cover axis A12 is positioned downward of the first cover axis A11. The second cover 22 includes a cover body 22A, a guide 22B1, and a guide 22B2.

2.3.1 Cover Body 22A

Figure 5:
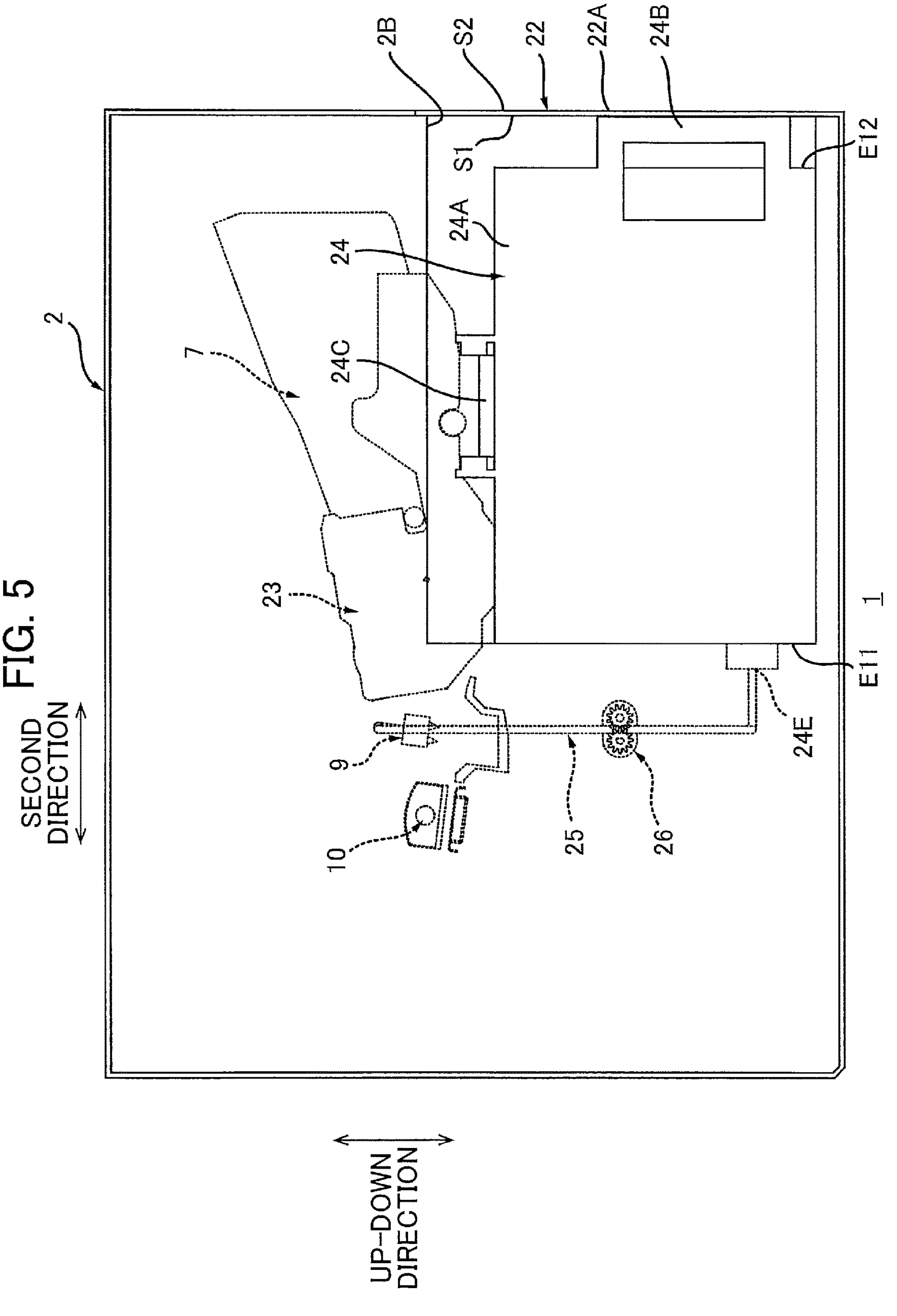
FIG. 5 is a cross-sectional view taken along a line V-V in FIG. 3.

As illustrated in FIG. 5, the cover body 22A extends in the up-down direction in a state where the second cover 22 is at the second closed position. The cover body 22A closes the second opening 2B when the second cover 22 is at the second closed position.

On the other hand, as illustrated in FIG. 2, the cover body 22A extends in the second direction in a state where the cover body 22A is at the second open position. The cover body 22A has a flat plate-like shape. The cover body 22A has a first surface S1, and a second surface S2.

In a state where the solvent cartridge 24 is attached to the main casing 2 and the second cover 22 is at the second closed position, the first surface S1 makes contact with the solvent cartridge 24 as illustrated in FIG. 5. In other words, the second cover 22 makes contact with the solvent cartridge 24 in a state where the solvent cartridge 24 is attached to the main casing 2 and the second cover 22 is at the second closed position. Specifically, the second cover 22 makes contact with a first handle 24B (described later) in a state where the solvent cartridge 24 is attached to the main casing 2 and the second cover 22 is at the second closed position.

In a state where the solvent cartridge 24 is attached to the main casing 2 and the second cover 22 is at the second closed position, the second surface S2 is positioned on the opposite side of the first surface S1 from the solvent cartridge 24.

2.3.2 Guide 22B1 and Guide 22B2

As illustrated in FIG. 2, the guide 22B1 is positioned on the first surface S1 of the second cover 22. The guide 22B1 guides the solvent cartridge 24 in cooperation with the guide 2D1 of the main casing 2 when the solvent cartridge 24 is attached to the main casing 2 while the second cover 22 is at the second open position. The guide 22B1 is in line with the guide 2D1 in the second direction when the solvent cartridge 24 is attached to the main casing 2 while the second cover 22 is at the second open position. The guide 22B1 extends in the second direction. The guide 22B1 is a rib extending in the up-down direction.

The guide 22B2 is positioned on the first surface S1 of the second cover 22. The guide 22B2 is spaced apart from the guide 22B1 in the first direction. The guide 22B2 guides the solvent cartridge 24 in cooperation with the guide 2D2 of the main casing 2 when the solvent cartridge 24 is attached to the main casing 2 while the second cover 22 is at the second open position. The guide 22B2 is in line with the guide 2D2 in the second direction when the solvent cartridge 24 is attached to the main casing 2 while the second cover 22 is at the second open position. The guide 22B2 extends in the second direction. The guide 22B2 is a rib protruding in the up-down direction.

2.4 Drum Cartridge 23

As illustrated in FIG. 1, the drum cartridge 23 is attachable to the main casing 2. In other words, the drum cartridge 23 is attachable to the image forming apparatus 1. The drum cartridge 23 includes the photosensitive drum 4, the charging unit 5, and the transfer unit 8. Note that the main casing 2 may include the transfer unit 8.

Further, the developing cartridge 7 is detachably attachable to the drum cartridge 23. The developing cartridge 7 is attachable to the main casing 2 in a state where the developing cartridge 7 is attached to the drum cartridge 23.

2.5 Solvent Cartridge 24

As illustrated in FIGS. 2 and 3, the solvent cartridge 24 is positioned away from the developing cartridge 7 in the first direction in a state where the developing cartridge 7 and the solvent cartridge 24 are attached to the main casing 2. With this positional relationship, increasing in size of the image forming apparatus 1 in the up-down direction can be restrained.

Further, the solvent cartridge 24 is positioned away from the sheet cassette 3 in the first direction in a state where the solvent cartridge 24 and the sheet cassette 3 are attached to the main casing 2. The solvent cartridge 24 and the sheet cassette 3 are arranged in the first direction in a state where the solvent cartridge 24 and the sheet cassette 3 are attached to the main casing 2.

Further, as illustrated in FIG. 5, the solvent cartridge 24 is positioned downward of the applicator 9 in a state where the solvent cartridge 24 is attached to the main casing 2.

Figure 6A:
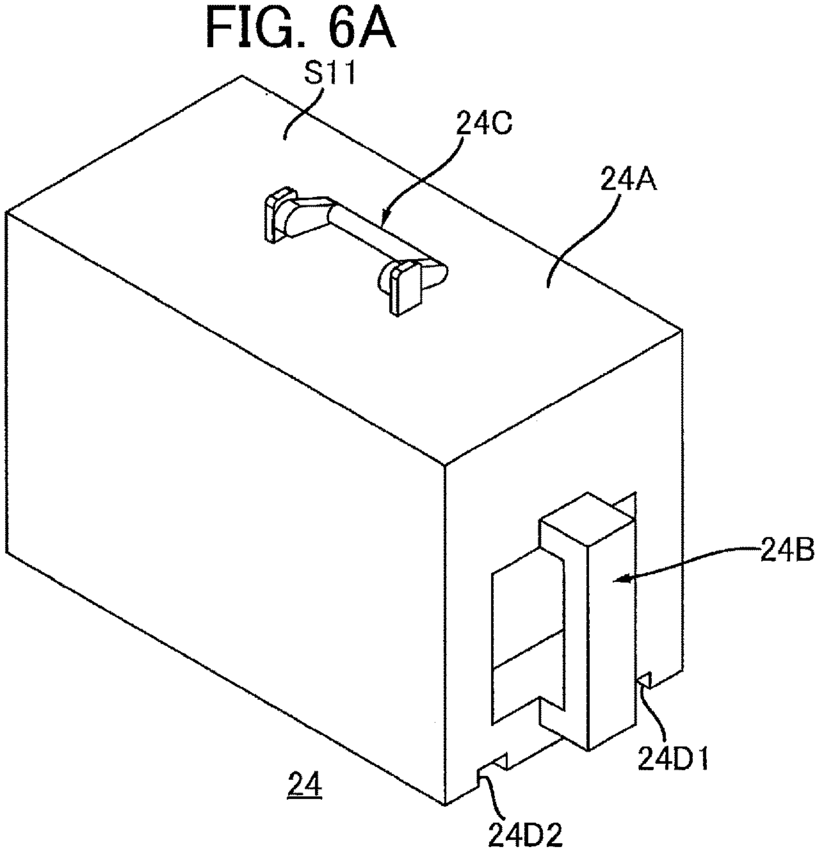
FIG. 6A is a perspective view of the solvent cartridge.
Figure 6B:
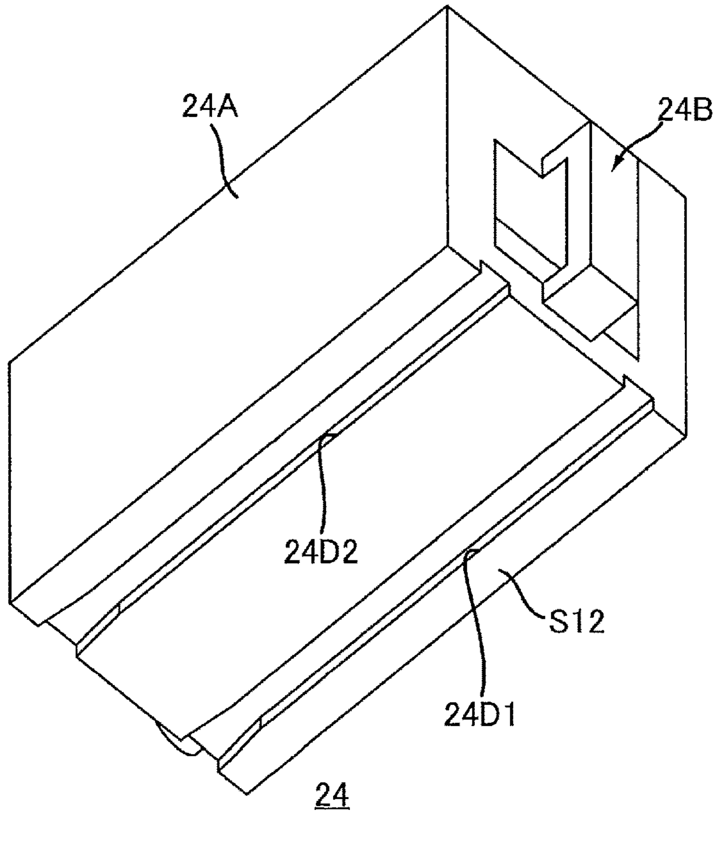
FIG. 6B is another perspective view of the solvent cartridge as viewed from an angle different from that in FIG. 6A.

As illustrated in FIGS. 6A and 6B, the solvent cartridge 24 includes a solvent casing 24A, the first handle 24B, a second handle 24C, a cartridge guide 24D1, and a cartridge guide 24D2.

2.5.1 Solvent Casing 24A

The solvent casing 24A can accommodate therein solvent. In other words, the solvent cartridge 24 can accommodate therein solvent. The solvent dissolves toner.

As illustrated in FIG. 5, in a state where the solvent cartridge 24 is attached to the main casing 2, the solvent casing 24A extends in the second direction. The solvent casing 24A has a discharge opening 24E.

The discharge opening 24E allows the solvent to be discharged therethrough from the solvent casing 24A to the supply pipe 25. The discharge opening 24E is positioned at one end portion E11 in the second direction of the solvent casing 24A.

2.5.2 First Handle 24B

The first handle 24B is positioned at another end portion E12 in the second direction of the solvent casing 24A in a state where the solvent cartridge 24 is attached to the main casing 2. The first handle 24B is positioned closer to the second cover 22 than the discharge opening 24E is to the second cover 22 in the second direction in a state where the solvent cartridge 24 is attached to the main casing 2. In other words, in a state where the solvent cartridge 24 is attached to the main casing 2, the first handle 24B is positioned between the discharge opening 24E and the second cover 22 in the second direction. A user moves the solvent cartridge 24 in the second direction during attachment of the solvent cartridge 24 to the main casing 2 and detachment of the solvent cartridge 24 from the main casing 2. At this time, the first handle 24B is grasped by the user.

2.5.3 Second Handle 24C

As illustrated in FIG. 6A, the second handle 24C is positioned on an upper surface S11 of the solvent casing 24A. The second handle 24C is grasped by the user when the user carries the solvent cartridge 24 that has been detached from the main casing 2.

2.5.4 Cartridge Guide 24D1 and Cartridge Guide 24D2

As illustrated in FIG. 6B, the cartridge guide 24D1 is positioned on a lower surface S12 of the solvent casing 24A. The cartridge guide 24D1 is in a form of a groove. When the solvent cartridge 24 is attached to the main casing 2 while the second cover 22 is at the second open position, the guide 22B1 (see FIG. 4) of the second cover 22 and the guide 2D1 (see FIG. 4) of the main casing 2 are fitted into the cartridge guide 24D1. The cartridge guide 24D1 is guided by the guide 22B1 and the guide 2D1. Hence, the solvent cartridge 24 is guided by the guide 22B1 and the guide 2D1 in the second direction.

The cartridge guide 24D2 is positioned on the lower surface S12 of the solvent casing 24A. The cartridge guide 24D2 is spaced apart from the cartridge guide 24D1 in the first direction. The cartridge guide 24D2 is in a form of a groove. When the solvent cartridge 24 is attached to the main casing 2 while the second cover 22 is at the second open position, the guide 22B2 (see FIG. 4) of the second cover 22 and the guide 2D2 (see FIG. 4) of the main casing 2 are fitted into the cartridge guide 24D2. The cartridge guide 24D2 is guided by the guide 22B2 and the guide 2D2. Accordingly, the solvent cartridge 24 is guided by the guide 22B2 and the guide 2D2 in the second direction.

2.6 Supply Pipe 25

Figure 7:
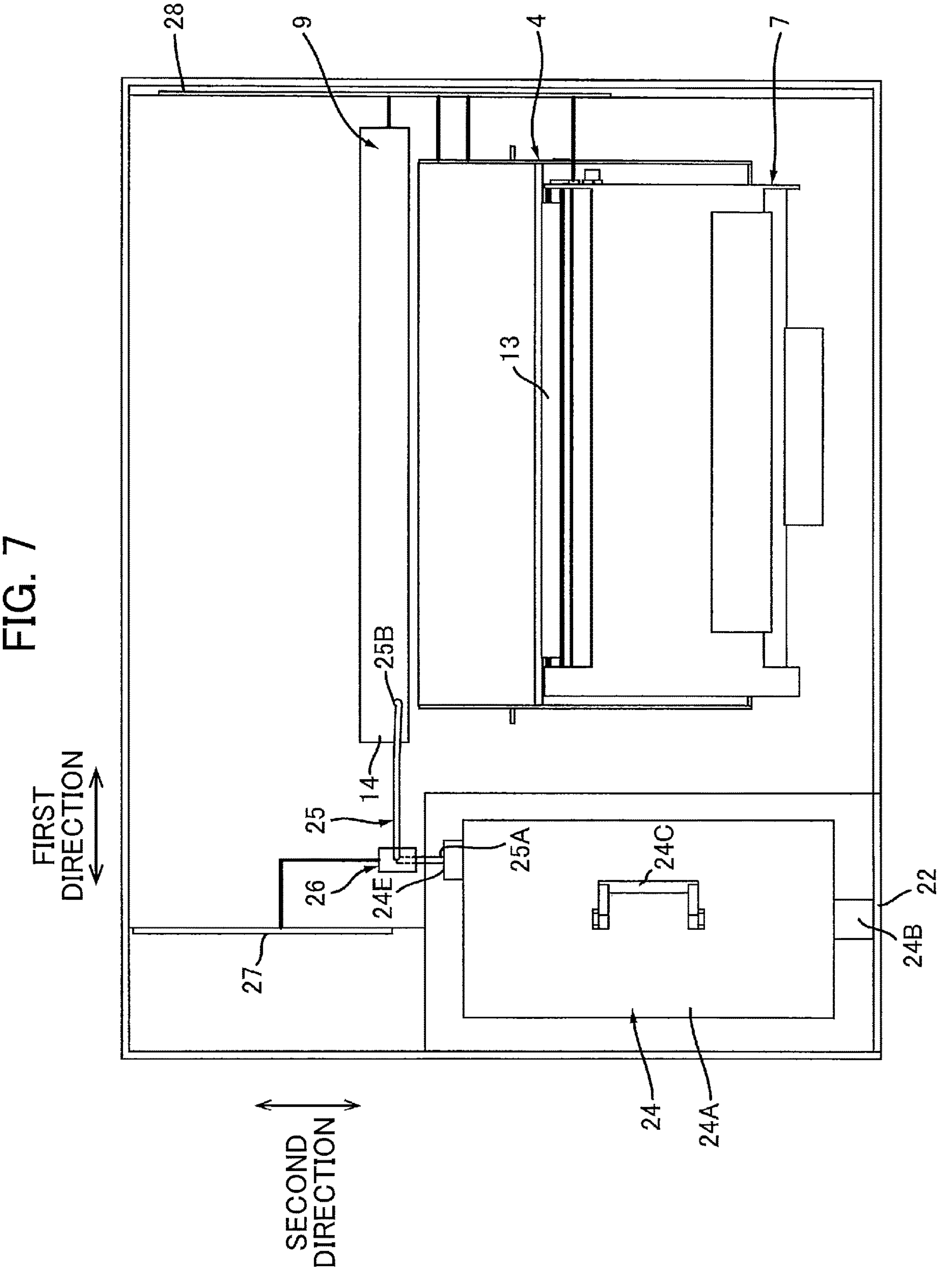
FIG. 7 is an explanatory view of a positional relationship among a developing cartridge, the solvent cartridge, a first circuit board, and a second circuit board.

As illustrated in FIGS. 5 and 7, the supply pipe 25 supplies solvent to the applicator 9. The supply pipe 25 has one end portion 25A, and another end portion 25B. The one end portion 25A is connected to the discharge opening 24E of the solvent cartridge 24 in a state where the solvent cartridge 24 is attached to the main casing 2. The other end portion 25B is positioned away from the one end portion 25A. The other end portion 25B is connected to the applicator casing 14 of the applicator 9.

2.7 Pump 26

As illustrated in FIG. 5, the pump 26 is positioned between the one end portion 25A and the other end portion 25B of the supply pipe 25. The pump 26 pumps the solvent from the solvent cartridge 24 to the applicator 9. When the pump 26 is driven in a state where the solvent cartridge 24 is attached to the main casing 2, the solvent accommodated in the solvent cartridge 24 is introduced into the applicator casing 14 of the applicator 9 through the discharge opening 24E and the supply pipe 25. Specifically, the pump 26 is a gear pump.

2.8 First Circuit Board 27

As illustrated in FIG. 7, the first circuit board 27 and the solvent cartridge 24 are arranged in the second direction in a state where the solvent cartridge 24 is attached to the main casing 2. The first circuit board 27 is positioned on the opposite side of the solvent cartridge 24 from the second cover 22 in the second direction in a state where the solvent cartridge 24 is attached to the main casing 2. The first circuit board 27 is electrically connected to the pump 26. Specifically, the first circuit board 27 is a control circuit board. The first circuit board 27 controls the pump 26.

2.9 Second Circuit Board 28

The second circuit board 28 is positioned away from the first circuit board 27 in the first direction. The second circuit board 28 is positioned on the opposite side of the developing cartridge 7 from the first circuit board 27 in the first direction in a state where the developing cartridge 7 is attached to the main casing 2. In other words, the developing cartridge 7 is positioned between the first circuit board 27 and the second circuit board 28 in the first direction. The second circuit board 28 is electrically connected to the charging unit 5 and the transfer unit 8. The second circuit board 28 applies a voltage to the charging unit 5 and the transfer unit 8. Further, the second circuit board 28 is electrically connected to the applicator 9. The second circuit board 28 supplies electric power to the applicator 9. Further, the second circuit board 28 is electrically connected to the developing cartridge 7. The second circuit board 28 applies a voltage to the developing cartridge 7. The second circuit board 28 is electrically connected to the developing roller 13. The second circuit board 28 applies a voltage to the developing roller 13.

2.10 Operation Panel 29

As illustrated in FIG. 2, the operation panel 29 is positioned on the upper surface of the main casing 2. The operation panel 29 is positioned away from the discharge tray 11 in the first direction. The operation panel 29 is positioned above the solvent cartridge 24 in a state where the solvent cartridge 24 is attached to the main casing 2. The operation panel 29 is electrically connected to the first circuit board 27. The operation panel 29 is operated by the user.

3. Functions and Effects (1) According to the image forming apparatus 1, the solvent cartridge that can accommodate therein solvent can be replaced independently of the developing cartridge, as illustrated in FIG. 2.

Further, in a state where the developing cartridge 7 and the solvent cartridge 24 are attached to the main casing 2, the solvent cartridge 24 is positioned away from the developing cartridge 7 in the first direction.

Accordingly, increasing in size of the image forming apparatus 1 in a direction crossing the first direction can be suppressed.

For example, increasing in size of the image forming apparatus 1 in the up-down direction can be restrained in comparison with a configuration in which the developing cartridge 7 and the solvent cartridge 24 are arranged in the up-down direction in a state where the developing cartridge 7 and the solvent cartridge 24 are attached to the main casing 2.

(2) According to the image forming apparatus 1, the first opening 2A and the second opening 2B are positioned at the one end portion E1 in the second direction of the main casing 2, as illustrated in FIG. 2. The developing cartridge 7 is attachable to the main casing 2 through the first opening 2A in the second direction. The solvent cartridge 24 is attachable to the main casing 2 through the second opening 2B in the second direction.

With this configuration, replacement of the developing cartridge 7 and the solvent cartridge 24 can be performed at one side in the second direction of the main casing 2. In other words, the replacement of the solvent cartridge 24 can be performed at the one side of the main casing 2 which is the same as the side in which the replacement of the developing cartridge 7 is performed.

Accordingly, facilitated replacement of the developing cartridge 7 and the solvent cartridge 24 can be achieved.

(3) According to the image forming apparatus 1, as illustrated in FIG. 5, the second cover 22 makes contact with the solvent cartridge 24 in a state where the solvent cartridge 24 is attached to the main casing 2 and the second cover 22 is at the second closed position.

Therefore, detachment of the solvent cartridge 24 from the main casing 2 can be suppressed by making use of the second cover 22. As a result, release of the discharge opening 24E of the solvent cartridge 24 from the one end portion 25A of the supply pipe 25 in the main casing 2 can be restrained.

(4) According to the image forming apparatus 1, the second cover 22 has the guide 22B1 and the guide 22B2 as illustrated in FIG. 2. The guide 22B1 and the guide 22B2 guide the solvent cartridge 24 when attaching the solvent cartridge 24 to the main casing 2 while the second cover 22 is at the second open position.

Accordingly, the solvent cartridge 24 can be guided toward the main casing 2 by making use of the second cover 22 positioned at the second open position.

As a result, the attachment of the solvent cartridge 24 to the main casing 2 can be performed easily.

(5) According to the image forming apparatus 1, the main casing 2 has the guide 2D1 and the guide 2D2 as illustrated in FIGS. 2 and 4. The guide 2D1 and the guide 2D2 guide the solvent cartridge 24 during the attachment of the solvent cartridge 24 to the main casing 2.

Hence, the solvent cartridge 24 can be guided inside the main casing 2.

As a result, the attachment of the solvent cartridge 24 to the main casing 2 can be performed more easily.

(6) According to the image forming apparatus 1, the sheet handle 3A of the sheet cassette 3 is positioned at the one end portion E1 in the second direction of the main casing 2 as illustrated in FIG. 2.

With this arrangement, replacement of the sheet cassette 3 can be performed at the one side of the main casing 2 in the second direction. In other words, the replacement of the sheet cassette 3 can be performed at the side the same as the side in which the replacement of the developing cartridge 7 and the solvent cartridge 24 is performed with respect to the main casing 2.

As a result, the replacement of the developing cartridge 7, the solvent cartridge 24, and the sheet cassette 3 can be facilitated.

(7) According to the image forming apparatus 1, the first circuit board 27 is electrically connected to the pump 26 that pumps the solvent from the solvent cartridge 24 to the applicator 9, as illustrated in FIG. 7.

Here, the first circuit board 27 and the solvent cartridge 24 are arranged in the second direction in a state where the solvent cartridge 24 is attached to the main casing 2. In other words, the first circuit board 27 is positioned close to the solvent cartridge 24 in the first direction.

Hence, a wiring for connecting the first circuit board 27 and the pump 26 to each other can be shortened.

(8) According to the image forming apparatus 1, the developing cartridge 7 is positioned between the solvent cartridge 24 and the second circuit board 28 in the first direction, as illustrated in FIG. 7. In other words, the second circuit board 28 is positioned on the opposite side of the developing cartridge 7 from the solvent cartridge 24 in the first direction.

With the above positional relationship, the solvent cartridge 24 can be suppressed from being electrified due to electric power supplied from the second circuit board 28 to the charging unit 5 and the applicator 9.

Figure 8:
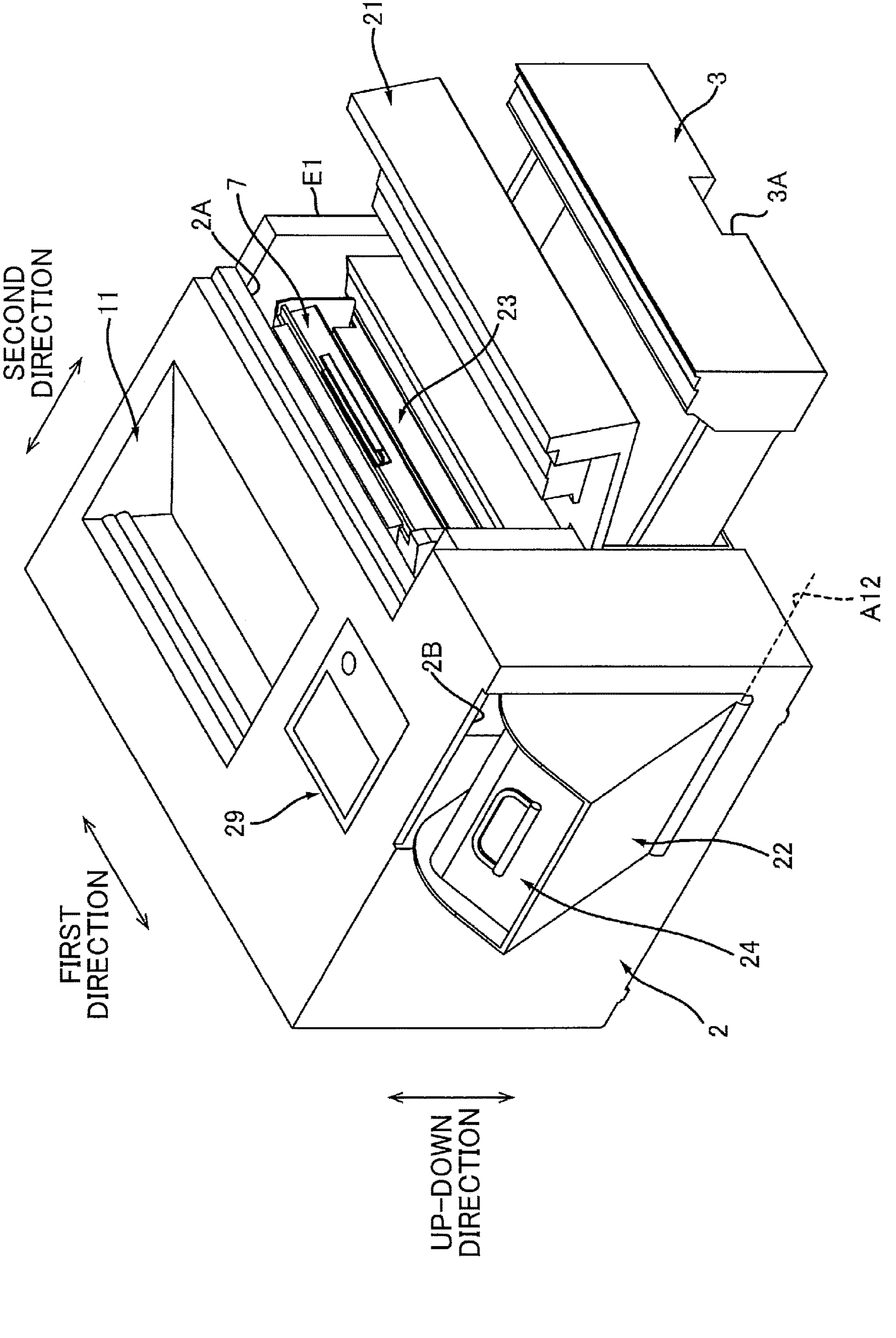
FIG. 8 is a perspective view of an image forming apparatus.

4. Modifications (1) As illustrated in FIG. 8, the second opening 2B may be positioned at one end portion in the first direction of the main casing 2. In this case, the second cover 22 is pivotally movable about a second cover axis A12 extending in the second direction.

The solvent cartridge 24 is attachable to the main casing 2 in a state where the solvent cartridge 24 is mounted on the second cover 22. The solvent cartridge 24 is attachable to the main casing 2 in the first direction.

At least a portion of the solvent cartridge 24 is juxtaposed with the developing cartridge 7 in the first direction in a state where the developing cartridge 7 and the solvent cartridge 24 are attached to the main casing 2.

Note that, even in this modification, the solvent cartridge 24 is positioned away from the developing cartridge 7 in the first direction in a state where the developing cartridge 7 and the solvent cartridge 24 are attached to the main casing 2.

Figure 9:
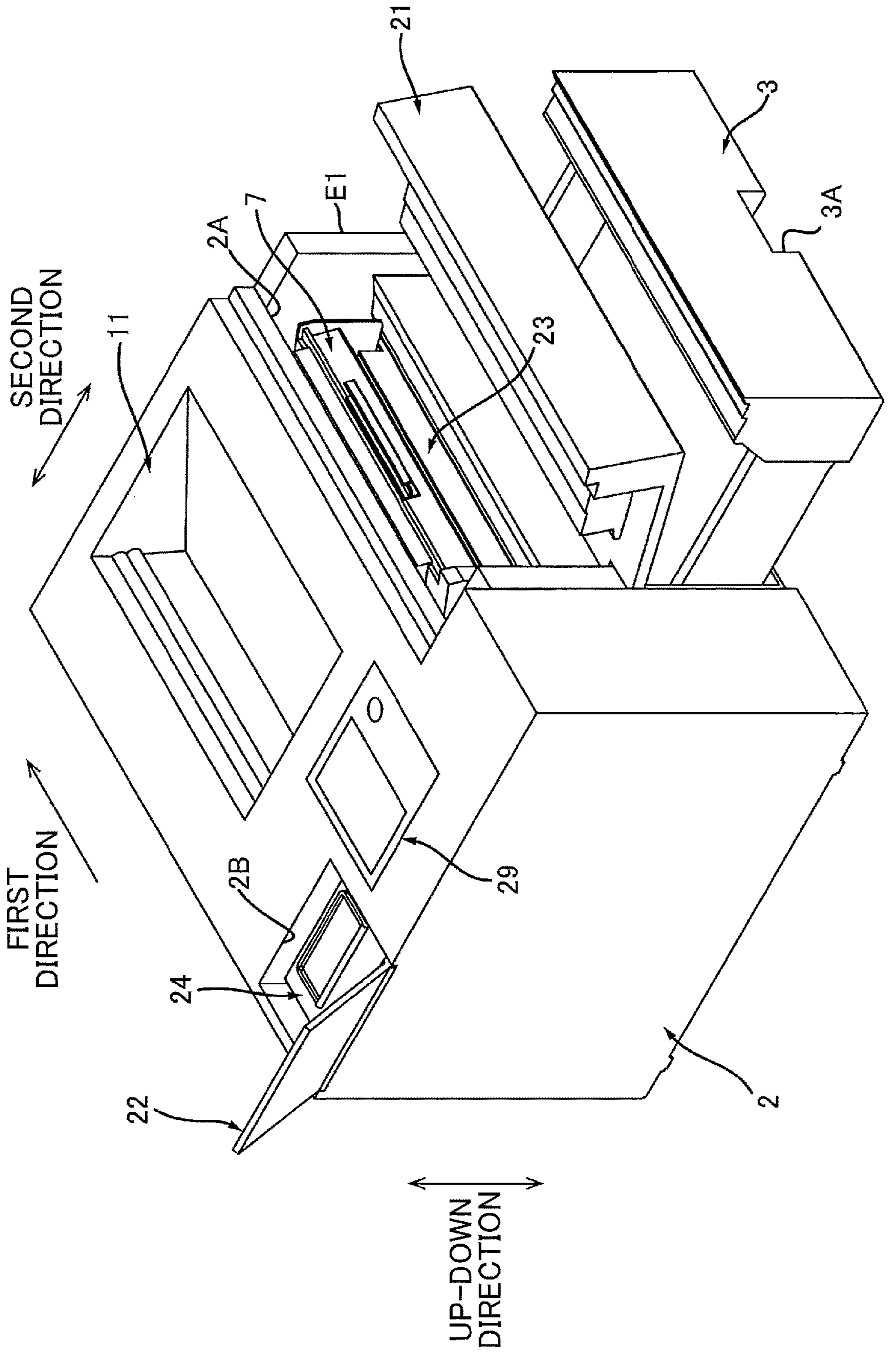
FIG. 9 is a perspective view of an image forming apparatus.

(2) As illustrated in FIG. 9, the second opening 2B may be positioned at an upper end portion of the main casing. In this case, the solvent cartridge 24 is attachable to the main casing 2 in the up-down direction.

Incidentally, even in this modification, the solvent cartridge 24 is positioned away from the developing cartridge 7 in the first direction in a state where the developing cartridge 7 and the solvent cartridge 24 are attached to the main casing 2.

Figure 10:
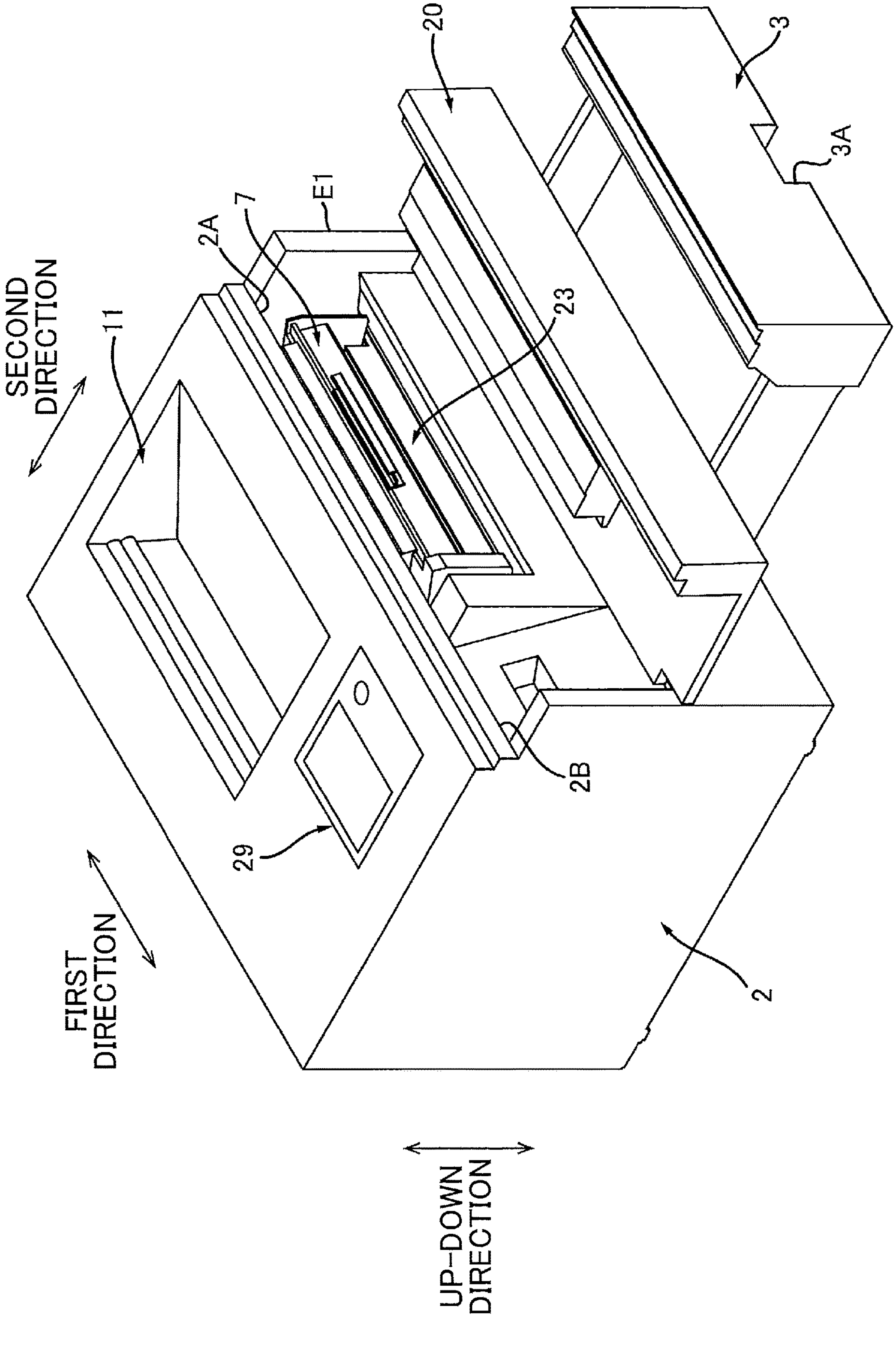
FIG. 10 is a perspective view of an image forming apparatus.

(3) The image forming apparatus 1 may include a single cover 20 instead of the first cover 21 and the second cover 22 as illustrated in FIG. 10. The cover 20 is movable between a closed position (not illustrated) and an open position (see FIG. 10). The cover 20 closes the first opening 2A and the second opening 2B in a state where the cover 20 is at the closed position. The first opening 2A and the second opening 2B are opened in a state where the cover 20 is at the open position.

According to this modification, since the first opening 2A and the second opening 2B can be opened and closed using the single cover 20, the replacement of the developing cartridge 7 and the solvent cartridge 24 can be performed easily even in a case where the replacement of both the developing cartridge 7 and the solvent cartridge 24 is desired.

Figure 11:
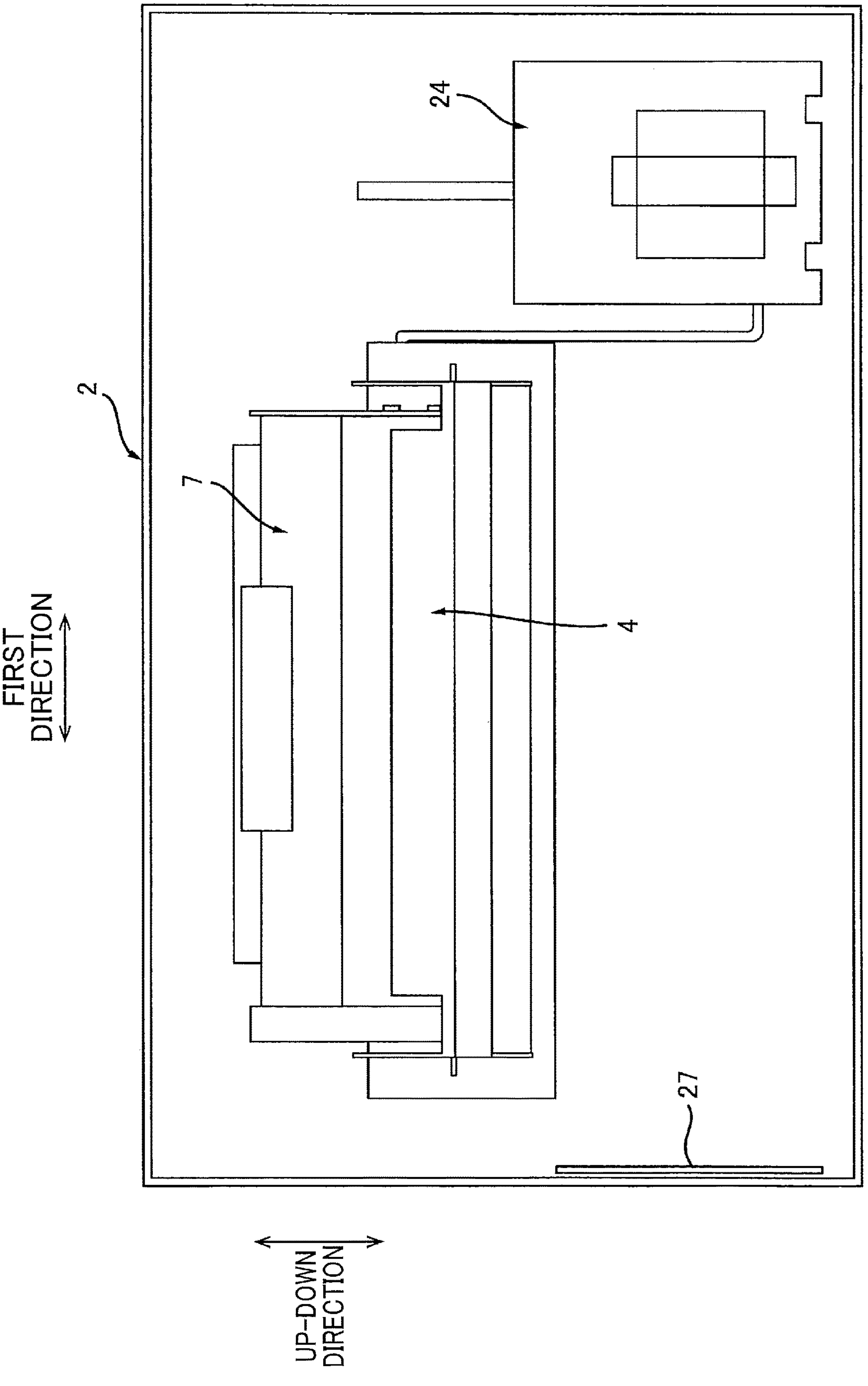
FIG. 11 is a schematic diagram illustrating a configuration of an image forming apparatus.

(4) As illustrated in FIG. 11, the solvent cartridge 24 may be positioned on the opposite side of the developing cartridge 7 from the first circuit board 27 in the first direction in a state where the developing cartridge 7 and solvent cartridge 24 are attached to the main casing 2.

Figure 12:
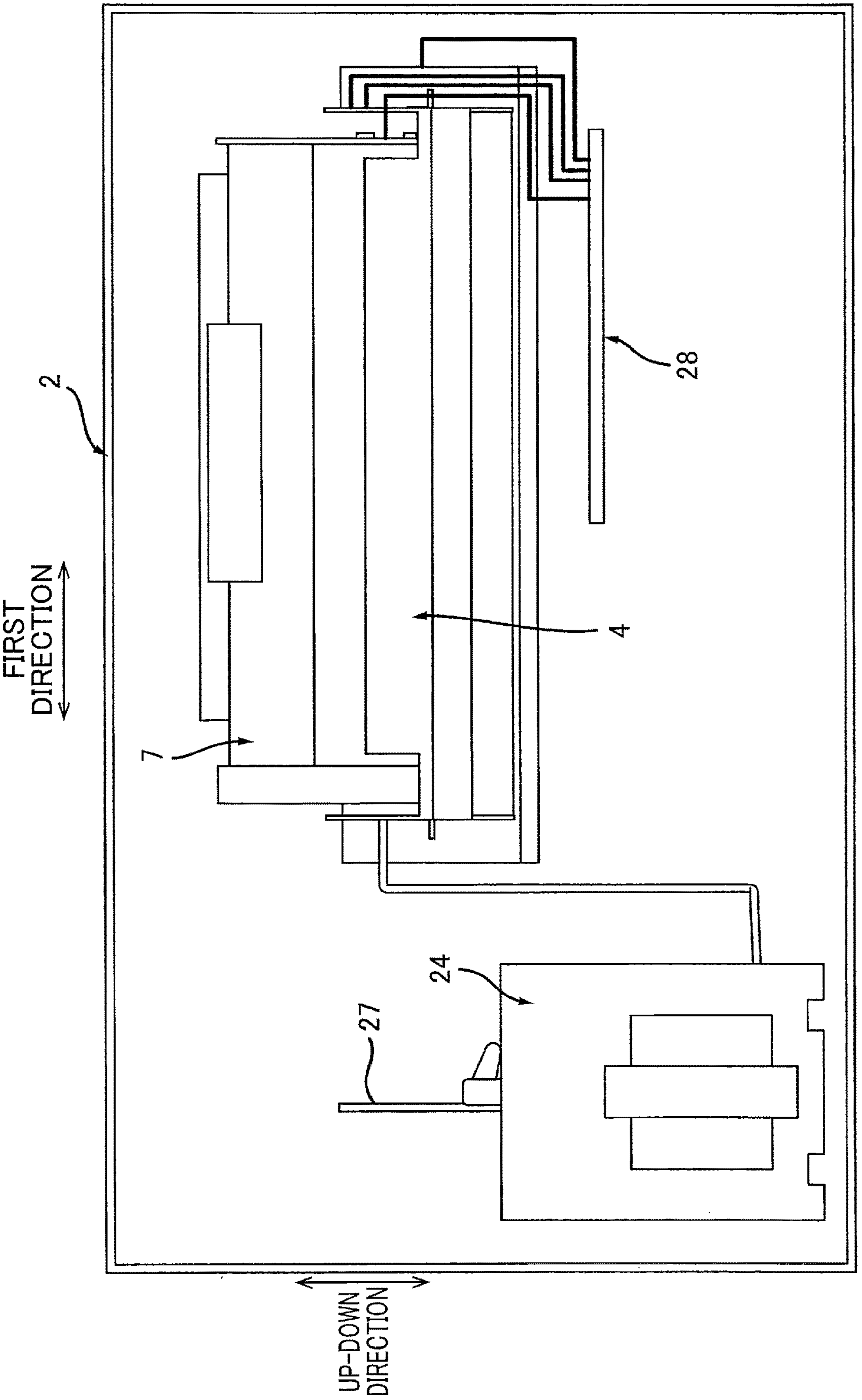
FIG. 12 is a schematic diagram illustrating a configuration of an image forming apparatus.

(5) As illustrated in FIG. 12, the second circuit board 28 may be positioned downward of the developing cartridge 7 in a state where the developing cartridge 7 and the solvent cartridge 24 are attached to the main casing 2.

(6) The sheet cassette 3 may be installed in the main casing 2 so as not to be attachable to or detachable from the main casing 2. In this case, the sheet cassette 3 includes a portion for accommodating therein the sheet S and movable through the third opening 2C between an interior position in which the portion is positioned inside the main casing 2 and an exterior position in which the portion is positioned outside the main casing 2.

(7) The guide 2D1 and the guide 2D2, and the guide 22B1 and the guide 22B2 may be grooves. The cartridge guide 24D1 and the cartridge guide 24D2 may be ribs.

(8) The developing cartridge 7 and the drum cartridge 23 may be detachably attachable to the main casing 2 independently of each other.

(9) The developing cartridge 7 may be integral with the drum cartridge 23.

Second Embodiment

Next, a second embodiment will be described with reference to FIGS. 13 through 19, wherein like parts and components are designated by the same reference numerals as those shown in the first embodiment to avoid duplicating description.

Figure 14:
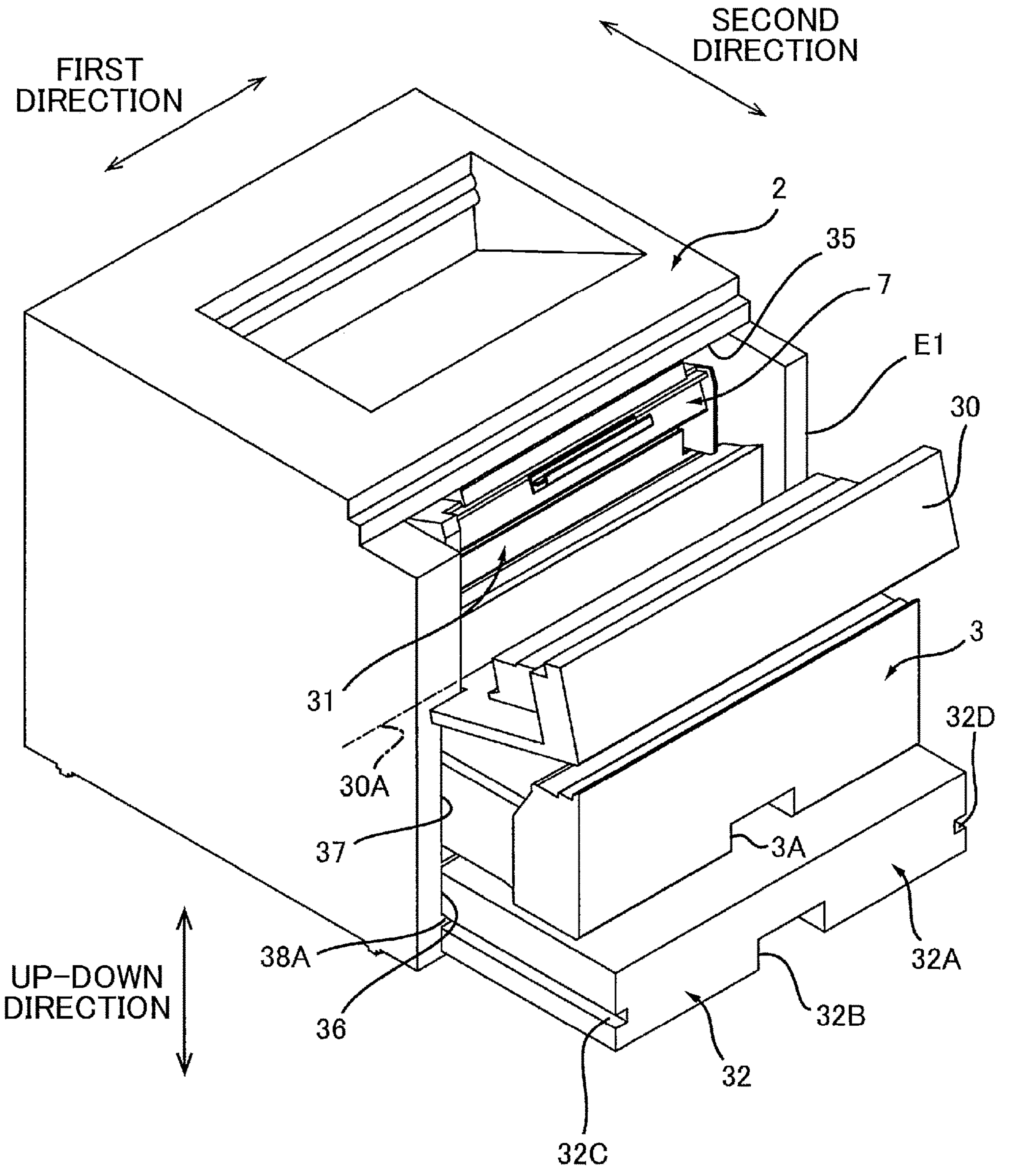
FIG. 14 is a perspective view of the image forming apparatus.
Figure 15:
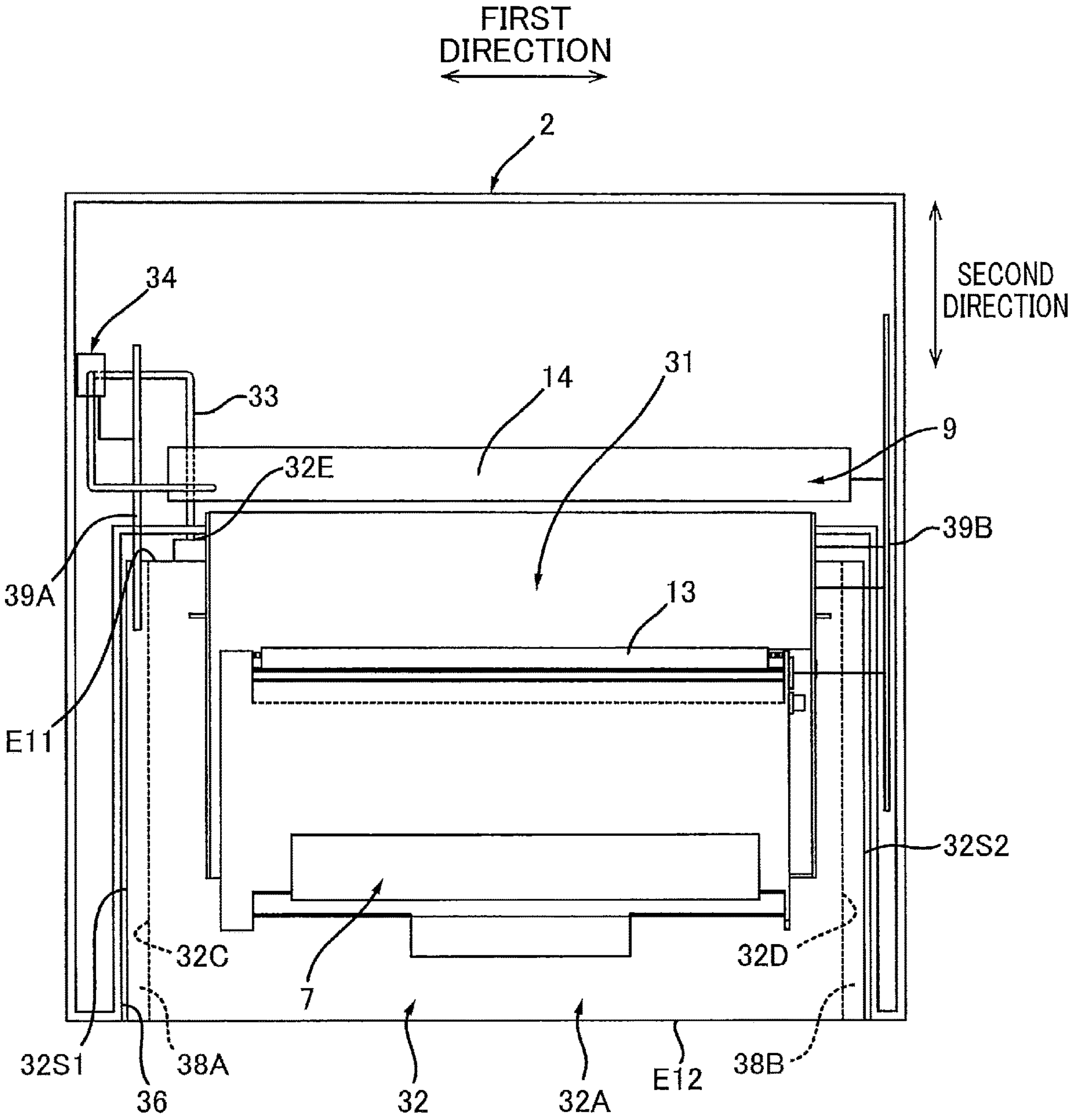
FIG. 15 is an explanatory view of a positional relationship among a developing cartridge, a drum cartridge, a solvent cartridge, an applicator, a first circuit board, and a second circuit board, and illustrating a state where a sheet cassette is detached from a main casing.

An image forming apparatus 1 according to the second embodiment includes a main casing 2 (see FIG. 14), a cover 30 (see FIG. 14), a drum cartridge 31 (see FIG. 13), a solvent cartridge 32 (see FIG. 13), a supply pipe 33 (see FIG. 15), a pump 34 (see FIG. 15), a first circuit board 39A (see FIG. 15), and a second circuit board 39B (see FIG. 15).

1. Details of Main Casing 2

As illustrated in FIG. 14, the main casing 2 has a first opening 35, a second opening 36, and a third opening 37. The main casing 2 includes a guide 38A (see FIG. 15) and a guide 38B (see FIG. 15).

1.1 First Opening 35

The first opening 35 is positioned at one end portion E1 in the second direction of the main casing 2. The second direction crosses the first direction. The developing cartridge 7 passes through the first opening 35 when the developing cartridge 7 is attached to the main casing 2. Further, the drum cartridge 31 (see FIG. 13) is also attachable to the main casing 2 through the first opening 35. The developing cartridge 7 and the drum cartridge 31 are attachable to the main casing 2 in the second direction. Note that the developing cartridge 7 and the drum cartridge 31 those attached to the main casing 2 are detachable from the main casing 2 through the first opening 35.

1.2 Second Opening 36

The second opening 36 is positioned at the one end portion E1 in the second direction of the main casing 2. The second opening 36 is positioned downward and away from the first opening 35. The second opening 36 is positioned on the opposite side of the third opening 37 from the first opening 35. The solvent cartridge 32 passes through the second opening 36 when the solvent cartridge 32 is attached to the main casing 2. That is, the drum cartridge 31 and the developing cartridge 7 are attached to the main casing 2 through the first opening 35 whereas the solvent cartridge 32 is attached to the main casing 2 through the second opening 36 positioned away from the first opening 35. Hence, the solvent cartridge 32 is attachable to the main casing 2 independently of the drum cartridge 31 and the developing cartridge 7. In other words, the drum cartridge 31 is attachable to the main casing 2 independently of the solvent cartridge 32. The solvent cartridge 32 is attachable to the main casing 2 in the second direction. Note that the solvent cartridge 32 attached to the main casing 2 is detachable from the main casing 2 through the second opening 36.

1.3 Third Opening 37

The third opening 37 is positioned at the one end portion E1 in the second direction of the main casing 2. The sheet cassette 3 is attachable to the main casing 2 through the third opening 37. The sheet cassette 3 is attachable to the main casing 2 in the second direction. Note that the sheet cassette 3 attached to the main casing 2 is detachable from the main casing 2 through the third opening 37. The sheet cassette 3 is detachably attachable to the main casing 2 independently of the solvent cartridge 32. In other words, the solvent cartridge 32 is detachably attachable to the main casing 2 independently of the sheet cassette 3.

The third opening 37 is positioned between the first opening 35 and the second opening 2B in the up-down direction. Hence, the sheet cassette 3 is positioned below the developing cartridge 7 in a state where the sheet cassette 3 is attached to the main casing 2. The sheet cassette 3 is positioned between the developing cartridge 7 and the solvent cartridge 32 in the up-down direction in a state where the developing cartridge 7, the solvent cartridge 32, and the sheet cassette 3 are attached to the main casing 2.

Note that the sheet cassette 3 includes the sheet handle 3A. The sheet handle 3A is positioned at the one end portion E1 in the second direction of the main casing 2 in a state where the sheet cassette 3 is attached to the main casing 2.

1.4 Guide 38A and Guide 38B

As illustrated in FIG. 15, the guide 38A is positioned inside the second opening 36. The guide 38A guides the solvent cartridge 32 when the solvent cartridge 32 is attached to the main casing 2. The guide 38A extends in the second direction. The guide 38A is a rib extending in the first direction.

The guide 38B is positioned inside the second opening 36. The guide 38B is positioned away from the guide 38A in the first direction. The guide 38B guides the solvent cartridge 32 when the solvent cartridge 32 is attached to the main casing 2. The guide 38B extends in the second direction. The guide 38B is a rib extending in the first direction.

2. Cover 30

As illustrated in FIG. 14, the cover 30 is positioned at the one end portion E1 in the second direction of the main casing 2. The cover 30 is movable between a closed position (see FIG. 13) and an open position (see FIG. 14). The cover 30 is pivotally movable about a cover axis 30A. The cover axis 30A extends in the first direction.

Figure 13:
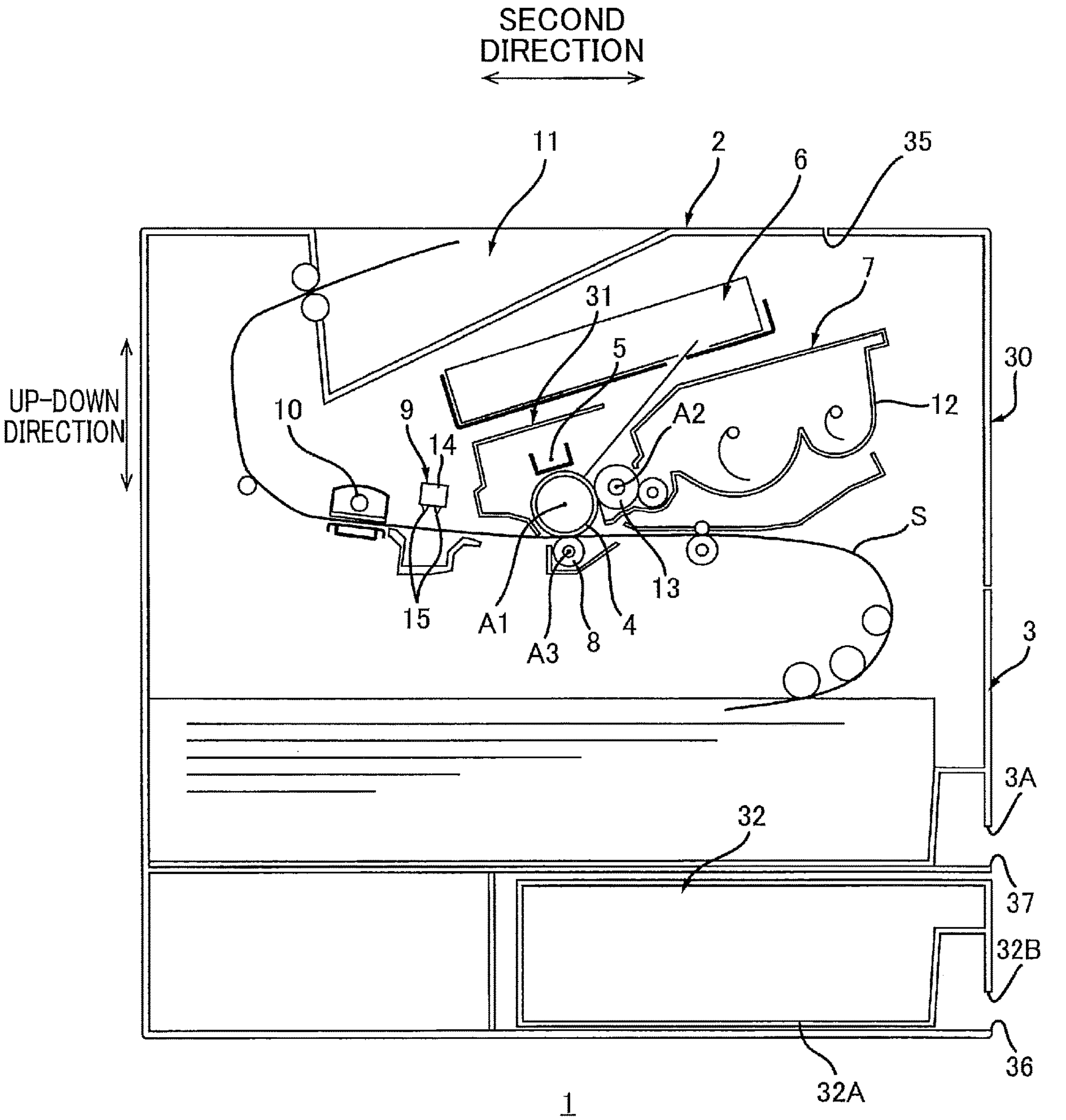
FIG. 13 is a schematic diagram illustrating a configuration of an image forming apparatus.

As illustrated in FIG. 13, the cover 30 extends in the up-down direction in a state where the cover 30 is at the closed position. The cover 30 closes the first opening 35 in a state where the cover 30 is at the closed position.

On the other hand, as illustrated in FIG. 14, the cover 30 extends in the second direction in a state where the cover 30 is at the open position. The first opening 35 is opened when the cover 30 is at the open position.

3. Drum Cartridge 31

As illustrated in FIG. 13, the drum cartridge 31 is attachable to the main casing 2. In other words, the drum cartridge 31 is attachable to the image forming apparatus 1. The drum cartridge 31 includes the photosensitive drum 4, the charging unit 5, and the transfer unit 8. Note that the main casing 2 may include the transfer unit 8.

Further, the developing cartridge 7 is detachably attachable to the drum cartridge 31. The developing cartridge 7 is attachable to the main casing 2 in a state where the developing cartridge 7 is attached to the drum cartridge 31.

4. Solvent Cartridge 32

The solvent cartridge 32 is positioned below the developing cartridge 7 in a state where the developing cartridge 7 and the solvent cartridge 32 are attached to the main casing 2. This arrangement can suppress increasing in size of the image forming apparatus 1 in the first direction. At least a portion of the exposure unit 6 is positioned upward of the developing cartridge 7 and the solvent cartridge 32 in a state where the developing cartridge 7 and the solvent cartridge 32 are attached to the main casing 2.

Further, the solvent cartridge 32 is positioned below the sheet cassette 3 in a state where the solvent cartridge 32 and the sheet cassette 3 are attached to the main casing 2.

Further, the solvent cartridge 32 is positioned downward of the applicator 9 in a state where the solvent cartridge 32 is attached to the main casing 2.

As illustrated in FIG. 14, the solvent cartridge 32 includes a solvent casing 32A, a cartridge handle 32B, a cartridge guide 32C, and a cartridge guide 32D.

4.1 Solvent Casing 32A

The solvent casing 32A can accommodate therein solvent. In other words, the solvent cartridge 32 can accommodate therein solvent. The solvent dissolves toner.

Figure 16:
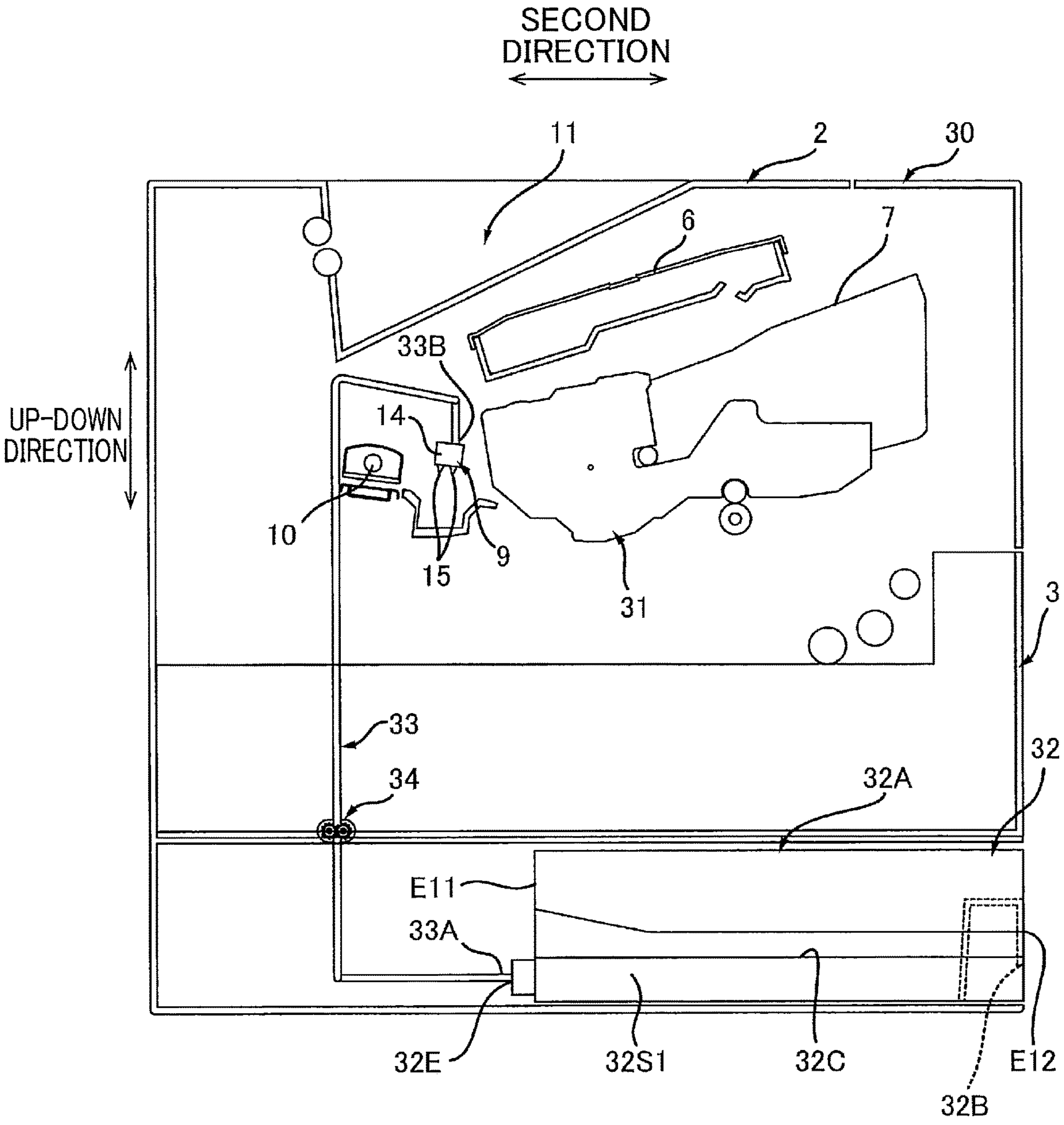
FIG. 16 is an explanatory view of a positional relationship among the solvent cartridge, a supply pipe, a pump, and the applicator.

As illustrated in FIG. 16, the solvent casing 32A extends in the second direction in a state where the solvent cartridge 32 is attached to the main casing 2. The solvent casing 32A has a discharge opening 32E. The discharge opening 32E allows the solvent to be discharged therethrough from the solvent casing 32A to the supply pipe 33. The discharge opening 32E is positioned at one end portion E11 in the second direction of the solvent casing 32A.

4.2 Cartridge Handle 32B

The cartridge handle 32B is positioned at another end portion E12 in the second direction of the solvent casing 32A in a state where the solvent cartridge 32 is attached to the main casing 2. The user moves the solvent cartridge 32 in the second direction when attaching the solvent cartridge 32 to the main casing 2 and when detaching the solvent cartridge 32 from the main casing 2. At this time, the cartridge handle 32B is grasped by the user.

4.3 Cartridge Guide 32C and Cartridge Guide 32D

As illustrated in FIG. 15, the cartridge guide 32C is positioned on a side surface 32S1 in the first direction of the solvent casing 32A. The cartridge guide 32C is in a form of a groove. The guide 38A of the main casing 2 is fitted into the cartridge guide 32C when the solvent cartridge 32 is attached to the main casing 2. The cartridge guide 32C is guided by the guide 38A. Accordingly, the solvent cartridge 32 is guided by the guide 38A in the second direction.

The cartridge guide 32D is positioned on a side surface 32S2 in the first direction of the solvent casing 32A. The side surface 32S2 is positioned away from the side surface 32S1 in the first direction. The cartridge guide 32D is in a form of a groove. The guide 38B of the main casing 2 is fitted into the cartridge guide 32D when the solvent cartridge 32 is attached to the main casing 2. The cartridge guide 32D is guided by the guide 38B. Hence, the solvent cartridge 32 is guided by the guide 38B in the second direction.

5. Supply Pipe 33

As illustrated in FIG. 16, the supply pipe 33 has one end portion 33A and another end portion 33B. The one end portion 33A is connected to the discharge opening 32E of the solvent cartridge 32 in a state where the solvent cartridge 32 is attached to the main casing 2. The other end portion 33B is positioned away from the one end portion 33A. The other end portion 33B is connected to the applicator casing 14 of the applicator 9.

6. Pump 34

The pump 34 is positioned between the one end portion 33A and the other end portion 33B of the supply pipe 33. The pump 34 pumps the solvent from the solvent cartridge 32 to the applicator 9. When the pump 34 is driven in a state where the solvent cartridge 32 is attached to the main casing 2, the solvent accommodated in the solvent cartridge 32 is introduced into the applicator casing 14 of the applicator 9 through the discharge opening 32E and the supply pipe 33. Specifically, the pump 34 is a gear pump.

7. First Circuit Board 39A

As illustrated in FIG. 15, the first circuit board 39A is juxtaposed with the applicator 9 in the first direction. The first circuit board 39A is electrically connected to the pump 34. Specifically, the first circuit board 39A is a control circuit board. The first circuit board 39A controls the pump 34.

8. Second Circuit Board 39B

The second circuit board 39B is positioned to be spaced apart from the first circuit board 39A in the first direction. The second circuit board 39B is positioned on the opposite side of the applicator 9 from the first circuit board 39A in the first direction. In other words, the applicator 9 is positioned between the first circuit board 39A and the second circuit board 39B in the first direction. The second circuit board 39B is electrically connected to the charging unit 5 and the transfer unit 8. The second circuit board 39B applies a voltage to the charging unit 5 and the transfer unit 8. The second circuit board 39B is electrically connected to the applicator 9. The second circuit board 39B supplies electric power to the applicator 9. Further, the second circuit board 39B is electrically connected to the developing cartridge 7. The second circuit board 39B applies a voltage to the developing cartridge 7. The second circuit board 39B is electrically connected to the developing roller 13. The second circuit board 39B applies a voltage to the developing roller 13.

9. Functions and Effects (1) According to the image forming apparatus 1, as illustrated in FIG. 14, replacement of the solvent cartridge 32 that can accommodate therein the solvent can be performed independently of the developing cartridge 7.

Further, the solvent cartridge 32 is positioned downward of the developing cartridge 7 in a state where the developing cartridge 7 and the solvent cartridge 32 are attached to the main casing 2.

Accordingly, enlargement of the image forming apparatus 1 in the first direction can be restrained.

For example, enlargement of the image forming apparatus 1 in the first direction can be restrained in comparison with a configuration where the developing cartridge 7 and the solvent cartridge 32 are arranged in the first direction in a state where the developing cartridge 7 and the solvent cartridge 32 are attached to the main casing 2.

(2) According to the image forming apparatus 1, the first opening 35 and the second opening 36 are positioned at the one end portion E1 in the second direction of the main casing 2, as illustrated in FIG. 14. The developing cartridge 7 is attachable to the main casing 2 through the first opening 35 in the second direction. The solvent cartridge 32 is attachable to the main casing 2 through the second opening 36 in the second direction.

Hence, the replacement of the developing cartridge 7 and the solvent cartridge 32 can be performed at one side in the second direction of the main casing 2. In other words, the replacement of the solvent cartridge 32 can be performed at the side of the main casing 2 which is the same as the side in which the replacement of the developing cartridge 7 is performed.

Accordingly, the developing cartridge 7 and the solvent cartridge 32 can be replaced easily.

(3) According to the image forming apparatus 1, the sheet handle 3A of the sheet cassette 3 is positioned at the one end portion E1 in the second direction of the main casing 2 as illustrated in FIG. 14. Hence, replacement of the sheet cassette 3 can be performed at the one side of the main casing 2 in the second direction. In other words, the replacement of the sheet cassette 3 can be performed at the side the same as the side in which the replacement of the developing cartridge 7 and the solvent cartridge 32 is performed with respect to the main casing 2.

As a result, the replacement of the developing cartridge 7, the solvent cartridge 32, and the sheet cassette 3 can be performed easily.

Figure 17:
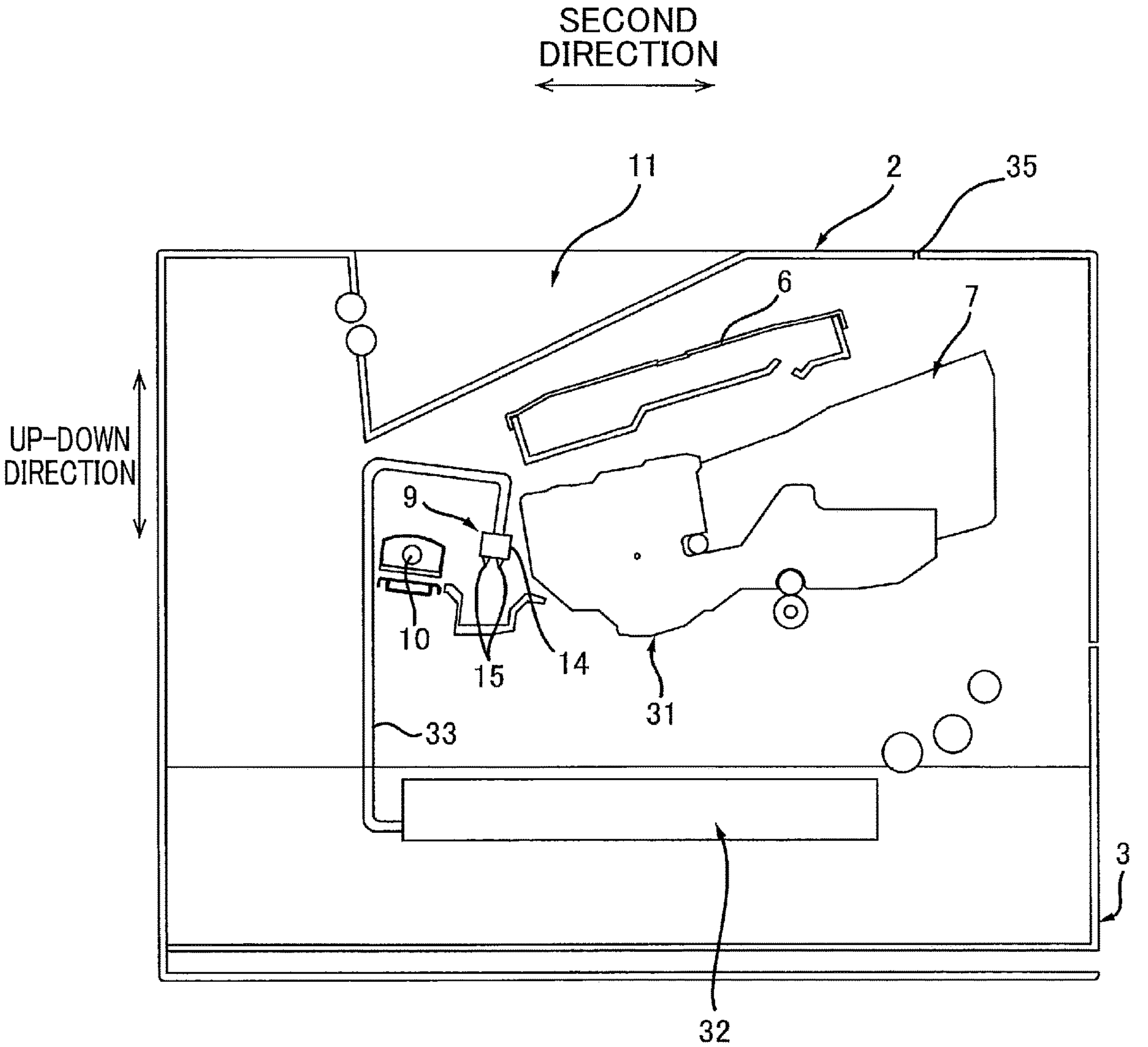
FIG. 17 is a schematic diagram illustrating a configuration of an image forming apparatus.

10. Modifications (1) As illustrated in FIG. 17, the solvent cartridge 32 may be positioned inside the sheet cassette 3 in a state where the solvent cartridge 32 and the sheet cassette 3 are attached to the main casing 2.

The solvent cartridge 32 is attachable to the main casing 2 while the solvent cartridge 32 is mounted on the sheet cassette 3. The solvent cartridge 32 is attachable to the main casing 2 in the second direction.

Figure 18:
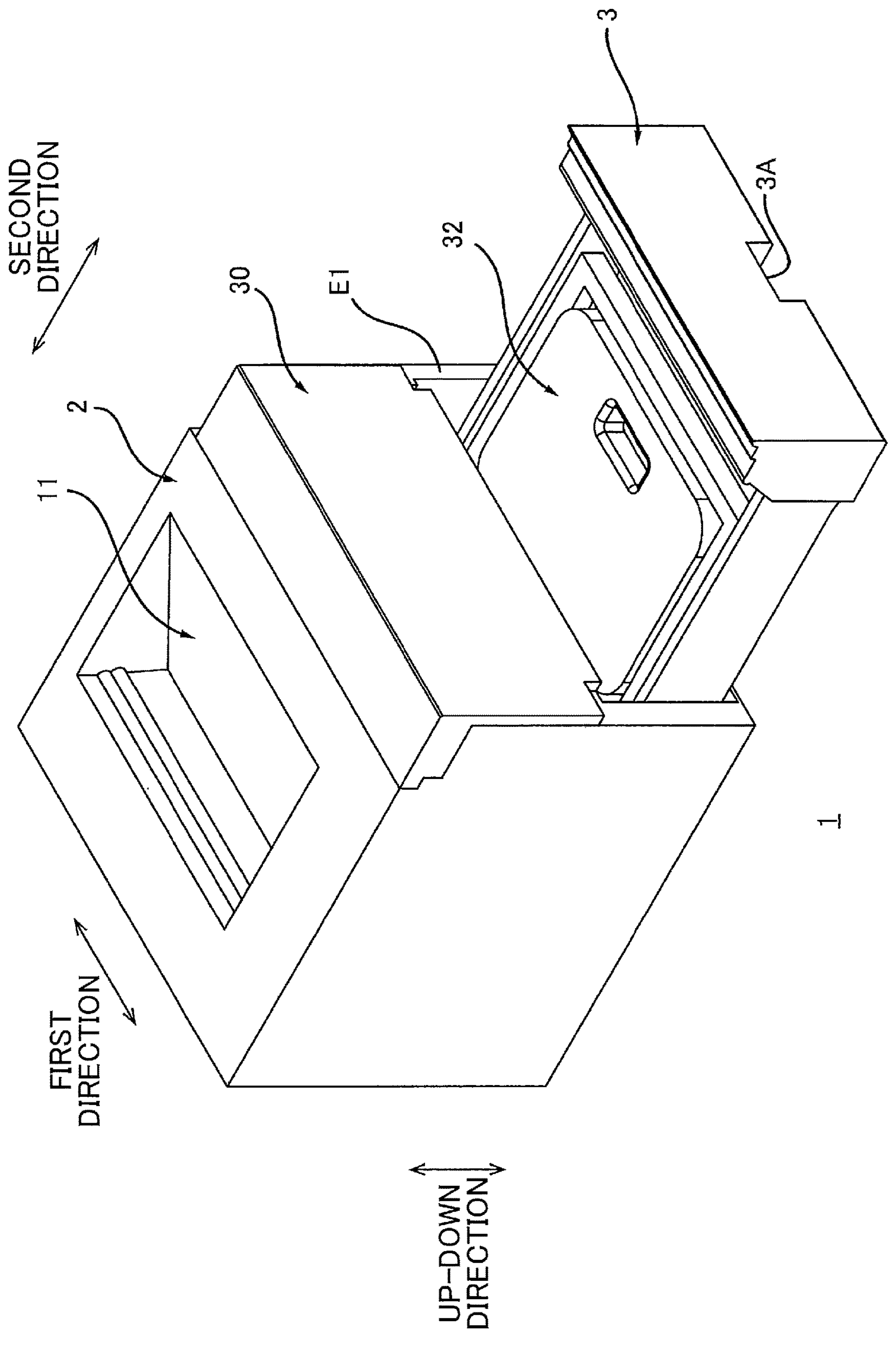
FIG. 18 is a perspective view of the image forming apparatus illustrated in FIG. 17, and illustrating a state where a sheet cassette is pulled out of a main casing.

Note that, even in this modification, the solvent cartridge 32 is positioned downward of the developing cartridge 7 in a state where the developing cartridge 7 and the solvent cartridge 32 are attached to the main casing 2. Further, as illustrated in FIG. 18, the solvent cartridge 32 is detachable from the sheet cassette 3 in a state where the sheet cassette 3 is detached from the main casing 2.

(2) The solvent cartridge 32 may be positioned between the developing cartridge 7 and the sheet cassette 3 in the up-down direction in a state where the developing cartridge 7, the solvent cartridge 32, and the sheet cassette 3 are attached to the main casing 2.

Figure 19:
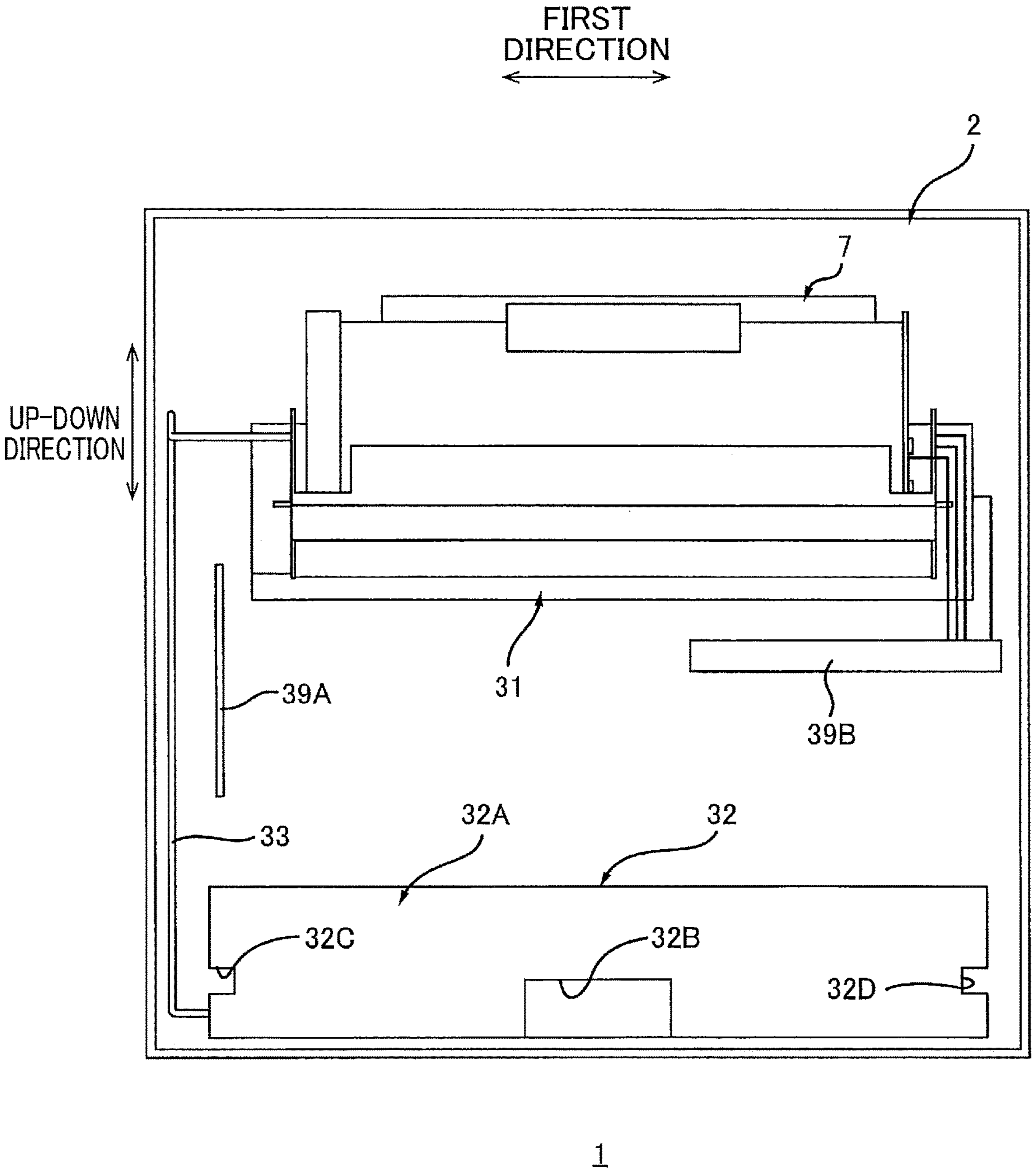
FIG. 19 is a schematic diagram illustrating a configuration of an image forming apparatus.

(3) As illustrated in FIG. 19, the second circuit board 39B may be positioned downward of the developing cartridge 7 in a state where the developing cartridge 7 and the solvent cartridge 32 are attached to the main casing 2. The second circuit board 39B may be positioned between the developing cartridge 7 and the solvent cartridge 32 in the up-down direction.

(4) The sheet cassette 3 may be installed in the main casing 2 so as not to be attachable to or detachable from the main casing 2. In this case, the sheet cassette 3 may include a portion for accommodating therein the sheet S and movable through the third opening 37 between an interior position in which the portion is positioned inside the main casing 2 and an exterior position in which the portion is positioned outside the main casing 2.

(5) The guide 38A and the guide 38B may be grooves. The cartridge guide 32C and the cartridge guide 32D may be ribs.

(6) The developing cartridge 7 and the drum cartridge 31 may be detachably attachable to the main casing 2 independently of each other.

(7) The developing cartridge 7 may be integral with the drum cartridge 31.

Third Embodiment

Next, a third embodiment will be described with reference to FIGS. 20 and 21, wherein like parts and components are designated by the same reference numerals as those shown in the first embodiment to avoid duplicating description.

Figure 20:
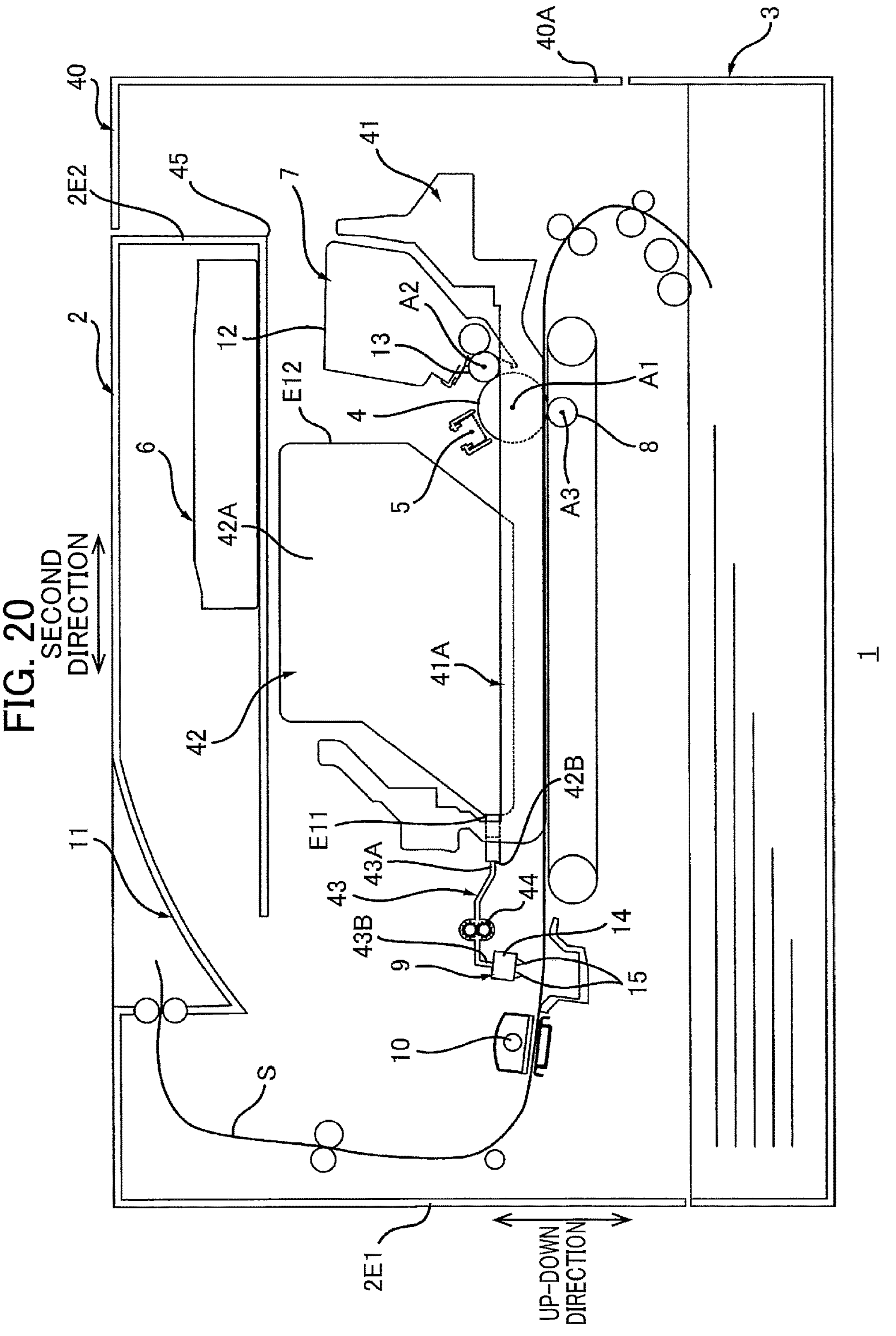
FIG. 20 is a schematic diagram illustrating a configuration of an image forming apparatus.

As illustrated in FIG. 20, an image forming apparatus 1 according to the third embodiment includes the main casing 2 described above, a cover 40, a drum cartridge 41, a solvent cartridge 42, a supply pipe 43, and a pump 44.

1. Details of Main Casing 2

Figure 21:
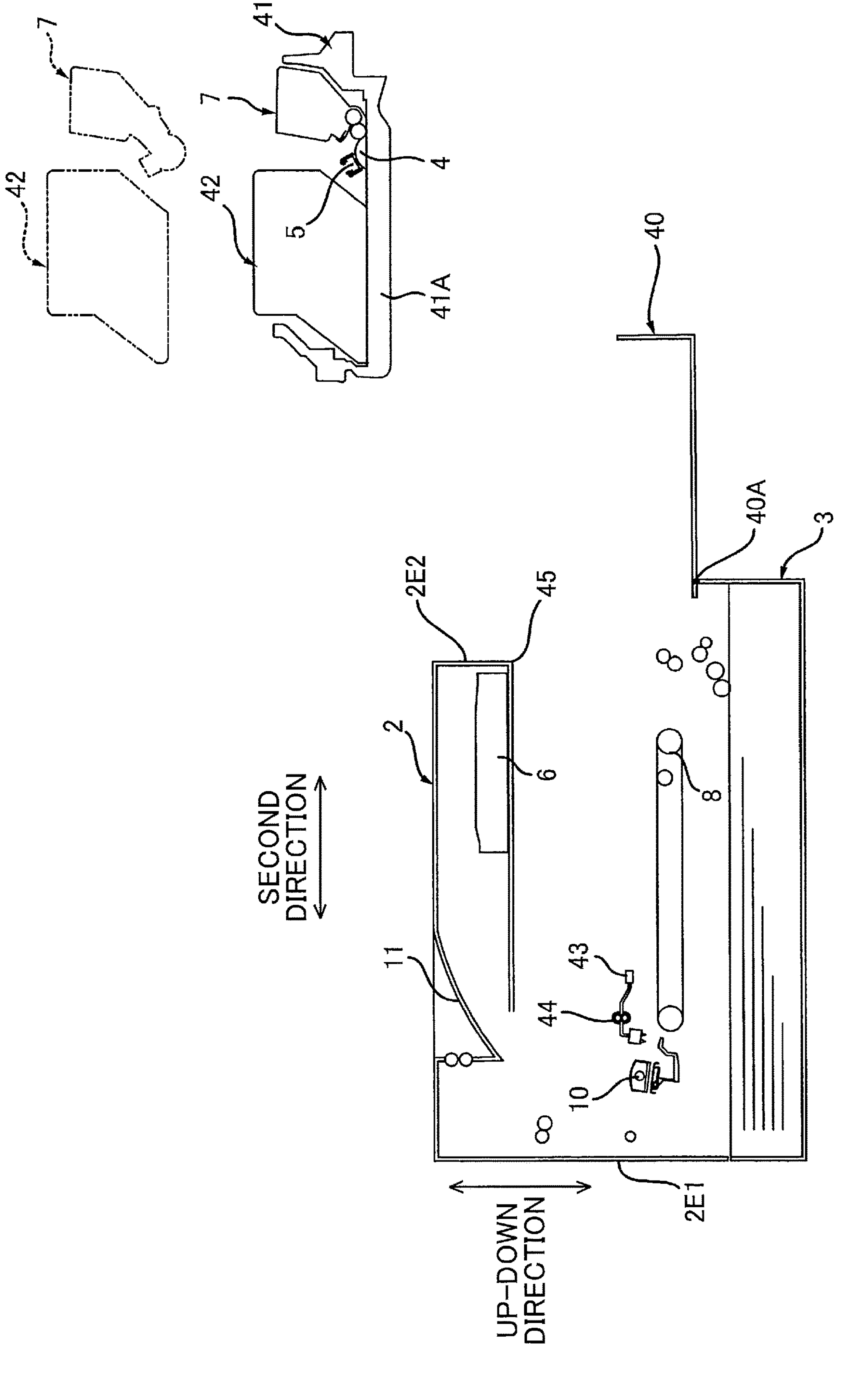
FIG. 21 illustrates the image forming apparatus illustrated in FIG. 20, and illustrating a state where a cover is at its open position.

As illustrated in FIGS. 20 and 21, the main casing 2 has an opening 45. The main casing 2 has one end portion 2E1 and another end portion 2E2 in the second direction. The second direction crosses the first direction. The other end portion 2E2 is spaced apart from the one end portion 2E1 in the second direction. The applicator 9 is positioned at the one end portion 2E1 of the main casing 2.

1.1 Opening 45

The opening 45 is positioned at the other end portion 2E2 in the second direction of the main casing 2. The developing cartridge 7 and the solvent cartridge 42 pass through the opening 45 when the developing cartridge 7 and the solvent cartridge 42 are attached to the main casing 2. The developing cartridge 7 and the solvent cartridge 42 are attachable to the main casing 2 in the second direction. Note that the developing cartridge 7 and the solvent cartridge 42 those attached to the main casing 2 are detachable from the main casing 2 through the opening 45.

2. Cover 40

The cover 40 is positioned at the other end portion 2E2 in the second direction of the main casing 2. The cover 40 is movable between a closed position (see FIG. 20) and an open position (see FIG. 21). The cover 40 is pivotally movable about a cover axis 40A. The cover axis 40A extends in the first direction.

As illustrated in FIG. 20, the cover 40 extends in the up-down direction in a state where the cover 40 is at the closed position. The cover 40 closes the opening 45 in a state where the cover 40 is at the closed position.

On the other hand, as illustrated in FIG. 21, the cover 40 extends in the second direction in a state where the cover 40 is at the open position. The opening 45 is opened in a state where the cover 40 is at the open position.

3. Drum Cartridge 41

As illustrated in FIGS. 20 and 21, the drum cartridge 41 is movable in the second direction through the opening 45 between an interior position (see FIG. 20) and an exterior position (see FIG. 21). The drum cartridge 41 is positioned inside the main casing 2 (see FIG. 20) in a state where the drum cartridge 41 is at the interior position. The drum cartridge 41 is positioned outside the main casing 2 (see FIG. 21) in a state where the drum cartridge 41 is at the exterior position.

As illustrated in FIG. 20, the drum cartridge 41 includes the photosensitive drum 4, the charging unit 5, and a drum frame 41A. The drum cartridge 41 may include the transfer unit 8. In the present embodiment, the main casing 2 includes the transfer unit 8. The transfer unit 8 can convey the sheet S in the second direction toward the applicator 9.

The drum frame 41A extends in the second direction. The drum frame 41A supports the photosensitive drum 4. The drum frame 41A can support the developing cartridge 7 and the solvent cartridge 42. The drum cartridge 41 is movable in a state where the drum frame 41A supports the developing cartridge 7 and the solvent cartridge 42.

The developing cartridge 7 is detachably attachable to the drum frame 41A. A state where the developing cartridge 7 is attached to the drum frame 41A denotes a state where the developing cartridge 7 is supported by a certain position of the drum frame 41A. The developing cartridge 7 may be movable relative to the drum frame 41A in a state where the developing cartridge 7 is attached to the drum frame 41A.

The developing cartridge 7 is attached to the main casing 2 while the developing cartridge 7 is attached to the drum frame 41A and the drum cartridge 41 is at the interior position. The developing cartridge 7 is detachable from the drum frame 41A in a state where the drum cartridge 41 is at the exterior position, as indicated by an imaginary line in FIG. 21.

4. Solvent Cartridge 42

The solvent cartridge 42 is detachably attachable to the main casing 2 independently of the developing cartridge 7. The solvent cartridge 42 is detachably attachable to the drum frame 41A independently of the developing cartridge 7. A state where the solvent cartridge 42 is attached to the drum frame 41A denotes a state where the solvent cartridge 42 is supported by a specific position of the drum frame 41A. The solvent cartridge 42 may be movable relative to the drum frame 41A in a state where the solvent cartridge 42 is attached to the drum frame 41A.

The solvent cartridge 42 is attached to the main casing 2 in a state where the solvent cartridge 42 is attached to the drum frame 41A and the drum cartridge 41 is at the interior position. The solvent cartridge 42 is detachable from the drum frame 41A in a state where the drum cartridge 41 is at the exterior position, as indicated by an imaginary line in FIG. 21.

As illustrated in FIG. 20, in a state where the developing cartridge 7 and the solvent cartridge 42 are attached to the main casing 2 and the cover 40 is at the closed position, the developing cartridge 7 and the solvent cartridge 42 are positioned between the applicator 9 and the cover 40 in the second direction, and the solvent cartridge 42 is positioned closer to the applicator 9 than the developing cartridge 7 is to the applicator 9. By virtue of this positional relationship, the supply pipe 43 for connecting the solvent cartridge 42 to the applicator 9 can be shortened. Further, since the developing cartridge 7 is positioned closer to the cover 40 than the solvent cartridge 42 is to the cover 40 in the second direction in a state where the developing cartridge 7 and the solvent cartridge 42 are attached to the main casing 2, the developing cartridge 7 can be replaced easily in a state where the cover 40 is at the open position (see FIG. 21). Further, this configuration can restrain the user's hands from getting dirty with solvent adhered to the solvent cartridge 42 during a process of attachment and detachment of the developing cartridge 7.

Further, the photosensitive drum 4 is positioned between the applicator 9 and the cover 40 in the second direction and the solvent cartridge 42 is positioned closer to the applicator 9 than the photosensitive drum 4 is to the applicator 9 in the second direction in a state where the developing cartridge 7, the drum cartridge 41, and the solvent cartridge 42 are attached to the main casing 2 and the cover 40 is at the closed position.

Further, the solvent cartridge 42 includes a solvent casing 42A.

4.1 Solvent Casing 42A

The solvent casing 42A can accommodate therein solvent. In other words, the solvent cartridge 42 can accommodate therein solvent. The solvent dissolves toner.

The solvent casing 42A extends in the second direction in a state where the solvent cartridge 42 is attached to the main casing 2. The solvent casing 42A has a discharge opening 42B. The discharge opening 42B allows the solvent to be discharged therethrough from the solvent casing 42A to the supply pipe 43. The discharge opening 42B is positioned at one end portion E11 in the second direction of the solvent casing 42A. The solvent casing 42A has another end portion E12 positioned away from the one end portion E11 in the second direction. The one end portion E11 is positioned on the opposite side of the other end portion E12 from the developing cartridge 7 in the second direction in a state where the developing cartridge 7 and the solvent cartridge 42 are attached to the main casing 2.

5. Supply Pipe 43

The supply pipe 43 allows the solvent to be supplied from the solvent cartridge 42 to the applicator 9 therethrough. The supply pipe 43 is positioned between the applicator 9 and the solvent cartridge 42 in the second direction in a state where the solvent cartridge 42 is attached to the main casing 2.

The supply pipe 43 has one end portion 43A and another end portion 43B. The one end portion 43A is connected to the discharge opening 42B of the solvent cartridge 42 in a state where the solvent cartridge 42 is attached to the main casing 2. The other end portion 43B is positioned away from the one end portion 43A. The other end portion 43B is connected to the applicator casing 14 of the applicator 9.

6. Pump 44

The pump 44 is positioned between the one end portion 43A and the other end portion 43B of the supply pipe 43. The pump 44 pumps the solvent from the solvent cartridge 42 to the applicator 9. When the pump 44 is driven in a state where the solvent cartridge 42 is attached to the main casing 2, the solvent accommodated in the solvent cartridge 42 enters the applicator casing 14 of the applicator 9 through the discharge opening 42B and the supply pipe 43. Specifically, the pump 44 is a gear pump.

7. Functions and Effects (1) According to the image forming apparatus 1, replacement of the solvent cartridge 42 that can accommodate therein the solvent can be performed independently of the developing cartridge 7 as illustrated in FIG. 21.

Further, as illustrated in FIG. 20, in a state where the developing cartridge 7 and the solvent cartridge 42 are attached to the main casing 2 and the cover 40 is at the closed position, the developing cartridge 7 and the solvent cartridge 42 are positioned between the applicator 9 and the cover 40 in the second direction, and the solvent cartridge 42 is positioned closer to the applicator 9 than the developing cartridge 7 is to the applicator 9.

With this configuration, the supply pipe 43 for connecting the solvent cartridge 42 to the applicator 9 can be shortened.

Further, since the developing cartridge 7 is positioned closer to the cover 40 than the solvent cartridge 42 is to the cover 40 in the second direction, the developing cartridge 7 can be replaced easily in a state where the cover 40 is at the open position (see FIG. 21).

Note that there may be a case where a timing for replacement of the developing cartridge 7 is different from a timing for replacement of the solvent cartridge 42. For example, in a case where the solvent cartridge 42 (the solvent casing 42A) has a size greater than that of the developing cartridge 7 (the toner casing 12), frequency of replacement for the developing cartridge 7 is assumed to be greater than that of frequency for the solvent cartridge 42. Therefore, replacement of the developing cartridge 7 can be performed easily.

Further, the user's hands can be suppressed from getting dirty with the solvent adhered to the solvent cartridge 42 during a process of attachment and detachment of the developing cartridge 7.

8. Modifications

The image forming apparatus 1 may include a drawer. The drawer is movable between an interior position and an exterior position. The drawer is positioned inside the main casing 2 in a state where the drawer is at the interior position. The drawer is positioned outside the main casing 2 when the drawer is at the exterior position. The drawer is not detachable from the main casing 2. The developing cartridge 7 may be detachably attachable to the drawer in a state where the drawer is at the exterior position. The solvent cartridge 42 may be detachably attachable to the drawer independently of the developing cartridge 7 in a state where the drawer is at the exterior position.

Further, the developing cartridge 7 may include the photosensitive drum 4. The photosensitive drum 4 may be positioned between the applicator 9 and the cover 40 in the second direction in a state where the developing cartridge 7 and the solvent cartridge 42 are attached to the drawer, the drawer is at the interior position, and the cover 40 is at the closed position. The solvent cartridge 42 may be positioned closer to the applicator 9 than the photosensitive drum 4 is to the applicator 9 in the second direction in a state where the developing cartridge 7 and the solvent cartridge 42 are attached to the drawer, the drawer is at the interior position, and the cover 40 is at the closed position.

Note that, even in this modification, the solvent cartridge 42 is positioned closer to the applicator 9 than the developing cartridge 7 is to the applicator 9 in a state where the developing cartridge 7 and the solvent cartridge 42 are attached to the drawer and the drawer is at the interior position.

Further, the drum cartridge including the photosensitive drum 4 may be detachably attachable to the drawer independently of the developing cartridge 7.

Fourth Embodiment

Next, a fourth embodiment will be described with reference to FIGS. 22 and 23, wherein like parts and components are designated by the same reference numerals as those shown in the third embodiment to avoid duplicating description.

Figure 22:
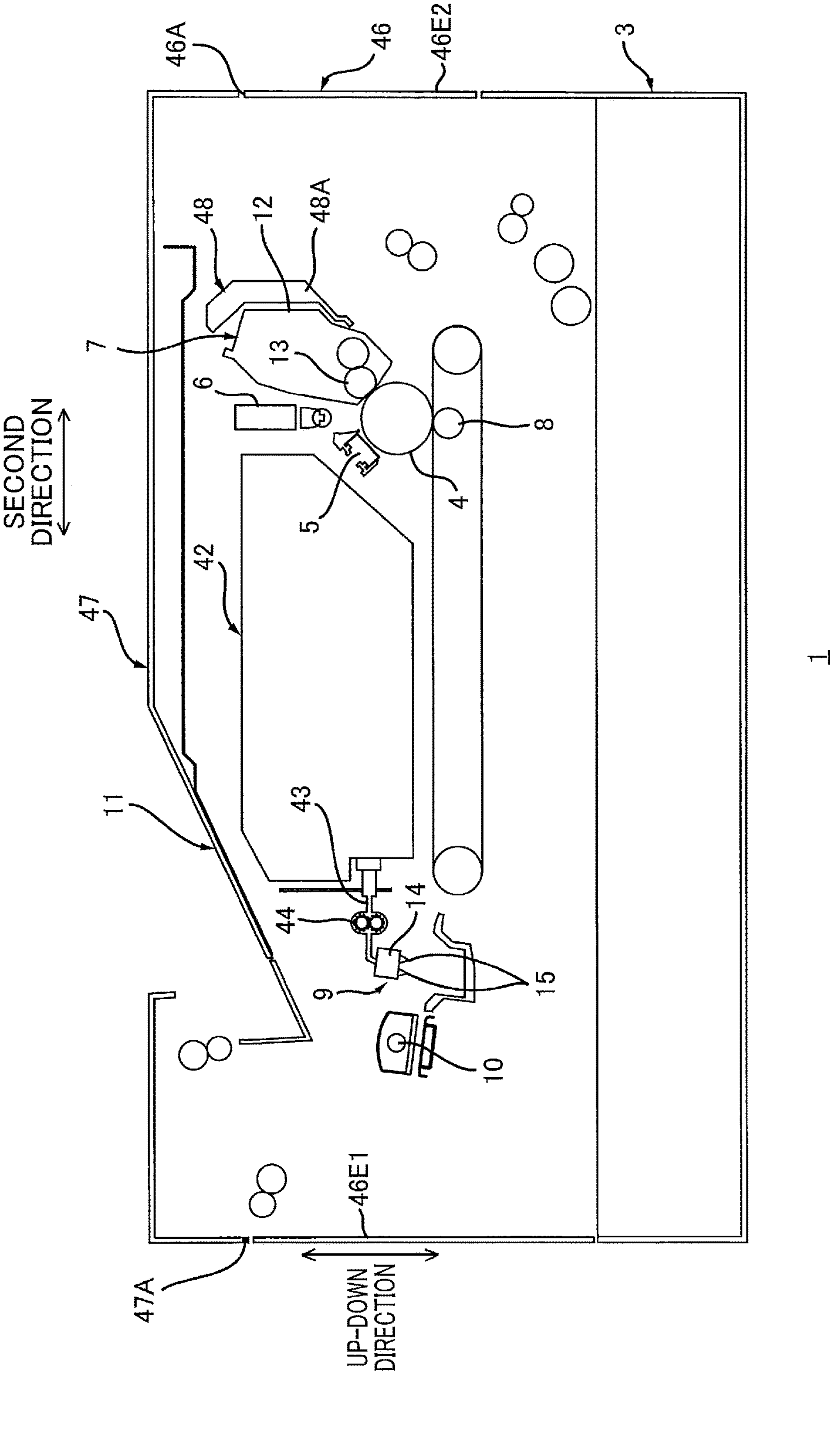
FIG. 22 is a schematic diagram illustrating a configuration of an image forming apparatus.
Figure 23:
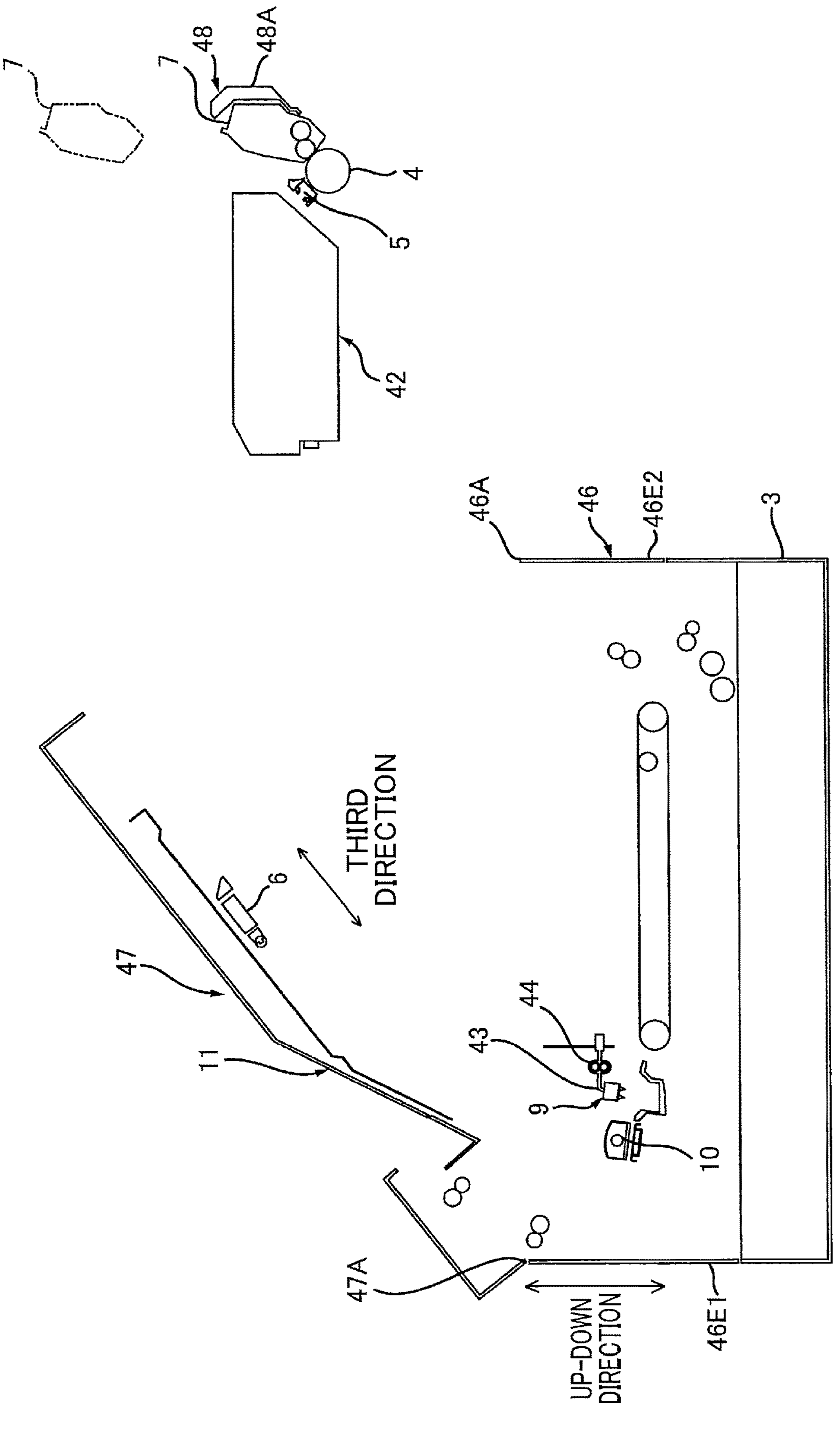
FIG. 23 illustrates the image forming apparatus illustrated in FIG. 22, and illustrating a state where a cover is at its open position.

As illustrated in FIGS. 22 and 23, an image forming apparatus 1 according to the fourth embodiment includes a main casing 46, a cover 47, and a drum cartridge 48. Note that the exposure unit 6 is an LED array in the fourth embodiment.

1. Details of Main Casing 46

The main casing 46 has an opening 46A. The opening 46A is positioned in an upper end portion of the main casing 46. The developing cartridge 7 and the solvent cartridge 42 pass through the opening 46A when the developing cartridge 7 and the solvent cartridge 42 are attached to the main casing 46 (see FIG. 23). The opening 46A is positioned above the developing cartridge 7 and the solvent cartridge 42 in a state where the developing cartridge 7 and the solvent cartridge 42 are attached to the main casing 46.

The developing cartridge 7 and the solvent cartridge 42 are detachably attachable to the main casing 46 in a third direction. The third direction crosses the first direction and the second direction. Incidentally, the developing cartridge 7 and the solvent cartridge 42 those attached to the main casing 46 are detachable from the main casing 46 through the opening 46A.

The main casing 46 has one end portion 46E1 and another end portion 46E2 in the second direction. The other end portion 46E2 is positioned away from the one end portion 46E1 in the second direction. The applicator 9 is positioned at the one end portion 46E1 in the second direction of the main casing 46.

2. Cover 47

The cover 47 is positioned at the upper end portion of the main casing 46. The cover 47 includes the discharge tray 11. The cover 47 is positioned above the developing cartridge 7 and the solvent cartridge 42 in a state where the developing cartridge 7 and the solvent cartridge 42 are attached to the main casing 46. The cover 47 is movable between a closed position (see FIG. 22) and an open position (see FIG. 23). The cover 47 is pivotally movable about a cover axis 47A. The cover axis 47A extends in the first direction. The cover axis 47A is positioned at the one end portion 46E1 in the second direction of the main casing 46.

As illustrated in FIG. 22, the cover 47 extends in the second direction in a state where the cover 30 is at the closed position. The cover 47 closes the opening 46A in a state where the cover 47 is at the closed position.

On the other hand, as illustrated in FIG. 23, the cover 47 extends in the third direction in a state where the cover 47 is at the open position. The opening 46A is opened in a state where the cover is at the open position.

3. Drum Cartridge 48

As illustrated in FIGS. 22 and 23, the drum cartridge 48 is detachably attachable to the main casing 46 in the third direction in a state where the cover 47 is at the open position. Note that the drum cartridge 48 attached to the main casing 46 is detachable from the main casing 46 through the opening 46A.

The drum cartridge 48 includes the photosensitive drum 4 described above, the charging unit 5, and a drum frame 48A.

The drum frame 48A supports the photosensitive drum 4. The drum frame 48A can support the developing cartridge 7. The drum cartridge 48 is movable while the drum frame 48A supports the developing cartridge 7.

The developing cartridge 7 is detachably attachable to the drum frame 48A. A state where the developing cartridge 7 is attached to the drum frame 48A denotes a state where the developing cartridge 7 is supported by a certain position of the drum frame 48A. The developing cartridge 7 may be movable relative to the drum frame 48A in a state where the developing cartridge 7 is attached to the drum frame 48A.

As illustrated in FIG. 22, the developing cartridge 7 is attached to the main casing 46 in a state where the developing cartridge 7 is attached to the drum frame 48A and the drum cartridge 48 is attached to the main casing 46. Further, the developing cartridge 7 is detachable from the drum frame 48A in a state where the drum cartridge 48 is attached to the main casing 46 and the cover 47 is at the open position (see FIG. 23).

Further, in a state where the drum cartridge 48 is detached from the main casing 46, the developing cartridge 7 is detachable from the drum frame 48A as indicated by an imaginary line in FIG. 23.

As illustrated in FIG. 22, the solvent cartridge 42 is detachably attachable to the main casing 46 independently of the developing cartridge 7. The solvent cartridge 42 is detachably attachable to the main casing 46 independently of the drum cartridge 48. The solvent cartridge 42 attached to the main casing 46 is detachable from the main casing 46 through the opening 46A in a state where the cover 47 is at the open position (see FIG. 23).

The solvent cartridge 42 is positioned closer to the applicator 9 than the developing cartridge 7 is to the applicator 9 in a state where the developing cartridge 7 and the solvent cartridge 42 are attached to the main casing 46 and the cover 47 is at the closed position. Accordingly, the supply pipe 43 for connecting the solvent cartridge 42 and the applicator 9 to each other can be shortened.

Further, the cover axis 47A is positioned farther away from the solvent cartridge 42 than the applicator 9 is from the solvent cartridge 42 in the second direction in a state where the developing cartridge 7 and the solvent cartridge 42 are attached to the main casing 46. With this configuration, the solvent cartridge 42 is positioned on the opposite side of the applicator 9 from the cover axis 47A in the second direction in a state where the solvent cartridge 42 is attached to the main casing 46. Hence, in a state where the cover 47 is at the open position (see FIG. 23), the solvent cartridge 42 can be replaced easily.

4. Functions and Effects

According to the fourth embodiment, the solvent cartridge 42 that can accommodate therein the solvent can be replaced independently of the developing cartridge 7, as illustrated in FIG. 23.

Further, as illustrated in FIG. 22, the solvent cartridge 42 is positioned closer to the applicator 9 than the developing cartridge 7 is to the applicator 9 in a state where the developing cartridge 7 and the solvent cartridge 42 are attached to the main casing 46 and in a state where the cover 47 is at the closed position.

This arrangement can shorten the supply pipe 43 for connecting the solvent cartridge 42 and the applicator 9 to each other. Further, the user's hands can be suppressed from getting dirty with the solvent adhered to the solvent cartridge 42 during a process of attachment and detachment of the developing cartridge 7 to and from the main casing 46.

Further, the cover axis 47A is positioned at the one end portion 46E1 in the second direction of the main casing 46. The cover axis 47A is positioned farther from the solvent cartridge 42 than the applicator 9 is from the solvent cartridge 42 in the second direction in a state where the developing cartridge 7 and the solvent cartridge 42 are attached to the main casing 46.

Hence, the solvent cartridge 42 is positioned on the opposite side of the applicator 9 from the cover axis 47A in the second direction in a state where the solvent cartridge 42 is attached to the main casing 46. As a result, replacement of the solvent cartridge 42 can be performed easily in a state where the third opening 37 is at the open position.

5. Modifications

The image forming apparatus 1 may include a drawer. The drawer is movable between an interior position and an exterior position. The drawer is positioned inside the main casing 46 in a state where the drawer is at the interior position. The drawer is positioned outside the main casing 46 when the drawer is at the exterior position. The drawer is not detachable from the main casing 46. The developing cartridge 7 may be detachably attachable to the drawer in a state where the drawer is at the exterior position. The solvent cartridge 42 may be detachably attachable to the drawer independently of the developing cartridge 7 in a state where the drawer is at the exterior position.

Further, the developing cartridge 7 may include the photosensitive drum 4. The photosensitive drum 4 may be positioned between the applicator 9 and the cover 47 in the second direction in a state where the developing cartridge 7 and the solvent cartridge 42 are attached to the drawer, the drawer is at the interior position, and the cover 47 is at the closed position. The solvent cartridge 42 may be positioned closer to the applicator 9 than the photosensitive drum 4 is to the applicator 9 in the second direction in a state where the developing cartridge 7 and the solvent cartridge 42 are attached to the drawer, the drawer is at the interior position, and the cover 47 is at the closed position.

Note that, even in this modification, the solvent cartridge 42 is positioned closer to the applicator 9 than the developing cartridge 7 is to the applicator 9 in a state where the developing cartridge 7 and the solvent cartridge 42 are attached to the drawer and the drawer is at the interior position.

Further, the drum cartridge including the photosensitive drum 4 may be detachably attachable to the drawer independently of the developing cartridge 7.

Fifth Embodiment

Next, a fifth embodiment will be described with reference to FIGS. 24 through 28, wherein like parts and components are designated by the same reference numerals as those shown in the first embodiment to avoid duplicating description.

Figure 24:
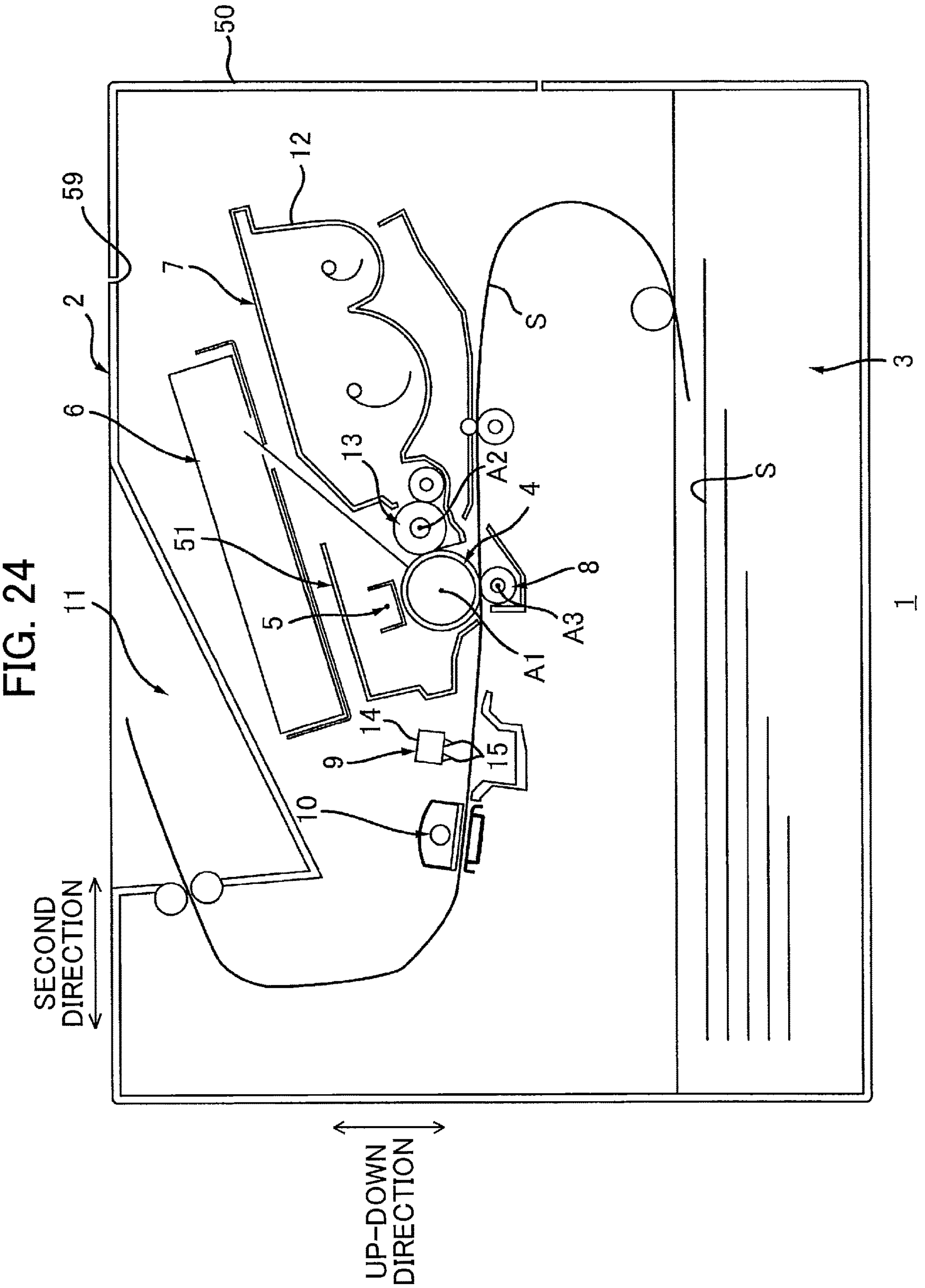
FIG. 24 is a schematic diagram illustrating a configuration of an image forming apparatus.
Figure 25:
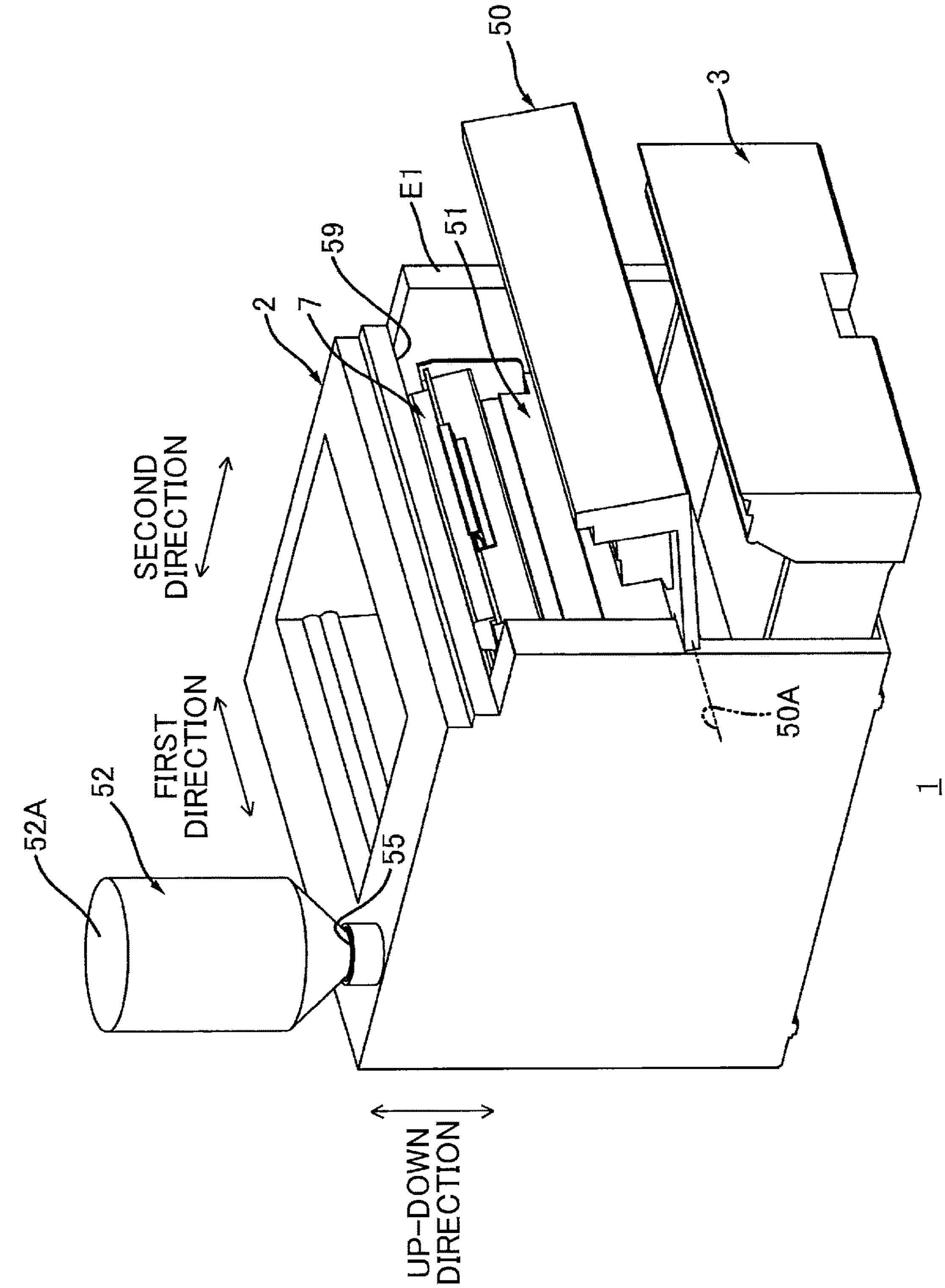
FIG. 25 is a perspective view of the image forming apparatus.
Figure 28:
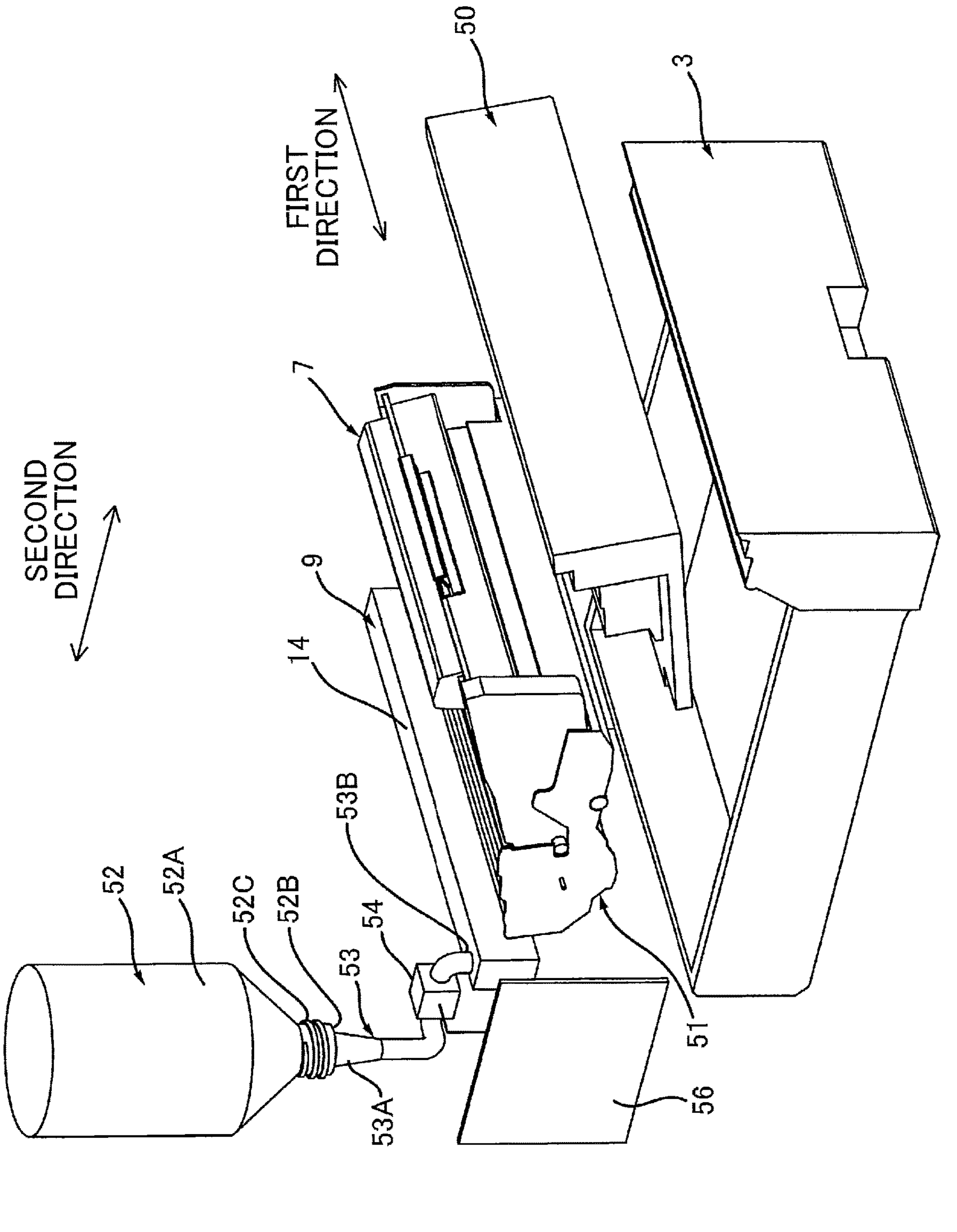
FIG. 28 is an explanatory view of a positional relationship among an applicator, a first circuit board, the solvent cartridge, a supply pipe, and a pump.

As illustrated in FIGS. 24 and 25, an image forming apparatus 1 according to the fifth embodiment includes the main casing 2 described above, a cover 50, a drum cartridge 51, a supply pipe 53 (see FIG. 28), a pump 54 (see FIG. 28), and a first circuit board 56 (see FIG. 28).

1. Details of Main Casing 2

Figure 26:
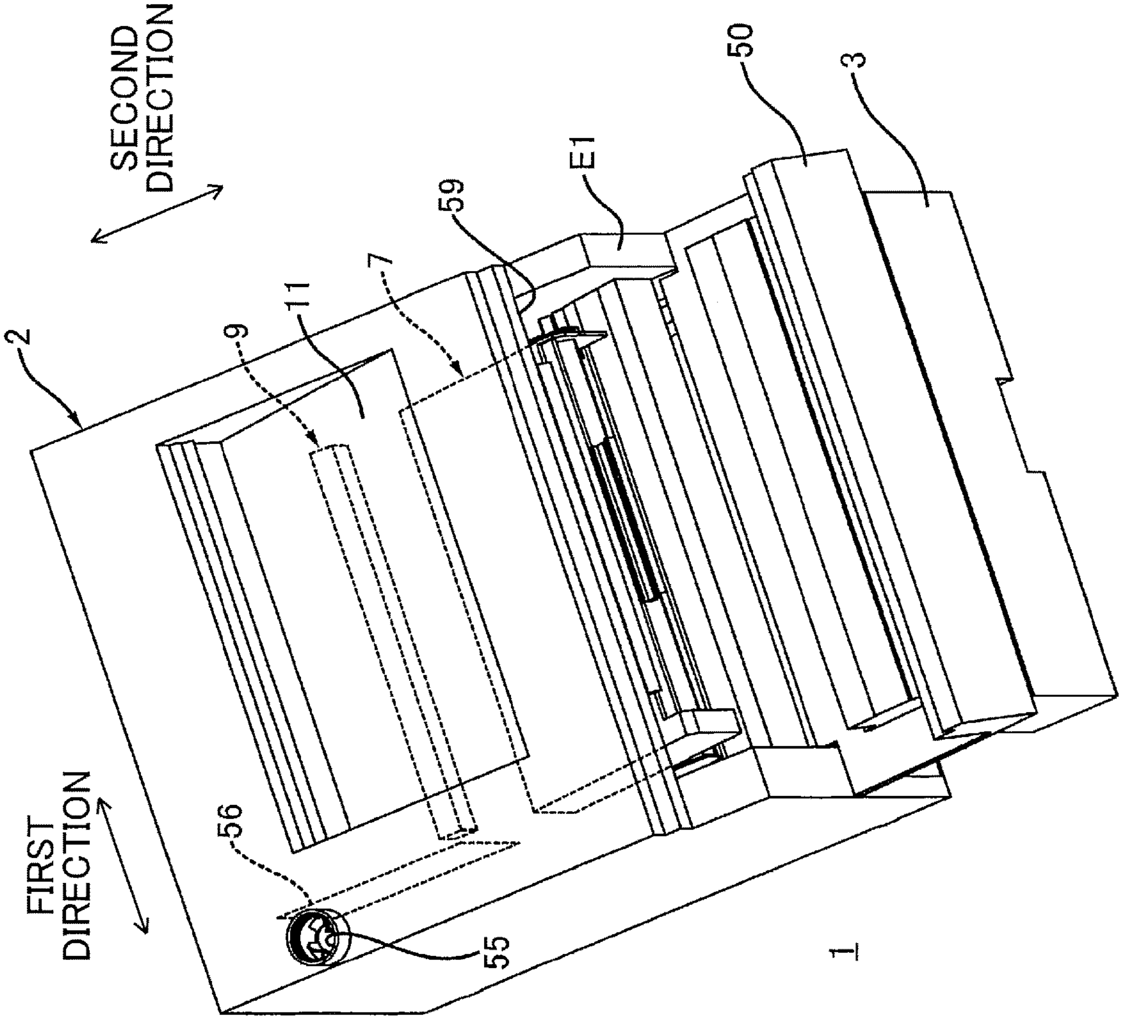
FIG. 26 is a perspective view of the image forming apparatus as viewed from an angle different from that in FIG. 24.

As illustrated in FIGS. 25 and 26, the main casing 2 has an opening 59 and an inlet port 55.

1.1 Opening 59

As illustrated in FIG. 25, the opening 59 is positioned at one end portion E1 in the second direction of the main casing 2. The second direction crosses the first direction. The developing cartridge 7 passes through the opening 59 when the developing cartridge 7 is attached to the main casing 2. Further, the drum cartridge 51 is also attachable to the main casing 2 through the opening 59. The developing cartridge 7 and the drum cartridge 51 are attachable to the main casing 2 in the second direction. Note that the developing cartridge 7 and the drum cartridge 51 those attached to the main casing 2 are detachable from the main casing 2 through the opening 59.

1.2 Inlet Port 55

In a state where a solvent cartridge 52 is attached to the main casing 2, the inlet port 55 allows solvent accommodated in the solvent cartridge 52 to be introduced into the main casing 2 therethrough. Specifically, the inlet port 55 allows the solvent accommodated in the solvent cartridge 52 to be introduced into the supply pipe 53 (see FIG. 28) therethrough in a state where the solvent cartridge 52 is connected to the inlet port 55. The inlet port 55 is in communication with an internal space of the supply pipe 53 (see FIG. 28).

As illustrated in FIG. 26, the inlet port 55 is positioned on an outer surface of the main casing 2. Specifically, the inlet port 55 is positioned on an upper surface of the main casing 2. The inlet port 55 is positioned away from the discharge tray 11 in the first direction. Further, the inlet port 55 is positioned away from the developing cartridge 7 in the first direction. Further, the inlet port 55 is positioned away from the applicator 9 in the first direction. Further, the inlet port 55 is positioned on the opposite side of the first circuit board 56 from the developing cartridge 7 in the first direction. In other words, the first circuit board 56 is positioned between the developing cartridge 7 and the inlet port 55 in the first direction.

The inlet port 55 is positioned away from the one end portion E1 of the main casing 2 in the second direction. The inlet port 55 is positioned on the opposite side of the developing cartridge 7 from the one end portion E1 of the main casing 2 in the second direction. The inlet port 55 is positioned on the opposite side of the applicator 9 from the developing cartridge 7 in the second direction.

1.3 Protrusion 57

Figure 27:
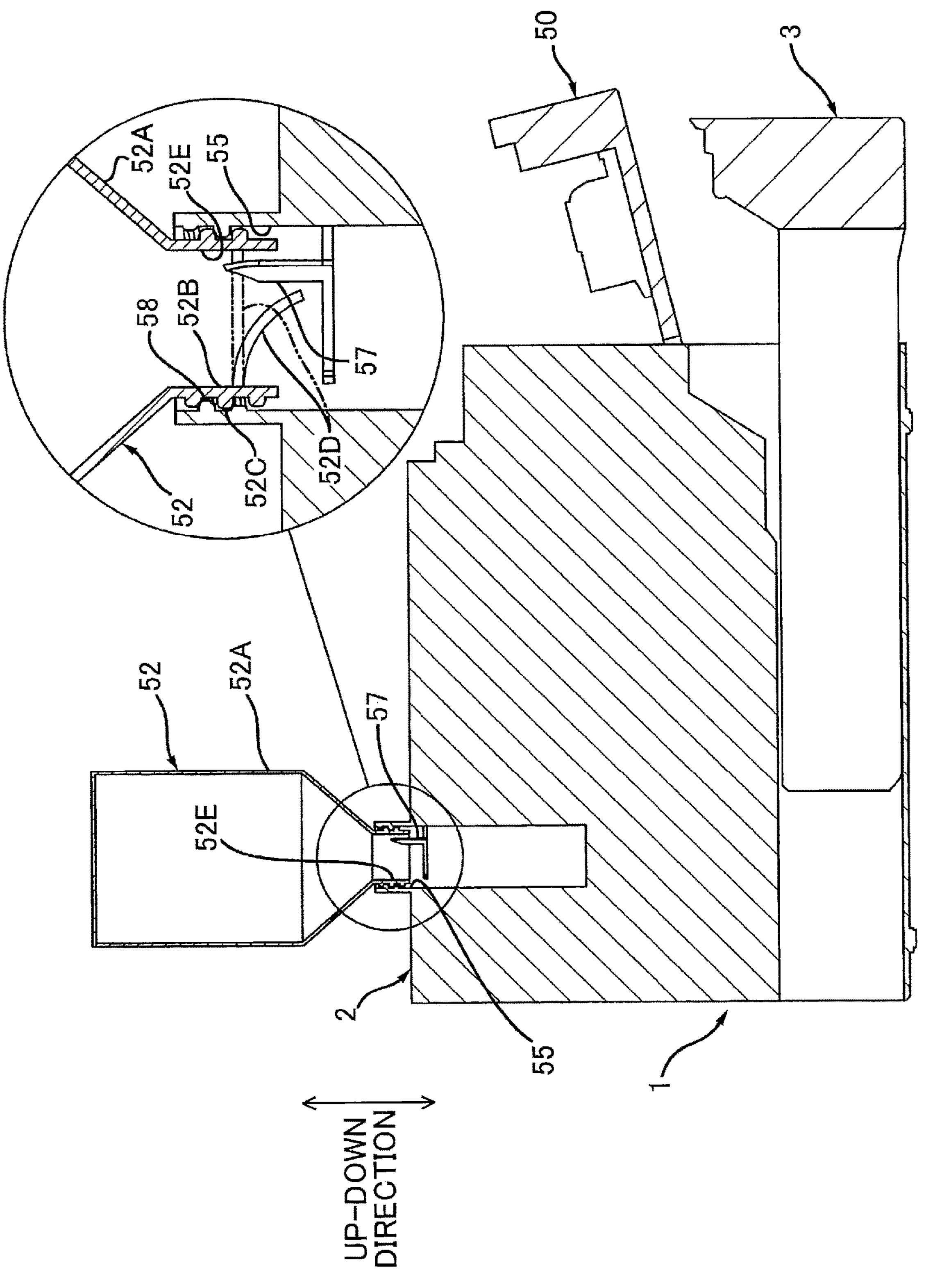
FIG. 27 is an explanatory view of a state where a solvent cartridge is connected to an inlet port.

As illustrated in FIG. 27, the main casing 2 includes a protrusion 57, and a second thread 58.

The protrusion 57 extends through a lid 52D in a state where the solvent cartridge 52 is connected to the inlet port 55. The lid 52D will be described later. The protrusion 57 is positioned within the inlet port 55. The protrusion 57 extends in the up-down direction. The protrusion 57 is positioned to be spaced apart from an inner peripheral surface of the inlet port 55.

1.4 Second Thread 58

The second thread 58 is in threading engagement with a first thread 52C in a state where the solvent cartridge 52 is connected to the inlet port 55. The first thread 52C will be described later. The second thread 58 is positioned on the inner peripheral surface of the inlet port 55.

2. Solvent Cartridge 52

The solvent cartridge 52 can be connected to the main casing 2. The solvent cartridge 52 can be connected to the main casing 2 independently of the developing cartridge 7 (see FIG. 24). The solvent cartridge 52 can be connected to the inlet port 55.

The main casing 2 is replenished with the solvent in a state where the solvent cartridge 52 is connected to the main casing 2. The solvent cartridge 52 is removed from the main casing 2 (see FIG. 26) upon completion of replenishment of the main casing 2 with the solvent. The image forming apparatus 1 can perform printing operation in a state where the solvent cartridge 52 is removed from the main casing 2.

The solvent cartridge 52 includes a solvent casing 52A, a sleeve 52B, the first thread 52C, and the lid 52D.

2.1 Solvent Casing 52A

The solvent casing 52A can accommodate therein solvent. In other words, the solvent is accommodated within the solvent cartridge 52. The solvent dissolves toner.

The solvent casing 52A is positioned outside the main casing 2 in a state where the solvent cartridge 52 is connected to the inlet port 55. The solvent casing 52A is positioned upward of the main casing 2 in a state where the solvent cartridge 52 is connected to the inlet port 55. The solvent casing 52A extends in the up-down direction in a state where the solvent cartridge 52 is connected to the inlet port 55. The solvent casing 52A has a discharge opening 52E. The discharge opening 52E allows the solvent to be discharged therethrough from the solvent casing 52A to the supply pipe 53 (see FIG. 28). The discharge opening 52E is positioned at a lower end portion of the solvent casing 52A in a state where the solvent cartridge 52 is connected to the inlet port 55.

2.2 Sleeve 52B

The sleeve 52B is positioned at an outer periphery of the discharge opening 52E. The sleeve 52B is inserted into the inlet port 55 in a state where the solvent cartridge 52 is connected to the inlet port 55.

2.3 First Thread 52C

The first thread 52C is in threading engagement with the second thread 58 in a state where the solvent cartridge 52 is connected to the inlet port 55. With this threading engagement, displacement of the discharge opening 52E of the solvent cartridge 52 relative to the inlet port 55 can be suppressed during replenishment for the solvent. As a result, stabilized replenishment of the main casing 2 with the solvent in the solvent cartridge 52 can be performed. The first thread 52C is positioned on an outer peripheral surface of the sleeve 52B. In other words, the sleeve 52B has the first thread 52C at the outer peripheral surface of the sleeve 52B.

2.4 Lid 52D

The lid 52D is positioned inside the discharge opening 52E. The lid 52D closes the discharge opening 52E as indicated by an imaginary line in FIG. 27 in a state prior to connection of the solvent cartridge 52 to the inlet port 55. The lid 52D is torn by the protrusion 57 as indicated by a solid line in FIG. 27 in a state where the solvent cartridge 52 is connected to the inlet port 55, thereby allowing the discharge opening 52E and the inlet port 55 to be in communication with each other.

3. Cover 50

As illustrated in FIG. 25, the cover 50 is positioned at one end portion E1 in the second direction of the main casing 2. The cover 50 is movable between a closed position (see FIG. 24) and an open position (see FIG. 25). The cover 50 is pivotally movable about a cover axis 50A. The cover axis 50A extends in the first direction.

As illustrated in FIG. 24, the cover 50 extends in the up-down direction in a state where the cover 50 is at the closed position. The cover 50 closes the opening 59 in a state where the cover 50 is at the closed position.

On the other hand, as illustrated in FIG. 25, the cover 50 extends in the second direction in a state where the cover 50 is at the open position. The opening 59 is opened when the cover 50 is at the open position.

4. Drum Cartridge 51

As illustrated in FIG. 24, the drum cartridge 51 is detachably attachable to the main casing 2. In other words, the drum cartridge 51 is detachably attachable to the image forming apparatus 1. The drum cartridge 51 includes the above-described photosensitive drum 4, the above-described charging unit 5, and the transfer unit 8. Note that the main casing 2 may include the transfer unit 8.

Further, the developing cartridge 7 is detachably attachable to the drum cartridge 51. The developing cartridge 7 is attachable to the main casing 2 in a state where the developing cartridge 7 is attached to the drum cartridge 51.

5. Supply Pipe 53

The supply pipe 53 is positioned inside the main casing 2 (see FIG. 24), as illustrated in FIG. 28. The supply pipe 53 has one end portion 53A and another end portion 53B. The one end portion 53A is connected to the inlet port 55 (see FIG. 27) of the main casing 2. The other end portion 53B is positioned away from the one end portion 53A. The other end portion 53B is connected to the applicator casing 14 of the applicator 9.

6. Pump 54

The pump 54 is positioned between the one end portion 53A and the other end portion 53B of the supply pipe 53. The pump 54 pumps the solvent from the solvent cartridge 52 to the applicator 9. When the pump 54 is driven in a state where the solvent cartridge 52 is connected to the main casing 2, the solvent accommodated in the solvent cartridge 52 is introduced into the applicator casing 14 of the applicator 9 through the inlet port 55 and the supply pipe 53. Specifically, the pump 54 is a gear pump.

7. First Circuit Board 56

The first circuit board 56 is positioned inside the main casing 2 (see FIG. 24). The first circuit board 56 extends in the second direction. The first circuit board 56 is positioned juxtaposed with the applicator 9 in the first direction. The first circuit board 56 is electrically connected to the pump 54. Specifically, the first circuit board 56 is a control circuit board. The first circuit board 56 controls the pump 54.

8. Functions and Effects

According to the image forming apparatus 1, as illustrated in FIG. 25, the solvent cartridge 52 is positioned outside the main casing 2 in a state where the solvent cartridge 52 is connected to the main casing 2. Further, the inlet port 55 of the main casing 2 allows the solvent accommodated in the solvent cartridge 52 to enter the main casing 2 therethrough in a state where the solvent cartridge 52 is connected to the main casing 2.

Accordingly, the replenishment of the main casing 2 with the solvent accommodated in the solvent cartridge 52 can be performed from an outside of the main casing 2 through the inlet port 55. As a result, the applicator 9 can be replenished with the solvent (see FIG. 28). Accordingly, the image forming apparatus 1 can be made compact in comparison with a configuration where the solvent cartridge 52 is accommodated inside the main casing 2.

Further, the inlet port 55 is positioned on the upper surface of the main casing 2. Hence, the solvent casing 52A is positioned upward of the main casing 2 in a state where the solvent cartridge 52 is connected to the main casing 2. As a result, the solvent can flow smoothly from the solvent cartridge 52 into the main casing 2 by making use of a gravitational force.

Further, the first thread 52C of the solvent cartridge 52 is in threading engagement with the second thread 58 of the main casing 2 in a state where the solvent cartridge 52 is connected to the main casing 2, as illustrated in FIG. 17. Therefore, displacement of the discharge opening 52E of the solvent cartridge 52 from the inlet port 55 during the replenishment for the solvent can be suppressed. As a result, the replenishment of the main casing 2 with the solvent from the solvent cartridge 52 can be performed stably.

9. Modifications (1) The image forming apparatus 1 may be able to perform printing operations while the solvent cartridge 52 is connected to the main casing 2.

(2) The inlet port 55 may be positioned at a side surface of the main casing 2.

Sixth Embodiment

Next, a sixth embodiment will be described with reference to FIGS. 29 through 33, wherein like parts and components are designated by the same reference numerals as those shown in the first embodiment to avoid duplicating description.

1. Drum Cartridge 60

Figure 29:
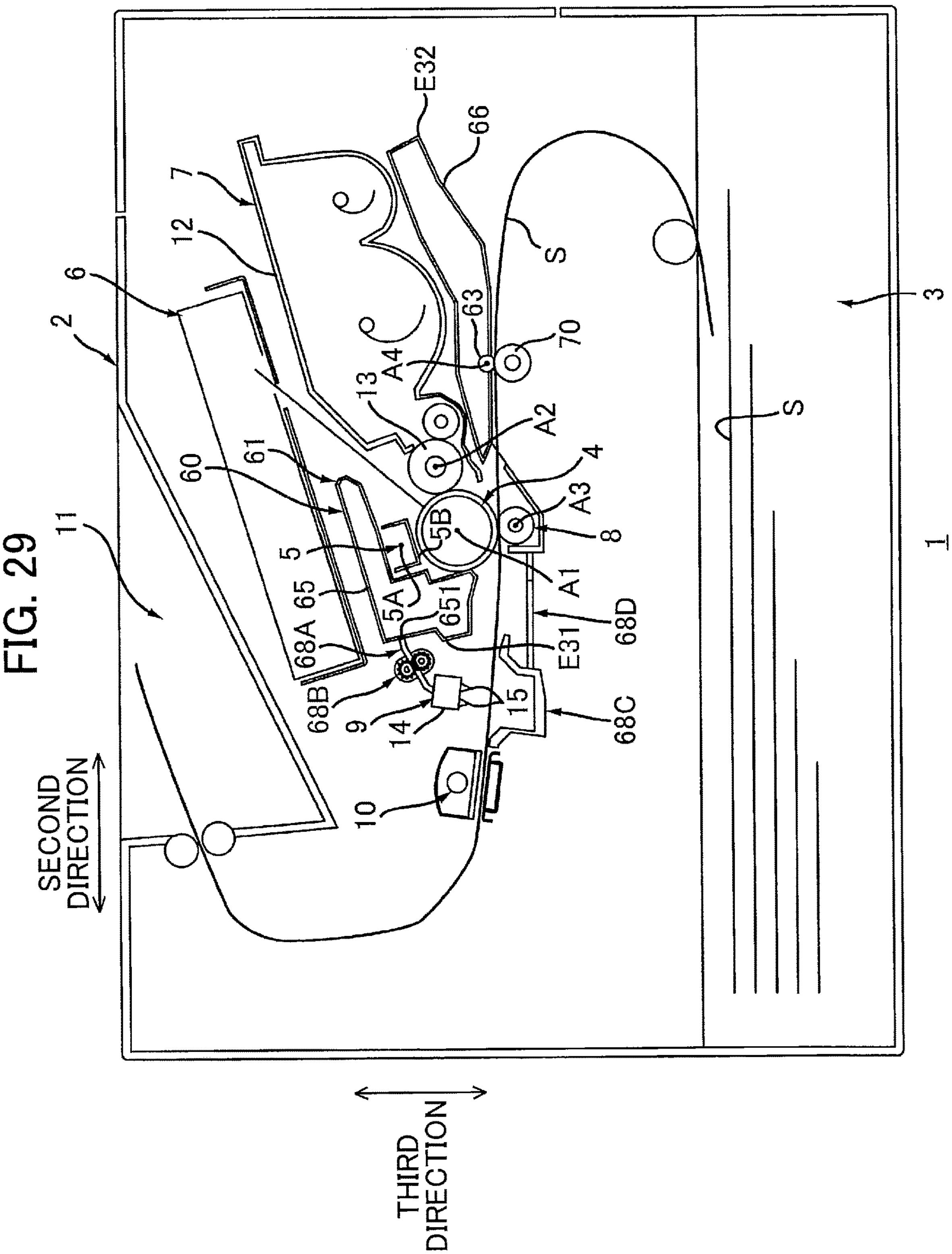
FIG. 29 is a schematic diagram illustrating a configuration of an image forming apparatus.
Figure 30:
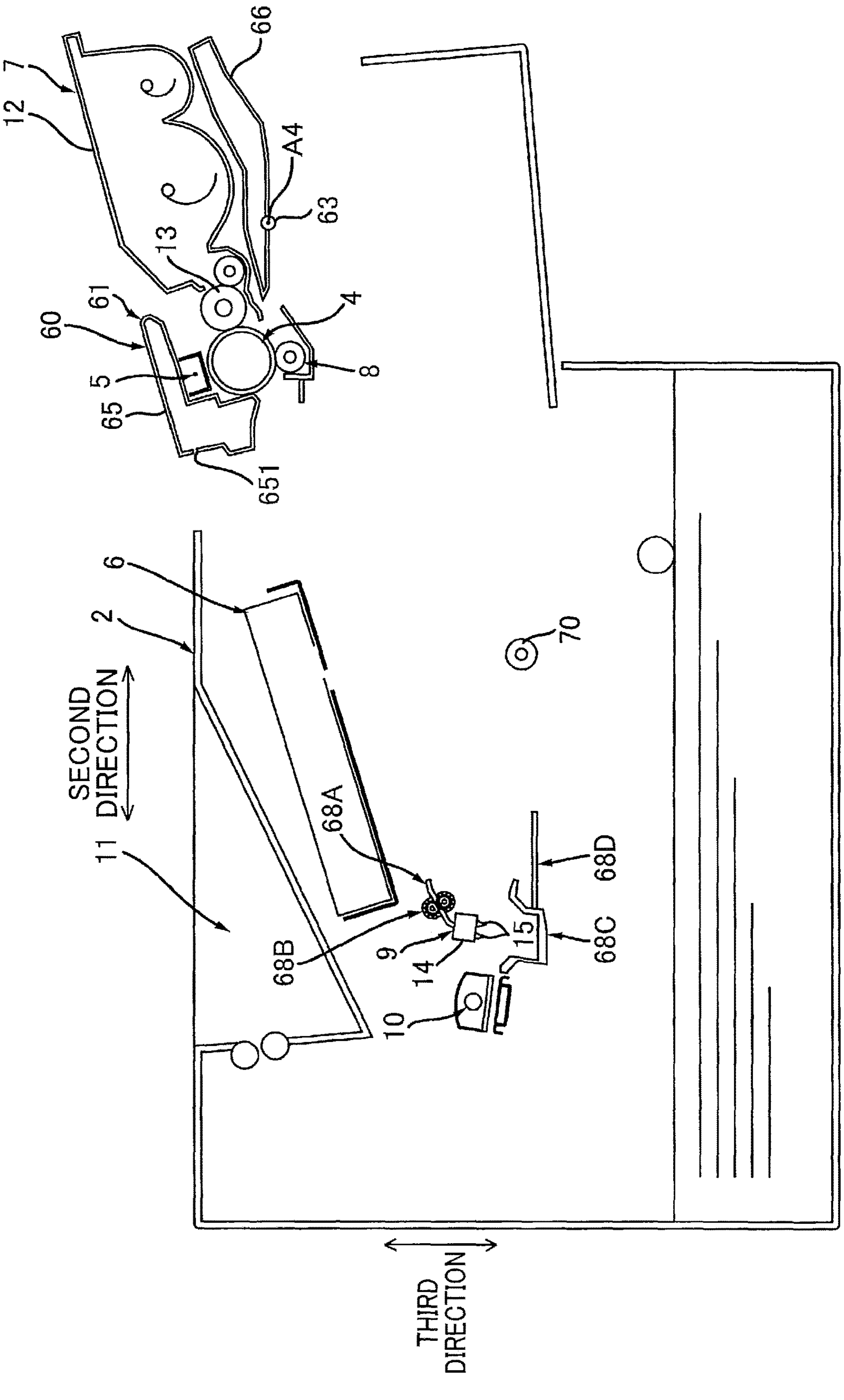
FIG. 30 is an explanatory view illustrating a state where a drum cartridge is detached from a main casing.

As illustrated in FIG. 29, an image forming apparatus 1 according to the sixth embodiment includes a drum cartridge 60. As illustrated in FIGS. 29 and 30. the drum cartridge 60 is detachably attachable to the main casing 2. In other words, the drum cartridge 60 is detachably attachable to the image forming apparatus 1.

The drum cartridge 60 includes the photosensitive drum 4, the charging unit 5, the transfer unit 8, a drum frame 61 (see FIG. 31), a charge electrode 62A (see FIG. 32), a charge electrode 62B (see FIG. 32), a transfer electrode 62C (see FIG. 33), and a sheet conveying roller 63 (see FIG. 29). Note that the main casing 2 may include the transfer unit 8 and the sheet conveying roller 63.

1.1 Drum Frame 61

Figure 31:
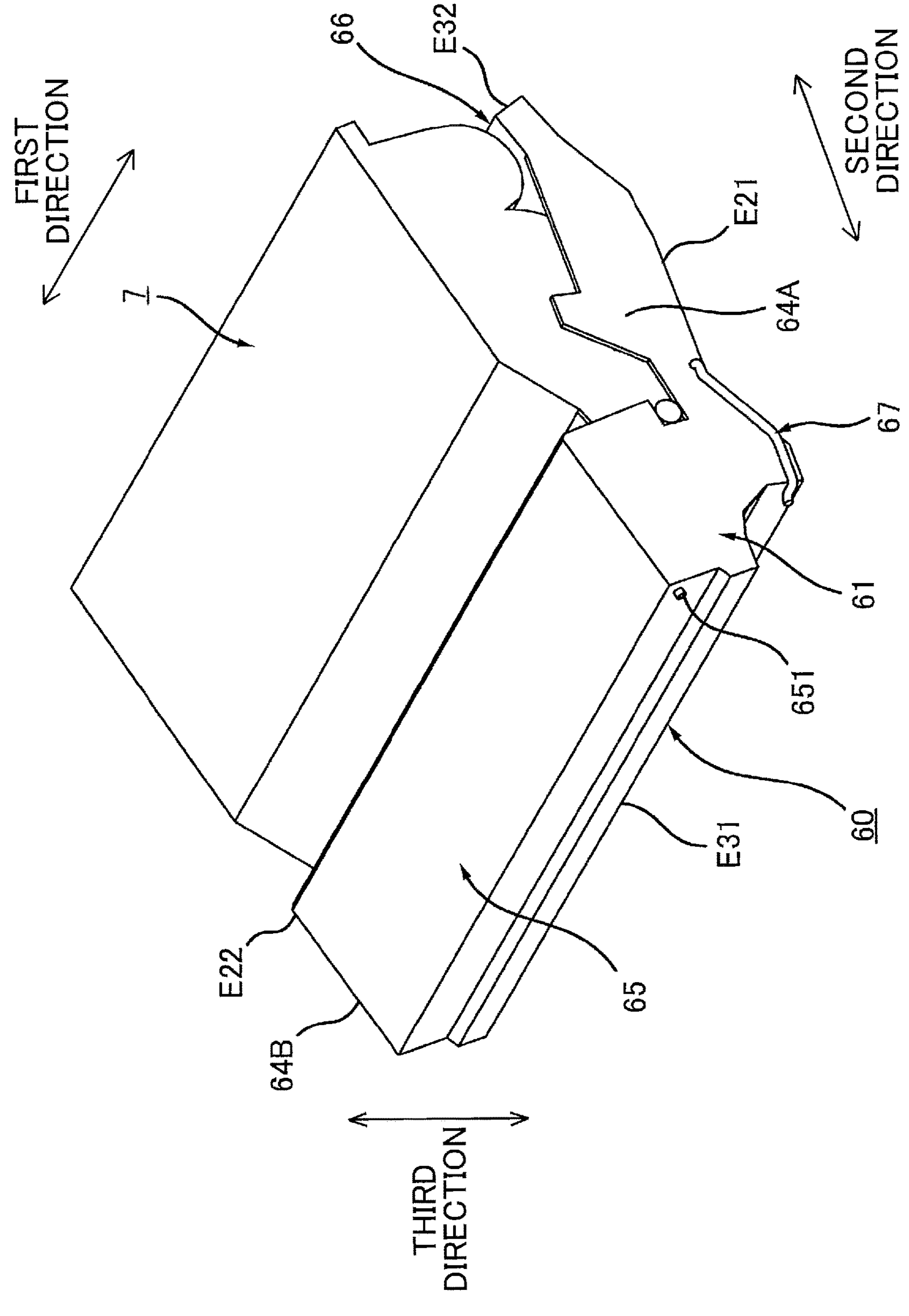
FIG. 31 is a perspective view of the drum cartridge.

The drum frame 61 illustrated in FIG. 31 supports the photosensitive drum 4, the charging unit 5, and the transfer unit 8. The developing cartridge 7 is detachably attachable to the drum frame 61. In other words, the developing cartridge 7 is detachably attachable to the drum cartridge 60. The developing cartridge 7 is attachable to the main casing 2 (see FIG. 29) in a state where the developing cartridge 7 is attached to the drum cartridge 60. That is, the applicator 9 (see FIG. 29) described above applies solvent to toner that has been transferred to the sheet S in a state where the drum cartridge 60 and the developing cartridge 7 are attached to the main casing 2.

The drum frame 61 extends in the first direction and the second direction. The second direction crosses the first direction. Preferably, the second direction is perpendicular to the first direction. More preferably, the second direction is perpendicular to both the first direction and the third direction in a state where the drum cartridge 60 is attached to the main casing 2. The drum frame 61 has one end portion E21 and another end portion E22 in the first direction. The drum frame 61 has one end portion E31 and another end portion E32 in the second direction. The developing cartridge 7 is positioned at the other end portion E32 in the second direction of the drum frame 61 in a state where the developing cartridge 7 is attached to the drum frame 61.

The drum frame 61 includes a side plate 64A, a side plate 64B, a solvent casing 65, a waste solvent casing 66, and a tube 67. In other words, the drum cartridge 60 includes the solvent casing 65, the waste solvent casing 66, and the tube 67.

1.1.1 Side Plate 64A and Side Plate 64B

The side plate 64A is positioned at the one end portion E21 in the first direction of the drum frame 61. The side plate 64A extends in the second direction.

Figure 32:
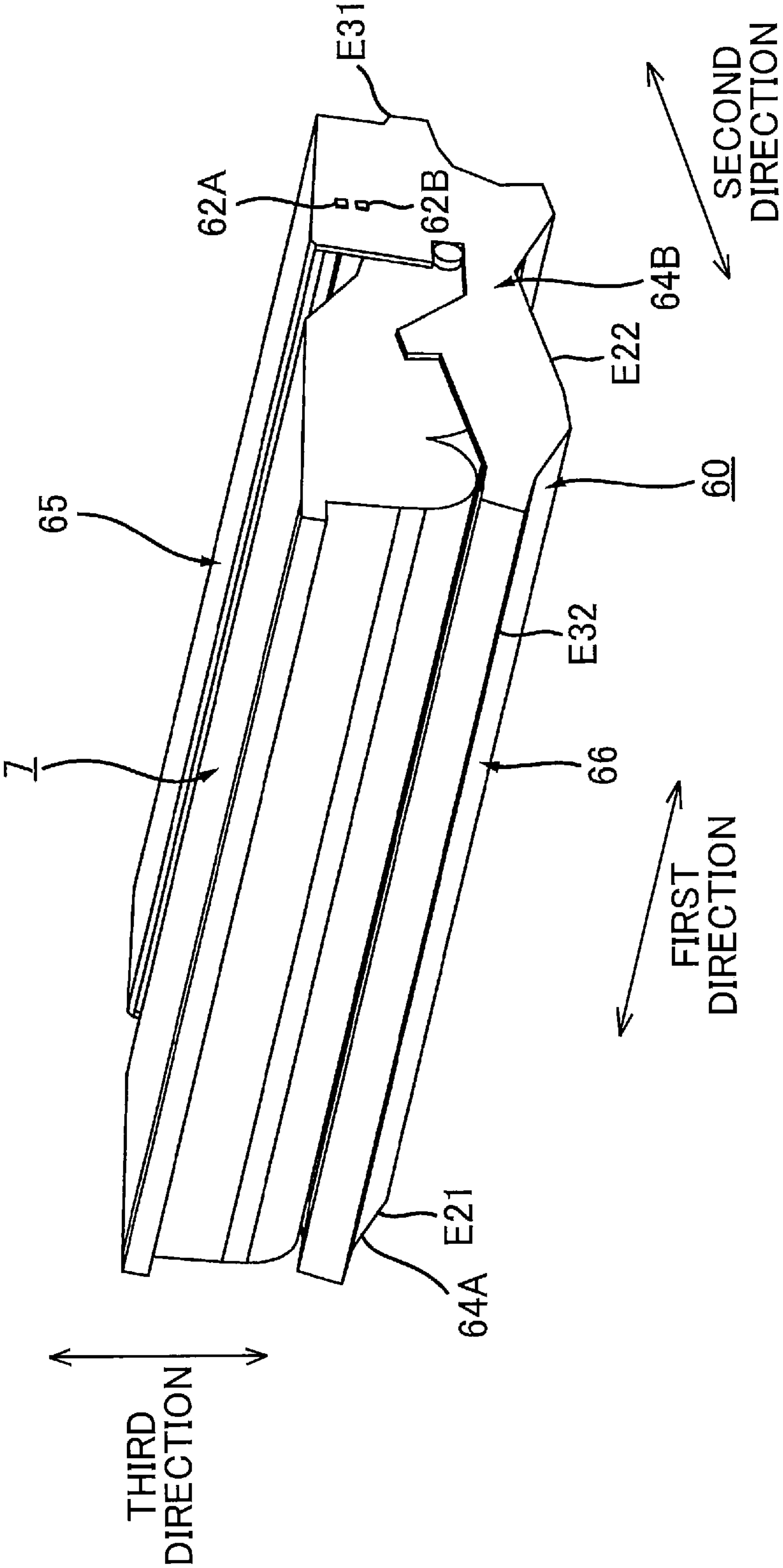
FIG. 32 is a perspective view of the drum cartridge as viewed from an angle different from that in FIG. 31.

The side plate 64B is positioned to be spaced apart from the side plate 64A in the first direction. The side plate 64B is positioned at the other end portion E22 in the first direction of the drum frame 61. As illustrated in FIG. 32, the side plate 64B extends in the second direction.

1.1.2 Solvent Casing 65

As illustrated in FIG. 29, the solvent casing 65 is positioned at the one end portion E31 in the second direction of the drum frame 61. In a state where the developing cartridge 7 is attached to the drum frame 61, at least a portion of the solvent casing 65 is positioned on the opposite side of the photosensitive drum 4 from the developing cartridge 7 in the second direction. In other words, in a state where the developing cartridge 7 is attached to the drum frame 61, the photosensitive drum 4 is positioned between the solvent casing 65 and the developing cartridge 7 in the second direction. In a state where the drum cartridge 60 is attached to the main casing 2 of the image forming apparatus 1, at least a portion of the solvent casing 65 is positioned between the photosensitive drum 4 and the applicator 9 in the second direction.

At least a portion of the solvent casing 65 is positioned on the opposite side of the photosensitive drum 4 from the transfer unit 8 in the third direction. The third direction crosses the first direction and the second direction. Preferably, the third direction is perpendicular to both the first direction and the second direction. Specifically, the third direction is a direction defined by connecting the drum axis A1 and the transfer axis A3 to each other. In the present embodiment, the third direction is inclined with respect to the up-down direction in a state where the drum cartridge 60 is attached to the main casing 2. Note that the third direction may be parallel to the up-down direction in a state where the drum cartridge 60 is attached to the main casing 2. At least a portion of the solvent casing 65 is spaced apart from the photosensitive drum 4 in the third direction. The charging unit 5 is positioned between at least a portion of the solvent casing 65 and the photosensitive drum 4 in the third direction. At least a portion of the solvent casing 65 is positioned upward of the photosensitive drum 4 in a state where the drum cartridge 60 is attached to the main casing 2.

As illustrated in FIG. 31, the solvent casing 65 is positioned between the side plate 64A and the side plate 64B in the first direction. The solvent casing 65 extends in the first direction. The solvent casing 65 has one end portion in the first direction connected to the side plate 64A. The solvent casing 65 has another end portion in the first direction connected to the side plate 64B. The solvent casing 65 can accommodate therein solvent. The solvent casing 65 has a discharge opening 651.

The discharge opening 651 is positioned at the one end portion in the first direction of the solvent casing 65. The discharge opening 651 allows the solvent accommodated in the solvent casing 65 to be discharged therethrough.

1.1.3 Waste Solvent Casing 66

As illustrated in FIG. 29, the waste solvent casing 66 is positioned at the other end portion E32 in the second direction of the drum frame 61. The waste solvent casing 66 is positioned on the opposite side of the photosensitive drum 4 from the solvent casing 65 in the second direction. In other words, the photosensitive drum 4 is positioned between the solvent casing 65 and the waste solvent casing 66 in the second direction.

The waste solvent casing 66 is positioned on the opposite side of the photosensitive drum 4 from the charging unit 5 in the third direction. The waste solvent casing 66 is positioned downward of the developing cartridge 7 in a state where the developing cartridge 7 and the drum frame 61 are attached to the main casing 2. The waste solvent casing 66 supports the developing cartridge 7 in a state where the developing cartridge 7 is attached to the drum frame 61.

As illustrated in FIG. 32, the waste solvent casing 66 is positioned between the side plate 64A and the side plate 64B in the first direction. The waste solvent casing 66 extends in the first direction. The waste solvent casing 66 has one end portion in the first direction connected to the side plate 64A. The waste solvent casing 66 has another end portion in the first direction connected to the side plate 64B. The waste solvent casing 66 can accommodate therein waste solvent. The waste solvent will be described later.

1.1.4 Tube 67

As illustrated in FIG. 31, the tube 67 is positioned at the one end portion E21 in the first direction of the drum frame 61. The tube 67 extends in the second direction. The tube 67 has one end portion in the second direction connected to the waste solvent casing 66.

Figure 33:
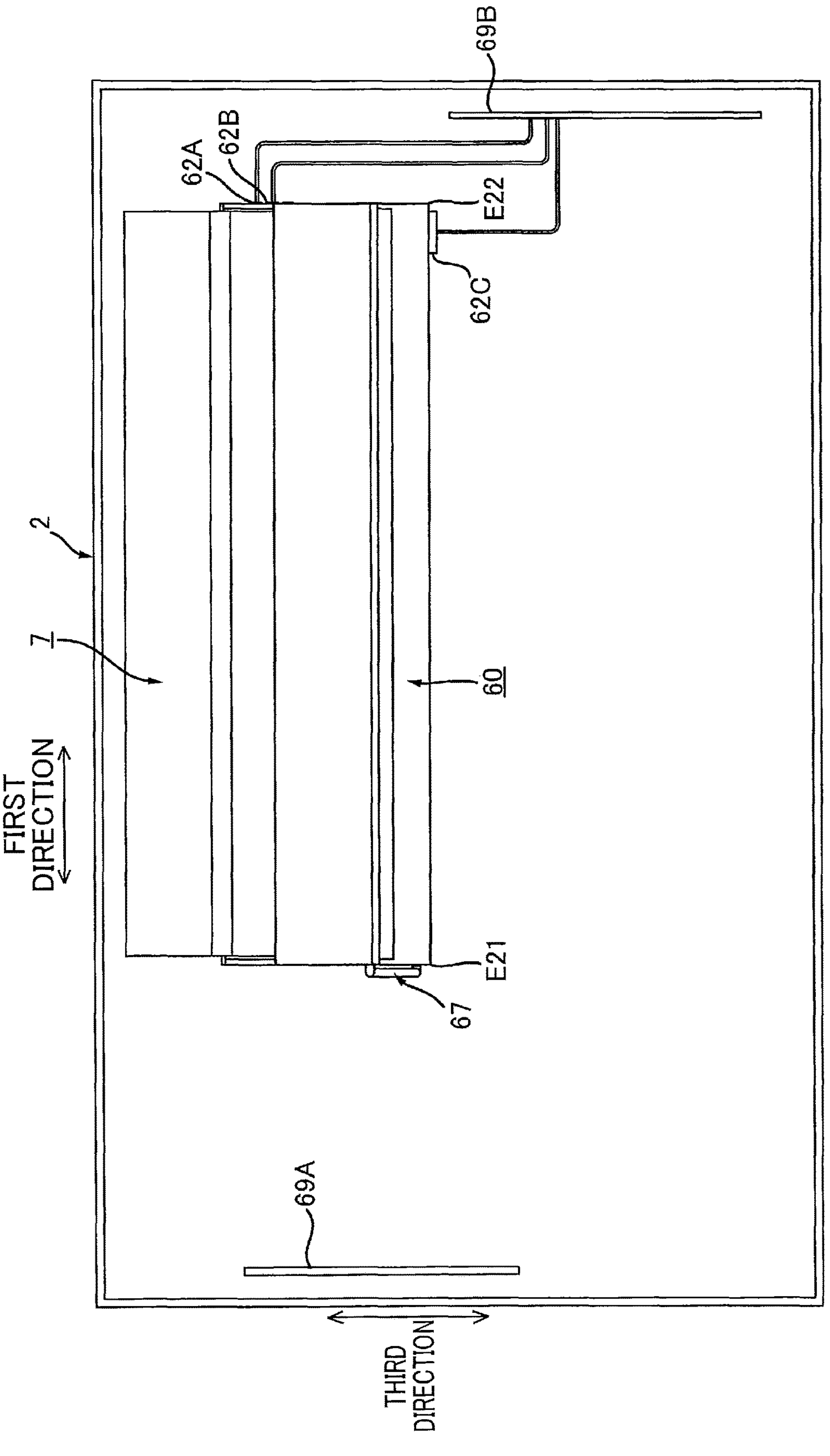
FIG. 33 is an explanatory view of a positional relationship among the drum cartridge attached to the main casing, a first circuit board, and a second circuit board.

1.2 Charge Electrode 62A, Charge Electrode 62B, and Transfer Electrode 62C As illustrated in FIGS. 32 and 33, the charge electrode 62A, the charge electrode 62B, and the transfer electrode 62C are positioned at the other end portion E22 in the first direction of the drum frame 61. The charge electrode 62A, the charge electrode 62B, and the transfer electrode 62C are positioned away from the tube 67 in the first direction. The charge electrode 62A, the charge electrode 62B, and the transfer electrode 62C are positioned on the opposite side of the solvent casing 65 from the tube 67 in the first direction. In other words, the solvent casing 65 is positioned between the charge electrode 62A, the charge electrode 62B, and the transfer electrode 62C, and the tube 67 in the first direction. The charge electrode 62A, the charge electrode 62B, and the transfer electrode 62C are mounted on the side plate 64B. The charge electrode 62A and the charge electrode 62B are electrically connected to the charging unit 5. Specifically, the charging unit 5 includes a wire 5A (see FIG. 29), and a grid 5B (see FIG. 29). The charge electrode 62A is electrically connected to the wire 5A. The charge electrode 62B is electrically connected to the grid 5B. The transfer electrode 62C is electrically connected to the transfer unit 8.

1.3 Sheet Conveying Roller 63

As illustrated in FIG. 29, the sheet conveying roller 63 conveys the sheet S toward the photosensitive drum 4 and the transfer unit 8 in a state where the drum cartridge 60 is attached to the main casing 2. Specifically, the sheet conveying roller 63 makes contact with a sheet conveying roller 70 of the main casing 2 in a state where the drum cartridge 60 is attached to the main casing 2. The sheet conveying roller 70 of the main casing 2 will be described later. The sheet conveying roller 63 can convey the sheet S in cooperation with the sheet conveying roller 70 in a state where the drum cartridge 60 is attached to the main casing 2. Note that the sheet conveying roller 63 is in separation from the sheet conveying roller 70 in a state where the drum cartridge 60 is detached from the main casing 2, as illustrated in FIG. 30. The sheet conveying roller 63 extends in the first direction. The sheet conveying roller 63 is rotatable about a conveying axis A4. The conveying axis A4 extends in the first direction. The sheet conveying roller 63 is mounted on the waste solvent casing 66. In other words, the waste solvent casing 66 supports the sheet conveying roller 63. The sheet conveying roller 63 is positioned on the opposite side of the waste solvent casing 66 from the developing cartridge 7 in the third direction in a state where the developing cartridge 7 is attached to the drum frame 61.

2. Details of Main Casing 2

Details of the main casing 2 will next be described with reference to FIGS. 29 and 33.

The main casing 2 includes a supply pipe 68A (see FIG. 29), a pump 68B (see FIG. 29), a waste solvent tray 68C (see FIG. 29), a discharge pipe 68D (see FIG. 29), a first circuit board 69A (see FIG. 33), a second circuit board 69B (see FIG. 33), and the sheet conveying roller 70 (see FIG. 29).

2.1 Supply Pipe 68A

As illustrated in FIG. 29, the supply pipe 68A supplies solvent to the applicator 9. The supply pipe 68A has one end portion and another end portion. The one end portion of the supply pipe 68A is connected to the discharge opening 651 (see FIG. 31) of the drum cartridge 60 in a state where the drum cartridge 60 is attached to the main casing 2. The other end portion of the supply pipe 68A is positioned away from the one end portion of the supply pipe 68A. The other end portion of the supply pipe 68A is connected to the applicator casing 14 of the applicator 9.

2.2 Pump 68B

The pump 68B is positioned between the one end portion and the other end portion of the supply pipe 68A. The pump 68B pumps the solvent from the solvent casing 65 to the applicator 9. When the pump 68B is driven in a state where the drum cartridge 60 is attached to the main casing 2, the solvent accommodated in the solvent casing 65 is introduced into the applicator casing 14 of the applicator 9 through the discharge opening 651 and the supply pipe 68A. The solvent entered the applicator casing 14 is sprayed through the nozzles 15 onto the toner that has been transferred to the sheet S from the photosensitive drum 4. The sprayed solvent dissolves the toner on the sheet S. Specifically, the pump 68B is a gear pump.

2.3 Waste Solvent Tray 68C

The waste solvent tray 68C is positioned below the applicator 9. The waste solvent tray 68C is positioned to be spaced apart from the applicator 9. The sheet S on which toner has been transferred passes through a space between the applicator 9 and the waste solvent tray 68C. The waste solvent tray 68C accommodates therein the waste solvent. The waste solvent is solvent discharged from the applicator 9 but not applied to the sheet S. For example, in a case where printing operations are continuously performed on a first sheet S and a second sheet S subsequent to the first sheet S, solvent discharged from the applicator 9 to an interval between the first sheet S and the second sheet S is not applied to either of the first sheet S and the second sheet S, but is accommodated in the waste solvent tray 68C as the waste solvent. Further, in a case where a width in the first direction of the sheet S is smaller than a range in which the solvent is applied in the first direction, the solvent discharged from the applicator 9 is not applied to the sheet S but is accommodated in the waste solvent tray 68C as the waste solvent.

2.4 Discharge Pipe 68D

The discharge pipe 68D discharges the waste solvent from the applicator 9. The discharge pipe 68D has one end portion and another end portion. In a state where the drum cartridge 60 is attached to the main casing 2, the one end portion of the discharge pipe 68D is connected to the other end portion in the second direction of the tube 67 (see FIG. 31). The other end portion of the discharge pipe 68D is positioned away from the one end portion of the discharge pipe 68D. The other end portion of the discharge pipe 68D is connected to the waste solvent tray 68C. In a state where the drum cartridge 60 is attached to the main casing 2, the waste solvent in the waste solvent tray 68C enters the waste solvent casing 66 through the discharge pipe 68D and the tube 67.

2.5 First Circuit Board 69A

As illustrated in FIG. 33, the first circuit board 69A is positioned at one end portion in the first direction of the main casing 2. In a state where the drum cartridge 60 is attached to the main casing 2, the first circuit board 69A is positioned to be spaced apart from the drum cartridge 60 in the first direction. In a state where the drum cartridge 60 is attached to the main casing 2, the first circuit board 69A is positioned on the opposite side of the one end portion E21 of the drum frame 61 from the other end portion E22 of the drum frame 61 in the first direction. The first circuit board 69A is electrically connected to the pump 68B (see FIG. 29). Specifically, the first circuit board 69A is a control circuit board. The first circuit board 69A controls the pump 68B.

2.6 Second Circuit Board 69B

The second circuit board 69B is positioned to be spaced apart from the first circuit board 69A in the first direction. In a state where the drum cartridge 60 is attached to the main casing 2, the second circuit board 69B is positioned on the opposite side of the drum cartridge 60 from the first circuit board 69A in the first direction. In other words, the drum cartridge 60 is positioned between the first circuit board 69A and the second circuit board 69B in the first direction. In a state where the drum cartridge 60 is attached to the main casing 2, the second circuit board 69B is electrically connected to the charge electrode 62A, the charge electrode 62B, and the transfer electrode 62C. The second circuit board 69B applies a voltage to the wire 5A of the charging unit 5, the grid 5B of the charging unit 5, and the transfer unit 8. Further, the second circuit board 69B is electrically connected to the applicator 9. The second circuit board 69B supplies electric power to the applicator 9.

2.7 Sheet Conveying Roller 70

As illustrated in FIG. 29, the sheet conveying roller 70 is positioned below the sheet conveying roller 63 in a state where the drum cartridge 60 is attached to the main casing 2. The sheet conveying roller 70 makes contact with the sheet conveying roller 63 in a state where the drum cartridge 60 is attached to the main casing 2. The sheet conveying roller 70 can convey sheet S in cooperation with the sheet conveying roller 63 in a state where the drum cartridge 60 is attached to the main casing 2.

3. Functions and Effects (1) According to the drum cartridge 60, as illustrated in FIG. 29, solvent can be accommodated in the solvent casing 65. Accordingly, the solvent can be supplied when replacement of the drum cartridge 60 is performed.

(2) According to the drum cartridge 60, as illustrated in FIG. 29, at least a portion of the solvent casing 65 is positioned between the photosensitive drum 4 and the applicator 9 in the second direction in a state where the drum cartridge 60 is attached to the main casing 2.

With this arrangement, in a state where the drum cartridge 60 is attached to the main casing 2, at least a portion of the solvent casing 65 is positioned close to the applicator 9.

As a result, the supply pipe 68A for supplying the solvent from the solvent casing 65 to the applicator 9 can be shortened, thereby restraining complication of a piping arrangement from the solvent casing 65 to the applicator 9.

Further, enlargement of a capacity of the solvent casing 65 can be achieved by making use of a space between the photosensitive drum 4 and the applicator 9.

(3) According to the drum cartridge 60, as illustrated in FIG. 29, waste solvent can be accommodated in the waste solvent casing 66. Accordingly, the waste solvent can be collected when the drum cartridge 60 is replaced.

(4) According to the drum cartridge 60, as illustrated in FIGS. 32 and 33, the charge electrode 62A is positioned on the opposite side of the solvent casing 65 in the first direction from the tube 67 (see FIG. 31) through which the waste solvent flows.

Hence, the charge electrode 62A can be restrained from getting dirty with the waste solvent even if leakage of the waste solvent from the tube 67 occurs.

(5) According to the drum cartridge 60, as illustrated in FIGS. 32 and 33, the transfer electrode 62C is positioned on the opposite side of the solvent casing 65 in the first direction from the tube 67 (see FIG. 31) through which the waste solvent flows.

With this positional relationship, the transfer electrode 62C can be restrained from getting dirty with the waste solvent even if leakage of the waste solvent from the tube 67 occurs.

Seventh Embodiment

Next, a seventh embodiment will be described with reference to FIGS. 34 through 38, wherein like parts and components are designated by the same reference numerals as those shown in the first embodiment to avoid duplicating description.

1. Details of Developing Cartridge 7

Figure 35:
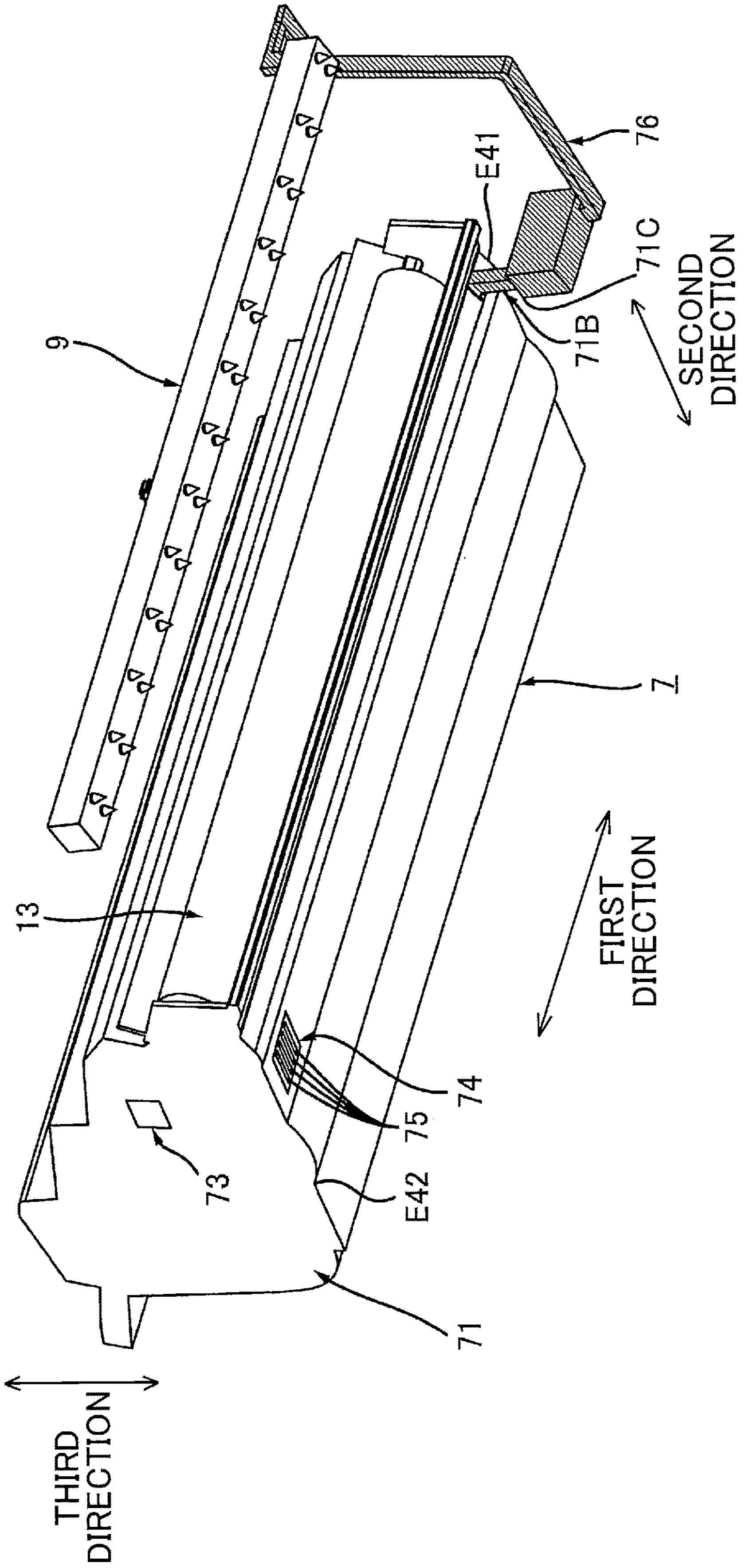
FIG. 35 is a perspective view of a developing cartridge and an applicator.

As illustrated in FIG. 35, a developing cartridge 7 according to the seventh embodiment extends in the first direction. The developing cartridge 7 has one end portion E41 and another end portion E42 in the first direction.

The developing cartridge 7 includes a casing 71, an agitator 72 (see FIG. 34), a developing electrode 73, a storage medium 74, and a plurality of electrical contact surfaces 75.

1.1 Casing 71

The casing 71 extends in the first direction and the second direction. The second direction crosses the first direction. Preferably, the second direction is perpendicular to the first direction. Specifically, the second direction is a direction defined by connecting the developing axis A2 (see FIG. 34) and an agitator axis A5 to each other. The agitator axis A5 will be described later.

Figure 34:
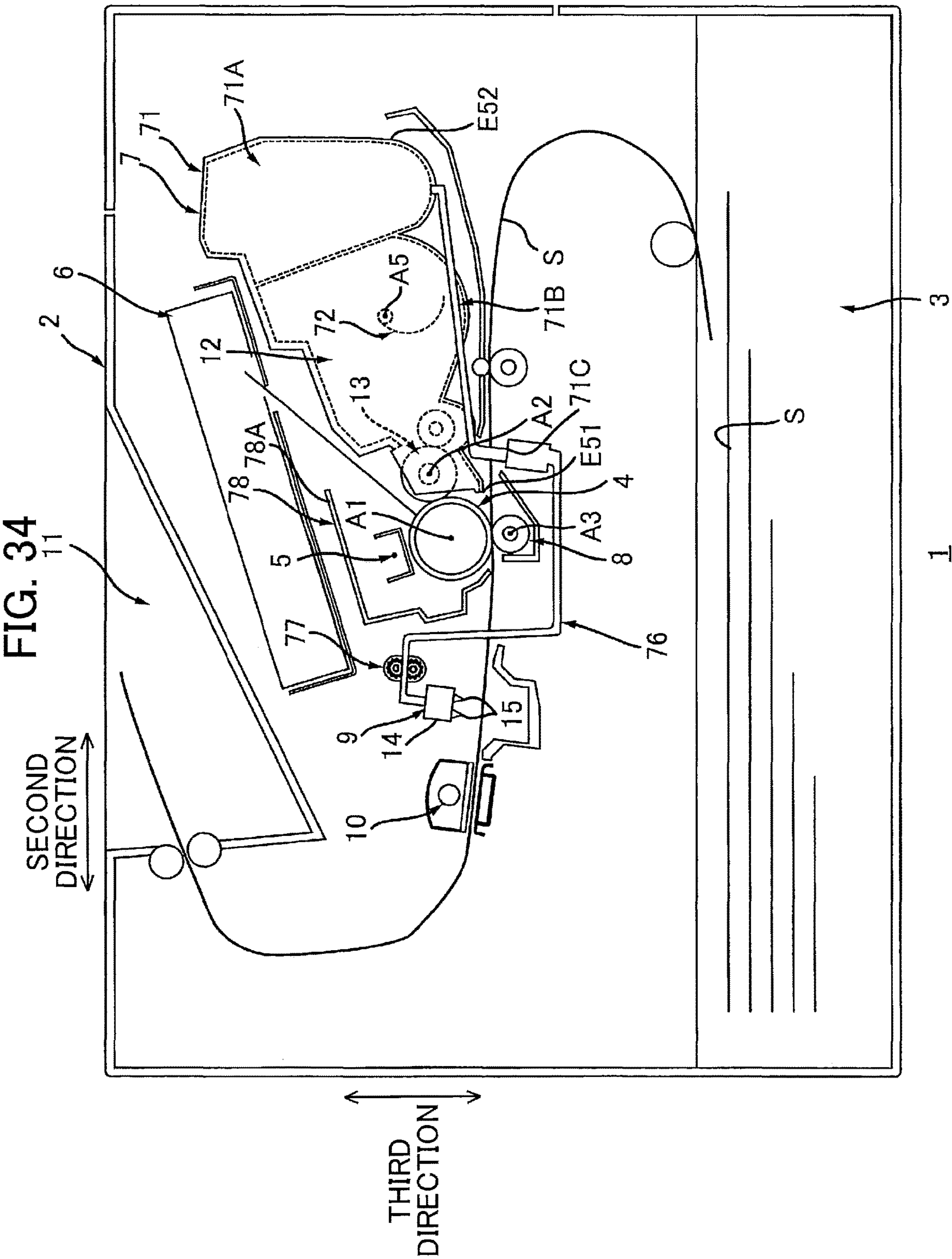
FIG. 34 is a schematic diagram illustrating a configuration of an image forming apparatus.

As illustrated in FIG. 34, the casing 71 has one end portion E51 and another end portion E52 in the second direction. The developing roller 13 is positioned at the one end portion E51 in the second direction of the casing 71. The casing 71 includes the toner casing 12 described above, a solvent casing 71A, and a tube 71B.

1.1.1 Toner Casing 12

At least a portion of the toner casing 12 is positioned between the developing roller 13 and the solvent casing 71A in the second direction. In a state where the developing cartridge 7 is attached to the main casing 2, the toner casing 12 is positioned on the opposite side of the developing roller 13 from the photosensitive drum 4 in the second direction.

1.1.2 Solvent Casing 71A

The solvent casing 71A is positioned at the other end portion E52 in the second direction of the casing 71. In a state where the developing cartridge 7 is attached to the main casing 2, the solvent casing 71A is positioned on the opposite side of the toner casing 12 from the developing roller 13 in the second direction. The solvent casing 71A can accommodate therein solvent.

1.1.3 Tube 71B

As illustrated in FIG. 35, the tube 71B is positioned at one end portion in the first direction of the casing 71. In other words, the tube 71B is positioned at the one end portion E41 in the first direction of the developing cartridge 7.

As illustrated in FIG. 34, the tube 71B is positioned at one end portion in the third direction of the casing 71. The third direction crosses the first direction and the second direction. The third direction is parallel to the up-down direction in a state where the developing cartridge 7 is attached to the main casing 2. The tube 71B extends in the second direction. The tube 71B has one end portion in the second direction in communication with the solvent casing 71A. The tube 71B has a discharge opening 71C.

The discharge opening 71C is positioned at another end portion in the second direction of the tube 71B. The discharge opening 71C is positioned at the one end portion E51 in the second direction of the casing 71. In other words, the discharge opening 71C is positioned on the opposite side of the toner casing 12 from the solvent casing 71A in the second direction. In a state where the developing cartridge 7 is attached to the main casing 2, the discharge opening 71C is positioned at a lower end portion of the casing 71. The solvent accommodated in the solvent casing 71A flows the tube 71B and is discharged through the discharge opening 71C. The discharge opening 71C allows the solvent accommodated in the solvent casing 71A to be discharged therethrough.

1.2 Agitator 72

The agitator 72 is positioned inside the toner casing 12. The agitator 72 is positioned between the developing roller 13 and the solvent casing 71A in the second direction. The agitator 72 is rotatable about the agitator axis A5. The agitator 72 makes rotations to agitate the toner in the toner casing 12. The agitator axis A5 extends in the first direction.

1.3 Developing Electrode 73

As illustrated in FIG. 35, the developing electrode 73 is positioned at the other end portion E42 in the first direction of the developing cartridge 7. The developing electrode 73 is mounted on the other end portion in the first direction of the casing 71. The developing electrode 73 is positioned away from the tube 71B and the discharge opening 71C in the first direction. The developing electrode 73 is electrically connected to the developing roller 13.

1.4 Storage Medium 74

The storage medium 74 is positioned at the other end portion E42 in the first direction of the developing cartridge 7. The storage medium 74 is mounted on the other end portion in the first direction of the casing 71. The storage medium 74 is positioned away from the tube 71B and the discharge opening 71C in the first direction. The storage medium 74 is an IC chip. The storage medium 74 has a flat plate shape. The storage medium 74 stores therein information related to the developing cartridge 7. Data related to the developing cartridge 7 is, for example, data indicative of whether the developing cartridge 7 is a new cartridge or an old cartridge, and data indicative of the number of sheets (or dot counts) printable using the developing cartridge 7.

1.5 Plurality of Electrical Contact Surfaces 75

The plurality of electrical contact surfaces 75 are positioned on a surface of the storage medium 74. In the present embodiment, the storage medium 74 has the electrical contact surfaces 75. The plurality of electrical contact surfaces 75 are positioned at the other end portion E42 in the first direction of the developing cartridge 7. The plurality of electrical contact surfaces 75 are positioned away from the tube 71B and the discharge opening 71C in the first direction. The plurality of electrical contact surfaces 75 are electrically connected to the storage medium 74. Note that the plurality of electrical contact surfaces 75 may be positioned away from the storage medium 74. In a case where the plurality of electrical contact surfaces 75 are positioned away from the storage medium 74, each of the electrical contact surfaces 75 is electrically connected to the storage medium 74 through a wiring. A single electrical contact surface 75 may be used.

2. Drum Cartridge 78

As illustrated in FIG. 34, the image forming apparatus 1 includes a drum cartridge 78. The developing cartridge 7 is detachably attachable to the main casing 2 in a state where the developing cartridge 7 is attached to the drum cartridge 78. The drum cartridge 78 will be described below.

The drum cartridge 78 is detachably attachable to the main casing 2. In other words, the drum cartridge 78 is detachably attachable to the image forming apparatus 1. The drum cartridge 78 includes the photosensitive drum 4 described above, the charging unit 5, the transfer unit 8, and a drum frame 78A.

The drum frame 78A supports the photosensitive drum 4, the charging unit 5, and the transfer unit 8. The photosensitive drum 4 is positioned at one end portion in the second direction of the drum frame 78A. The developing cartridge 7 is detachably attachable to the drum frame 78A. In other words, the developing cartridge 7 is detachably attachable to the drum cartridge 78. The developing cartridge 7 is positioned at another end portion in the second direction of the drum frame 78A in a state where the developing cartridge 7 is attached to the drum frame 78A.

3. Details of Main Casing 2

Next, details of the main casing 2 will be described with reference to FIG. 34.

The main casing 2 includes a supply pipe 76, and a pump 77.

3.1 Supply Pipe 76

The supply pipe 76 supplies the solvent to the applicator 9. Specifically, the supply pipe 76 has one end portion and another end portion. In a state where the developing cartridge 7 is attached to the main casing 2, the one end portion of the supply pipe 76 is connected to the tube 71B of the developing cartridge 7. In other words, in a state where the developing cartridge 7 is attached to the image forming apparatus 1, the supply pipe 76 is connected to the tube 71B positioned at the one end portion E41 in the first direction of the developing cartridge 7. Hence, in a state where the developing cartridge 7 is attached to the image forming apparatus 1, the solvent casing 71A is connected to the supply pipe 76 of the image forming apparatus 1 through the tube 71B. The other end portion of the supply pipe 76 is positioned away from the one end portion of the supply pipe 76. The other end portion of the supply pipe 76 is connected to the applicator casing 14 of the applicator 9.

3.2 Pump 77

The pump 77 is positioned between the one end portion and the other end portion of the supply pipe 76. The pump 77 pumps the solvent to the applicator 9. When the pump 77 is driven in a state where the developing cartridge 7 is attached to the main casing 2, the solvent accommodated in the developing cartridge 7 is introduced into the applicator casing 14 of the applicator 9 through the tube 71B, the discharge opening 71C, and the supply pipe 76. The solvent entered the applicator casing 14 is sprayed through the nozzles 15 onto the toner that has been transferred to the sheet S from the photosensitive drum 4. The sprayed solvent dissolves the toner on the sheet S. Specifically, the pump 77 is a gear pump.

4. Functions and Effects (1) According to the developing cartridge 7, the solvent casing 71A can accommodate therein solvent, as illustrated in FIG. 34. Hence, the solvent can be supplied when the developing cartridge 7 is replaced.

(2) According to the developing cartridge 7, in a state where the developing cartridge 7 is attached to the main casing 2, the supply pipe 76 of the main casing 2 is connected to the tube 71B positioned at the one end portion E41 in the first direction of the developing cartridge 7, as illustrated in FIG. 35. On the other hand, the developing electrode 73 is positioned at the other end portion E42 in the first direction of the developing cartridge 7.

With this configuration, the developing electrode 73 can be restrained from getting dirty with the solvent even if the solvent is leaked from the supply pipe 76.

(3) According to the developing cartridge 7, as illustrated in FIG. 35, the plurality of electrical contact surfaces 75 is also positioned at the other end portion E42 in the first direction of the developing cartridge 7.

With this configuration, the electrical contact surfaces 75 can be restrained from getting dirty with the solvent even if leakage of the solvent from the supply pipe 76 occurs.

Figure 36:
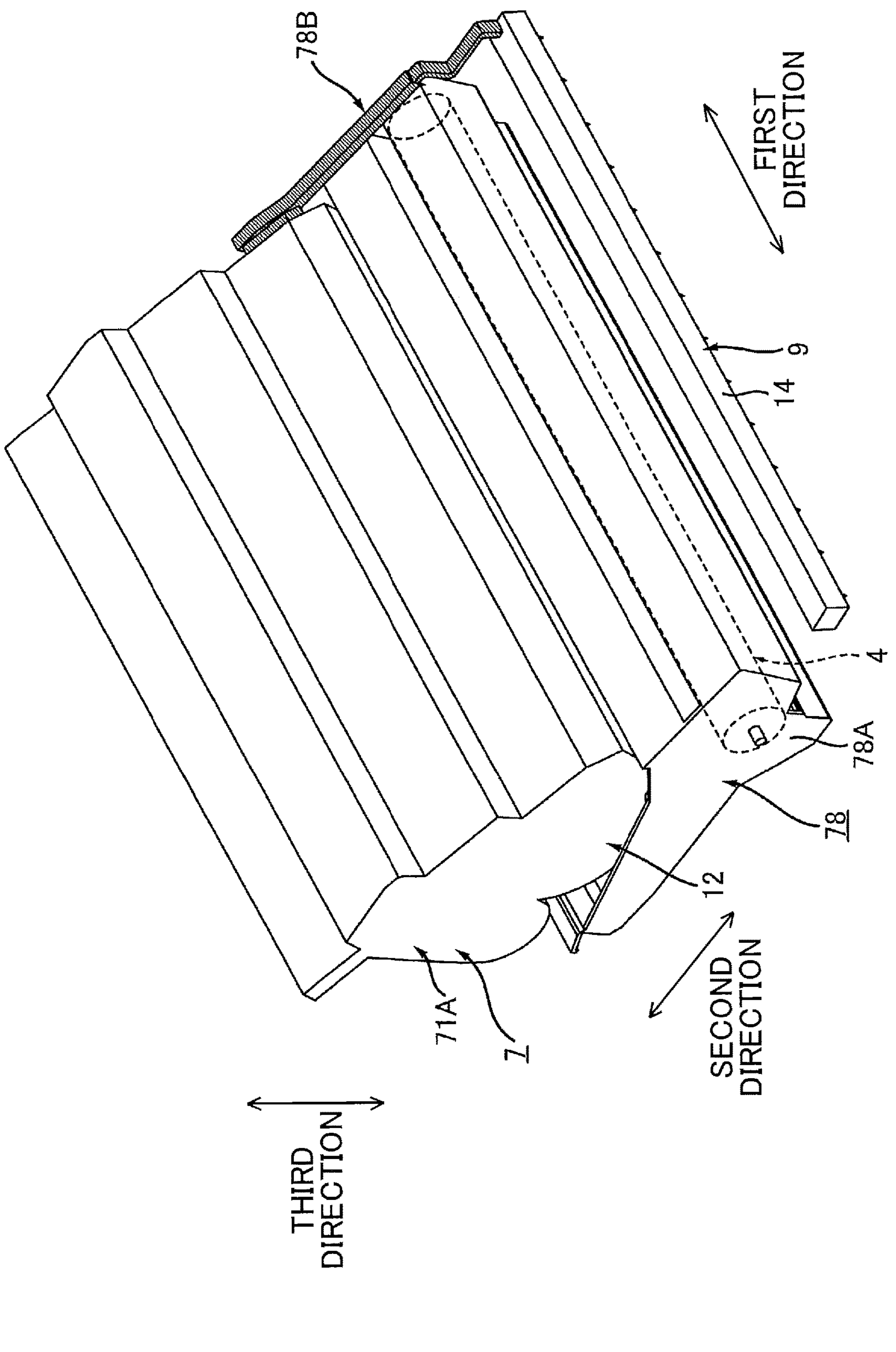
FIG. 36 is a perspective view of a developing cartridge and a drum cartridge.

5. Modifications (1) As illustrated in FIG. 36, the drum cartridge 78 may include a supply pipe 78B.

The supply pipe 78B is positioned at one end portion in the first direction of the drum cartridge 78. The drum frame 78A supports the supply pipe 78B. In a state where the drum cartridge 78 is attached to the main casing 2, the supply pipe 78B is positioned upward of the photosensitive drum 4. In a state where the developing cartridge 7 is attached to the drum cartridge 78, one end portion of the supply pipe 78B is connected to the solvent casing 71A. Hence, the solvent casing 71A is connected to the supply pipe 78B of the drum cartridge 78 in a state where the developing cartridge 7 to the drum cartridge 78. Further, another end portion of the supply pipe 78B is connected to the applicator casing 14 of the applicator 9 in a state where the drum cartridge 78 is attached to the main casing 2, thereby allowing the solvent accommodated in the solvent casing 71A to be supplied to the applicator 9 through the supply pipe 78B.

Figure 37:
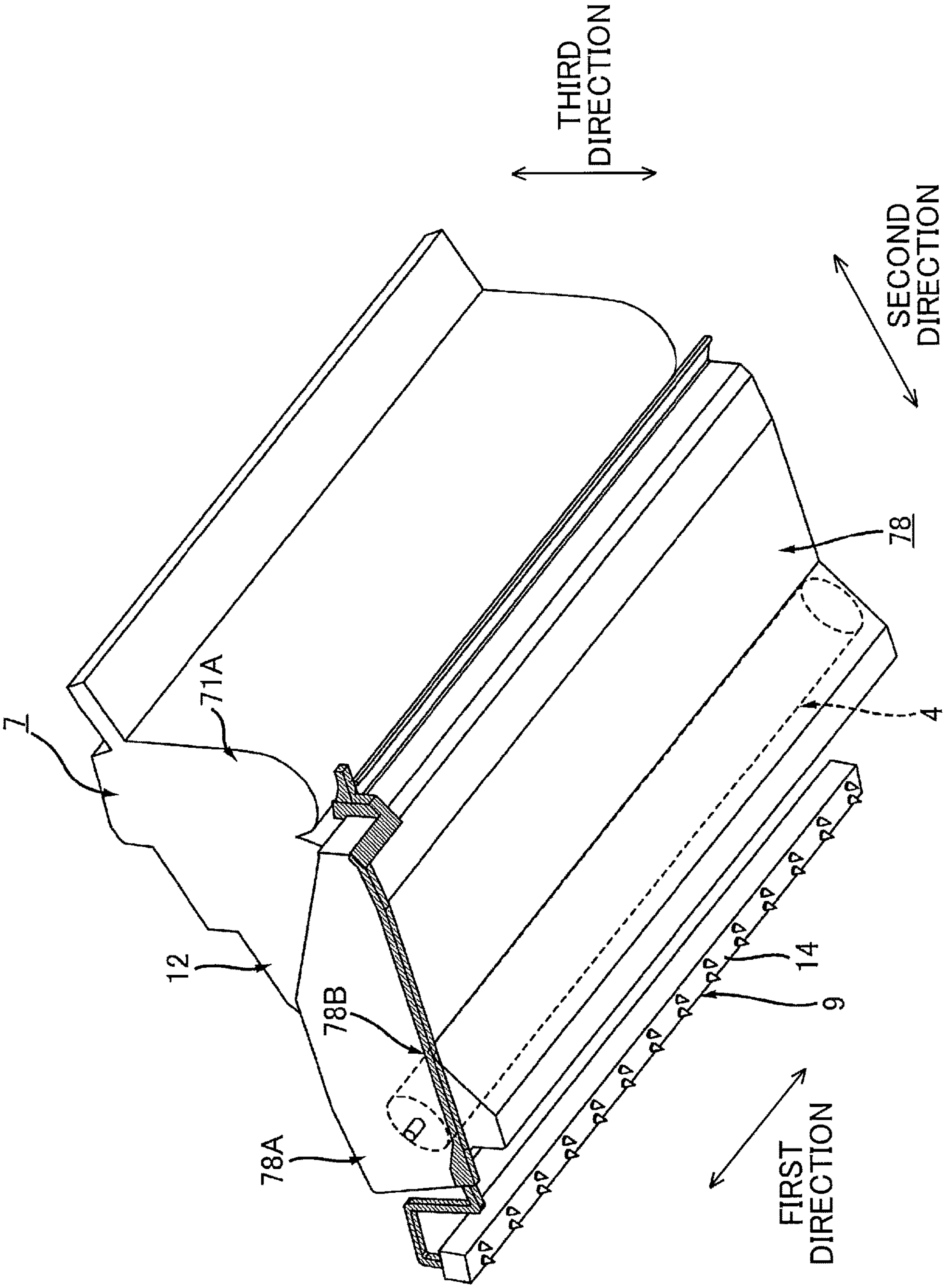
FIG. 37 is a perspective view of a developing cartridge and a drum cartridge.

Note that, as illustrated in FIG. 37, the supply pipe 78B may be positioned downward of the photosensitive drum 4 in a state where the drum cartridge 78 is attached to the main casing 2.

(2) The drum cartridge 78 may be dispensed with in the image forming apparatus 1. In this case, the photosensitive drum 4, the charging unit 5, and the transfer unit 8 are fixed to the main casing 2. The developing cartridge 7 is detachably attachable to the main casing 2.

Figure 38:
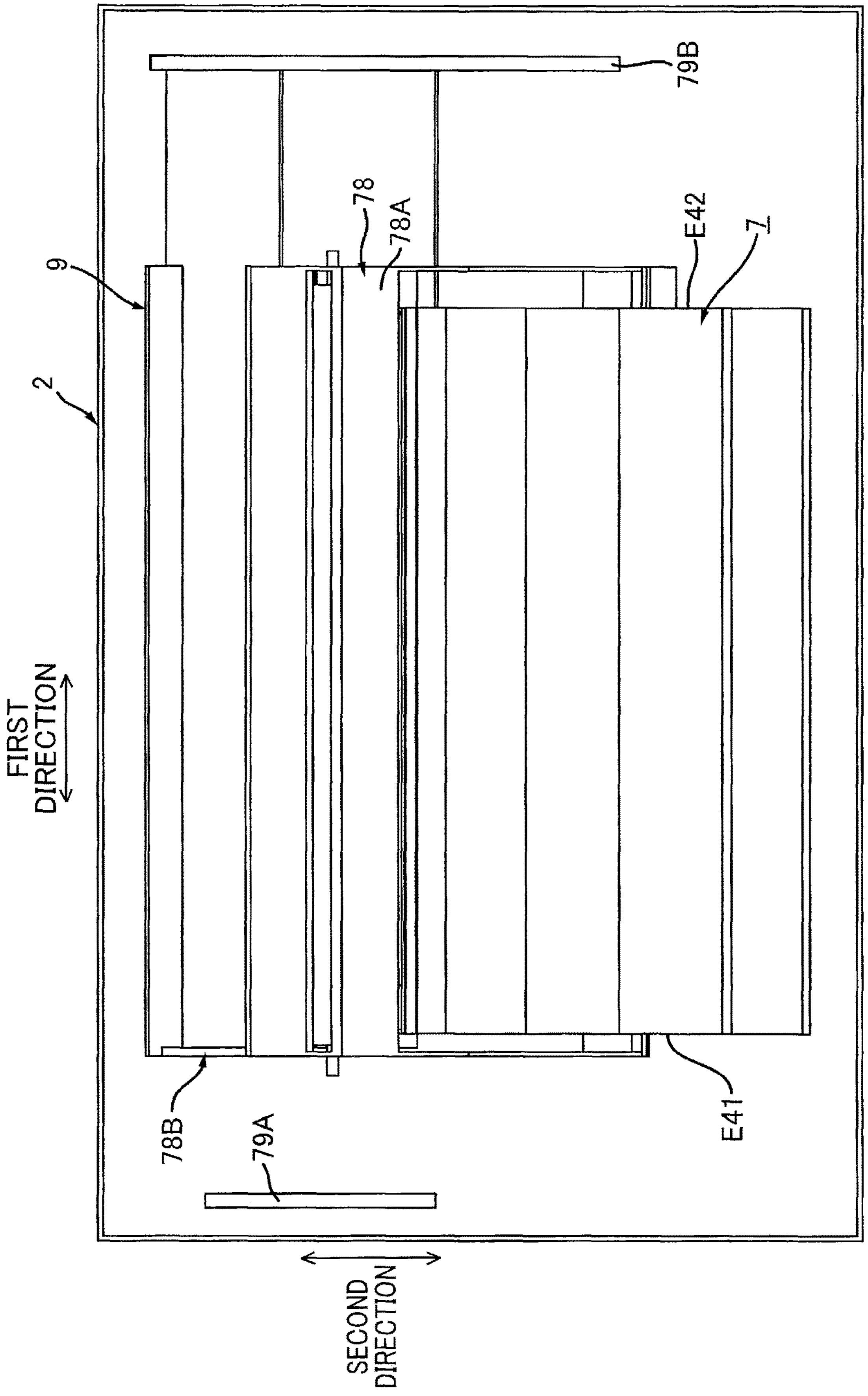
FIG. 38 is a schematic diagram illustrating a configuration of an image forming apparatus.

(3) As illustrated in FIG. 38, the image forming apparatus 1 may include a first circuit board 79A and a second circuit board 79B.

The first circuit board 79A is positioned at one end portion in the first direction of the main casing 2. In a state where the developing cartridge 7 is attached to the main casing 2, the first circuit board 79A is positioned to be spaced apart from the developing cartridge 7 in the first direction. In a state where the developing cartridge 7 is attached to the main casing 2, the first circuit board 79A is positioned on the opposite side of the one end portion E41 of the developing cartridge 7 from the other end portion E42 of the developing cartridge 7 in the first direction. The first circuit board 79A is electrically connected to the pump 77 (see FIG. 34). Specifically, the first circuit board 79A is a control circuit board. The first circuit board 79A controls the pump 77.

The second circuit board 79B is positioned to be spaced apart from the first circuit board 79A in the first direction. In a state where the developing cartridge 7 is attached to the main casing 2, the second circuit board 79B is positioned on the opposite side of the developing cartridge 7 from the first circuit board 79A in the first direction. In other words, the developing cartridge 7 is positioned between the first circuit board 79A and the second circuit board 79B in the first direction. In a state where the developing cartridge 7 is attached to the main casing 2, the second circuit board 79B is electrically connected to the developing electrode 73 (see FIG. 35). The second circuit board 79B applies a voltage to the developing roller 13. Further, the second circuit board 79B is electrically connected to an electrode (not illustrated) of the drum cartridge 78. The second circuit board 79B applies a voltage to the charging unit 5. Further, the second circuit board 79B is electrically connected to the applicator 9. The second circuit board 79B supplies electric power to the applicator 9. Further, in a state where the developing cartridge 7 is attached to the main casing 2, the second circuit board 79B is electrically connected to the electrical contact surfaces 75 (see FIG. 35). The second circuit board 79B supplies electric power to the storage medium 74.

While the description has been made in detail with reference to the embodiments and modifications thereof, it would be apparent to those skilled in the art that may variations and modifications may be made thereto. The parts and components appearing in the above-described embodiments and modifications may be combined arbitrary as long as any conflicting combination is avoided.

The present specification contains the following aspects.

(Aspect 1) According to aspect 1, an image forming apparatus includes: a main casing; a photosensitive drum; a developing cartridge; a transfer unit for transferring the toner that has been supplied onto the photosensitive drum to a sheet; a solvent cartridge; an applicator; and a heater. The photosensitive drum is rotatable about a drum axis extending in a first direction. The developing cartridge includes a toner casing that can accommodate therein toner. The developing cartridge supplies the toner onto the photosensitive drum. The developing cartridge is detachably attachable to the main casing. The solvent cartridge includes a solvent casing that can accommodate therein solvent for dissolving the toner. The solvent cartridge is detachably attachable to the main casing independently of the developing cartridge. The applicator applying the solvent to the toner that has been transferred to the sheet. The heater heats the sheet on which the solvent has been applied to the toner by the applicator.

(Aspect 2) In the image forming apparatus according to the aspect 1, the solvent cartridge is positioned away from the developing cartridge in the first direction in a state where the developing cartridge and the solvent cartridge are attached to the main casing.

(Aspect 3) In the image forming apparatus according to the aspect 2, the main casing has: a first opening through which the developing cartridge passes when the developing cartridge is attached to the main casing; and a second opening through which the solvent cartridge passes when the solvent cartridge is attached to the main casing.

(Aspect 4) The image forming apparatus according to the aspect 3 further includes: a first cover movable between: a first closed position where the first cover closes the first opening; and a first open position where the first opening is opened; and a second cover provided independently of the first cover, the second cover being movable between: a second closed position where the second cover closes the second opening; and a second open position where the second opening is opened.

(Aspect 5) In the image forming apparatus according to the aspect 4, the first opening and the second opening are positioned at one end portion of the main casing in a second direction crossing the first direction, and the developing cartridge and the solvent cartridge are attachable to the main casing in the second direction.

(Aspect 6) In the image forming apparatus according to the aspect 5, the solvent casing has a discharge opening allowing the solvent to be discharged therethrough, the discharge opening being positioned at one end portion in the second direction of the solvent casing, and the solvent cartridge includes a first handle positioned at another end portion in the second direction of the solvent casing, the first handle being positioned closer to the second cover than the discharge opening is to the second cover in the second direction.

(Aspect 7) In the image forming apparatus according to the aspect 6, the second cover makes contact with the solvent cartridge in a state where the solvent cartridge is attached to the main casing and the second cover is at the second closed position.

(Aspect 8) In the image forming apparatus according to the aspect 7, the second cover makes contact with the first handle in a state where the solvent cartridge is attached to the main casing and the second cover is at the second closed position.

(Aspect 9) In the image forming apparatus according to any one of the aspects 5 to 8, the first cover is pivotally movable about a first cover axis extending in the first direction, and the second cover is pivotally movable about a second cover axis extending in the first direction.

(Aspect 10) In the image forming apparatus according to any one of the aspects 5 to 9, the second cover includes a first guide guiding the solvent cartridge when the solvent cartridge is attached to the main casing in a state where the second cover is at the second open position.

(Aspect 11) In the image forming apparatus according to the aspect 10, the main casing includes a second guide guiding the solvent cartridge when the solvent cartridge is attached to the main casing.

(Aspect 12) In the image forming apparatus according to the aspect 11, the solvent cartridge includes a cartridge guide guided by the first guide and the second guide.

(Aspect 13) In the image forming apparatus according to the aspect 4, the first opening is positioned at one end portion of the main casing in a second direction crossing the first direction, the second opening is positioned at one end portion in the first direction of the main casing, the developing cartridge is attachable to the main casing in the second direction, and the solvent cartridge is attachable to the main casing in the first direction.

(Aspect 14) In the image forming apparatus according to the aspect 13, the first cover is pivotally movable about a first cover axis extending in the first direction, and the second cover is pivotally movable about a second cover axis extending in the second direction.

(Aspect 15) The image forming apparatus according to the aspect 3 further includes a cover movable between: a closed position where the cover closes the first opening and the second opening; and an open position where the first opening and the second opening are opened.

(Aspect 16) The image forming apparatus according to any one of the aspects 3 to 15 further includes a drum cartridge including the photosensitive drum, the drum cartridge being detachably attachable to the main casing independently of the solvent cartridge, the drum cartridge being detachably attachable to the main casing through the first opening.

(Aspect 17) In the image forming apparatus according to the aspect 16, the developing cartridge is detachably attachable to the drum cartridge.

(Aspect 18) The image forming apparatus according to any one of the aspects 2 to 17 further includes a sheet cassette that can accommodate therein the sheet, the sheet cassette being detachably attachable to the main casing independently of the solvent cartridge, the sheet cassette being positioned below the developing cartridge in a state where the sheet cassette is attached to the main casing.

(Aspect 19) In the image forming apparatus according to the aspect 18, the solvent cartridge is positioned away from the sheet cassette in the first direction in a state where the solvent cartridge and the sheet cassette are attached to the main casing.

(Aspect 20) In the image forming apparatus according to the aspect 19, the solvent cartridge is juxtaposed with the sheet cassette in the first direction in a state where the solvent cartridge and the sheet cassette are attached to the main casing.

(Aspect 21) In the image forming apparatus according to any one of the aspects 18 to 20, the sheet cassette includes a sheet handle, and the sheet handle is positioned at one end portion of the main casing in a second direction crossing the first direction in a state where the sheet cassette is attached to the main casing.

(Aspect 22) In the image forming apparatus according to any one of the aspects 2 to 21, the solvent cartridge is positioned downward of the applicator in a state where the solvent cartridge is attached to the main casing.

(Aspect 23) The image forming apparatus according to any one of the aspects 2 to 22 further includes a pump for pumping the solvent from the solvent cartridge to the applicator.

(Aspect 24) The image forming apparatus according to the aspect 23 further includes a first circuit board juxtaposed with the solvent cartridge in a second direction crossing the first direction in a state where the solvent cartridge is attached to the main casing. In this image forming apparatus, the first circuit board is electrically connected to the pump.

(Aspect 25) The image forming apparatus according to the aspect 24 further includes: a second circuit board positioned away from the first circuit board in the first direction; and a charging unit charging a surface of the photosensitive drum. In this image forming apparatus, the second circuit board applies a voltage to the charging unit.

(Aspect 26) In the image forming apparatus according to the aspect 25, the applicator is a spraying device of an electrostatic spraying type, and the second circuit board supplies electric power to the applicator.

(Aspect 27) In the image forming apparatus according to the aspect 25 or 26, the developing cartridge is positioned between the solvent cartridge and the second circuit board.

(Aspect 28) The image forming apparatus according to any one of the aspects 2 to 27 further includes a discharge tray onto which the sheet that has moved past the applicator is discharged. In this image forming apparatus, the discharge tray is positioned above the developing cartridge in a state where the developing cartridge is attached to the main casing.

(Aspect 29) The image forming apparatus according to the aspect 28 further includes an operation panel positioned away from the discharge tray in the first direction. In this image forming apparatus, the operation panel is positioned above the solvent cartridge in a state where the solvent cartridge is attached to the main casing.

(Aspect 30) In the image forming apparatus according to any one of the aspects 2 to 29, at least a portion of the solvent cartridge is juxtaposed with the developing cartridge in the first direction in a state where the developing cartridge and the solvent cartridge are attached to the main casing.

(Aspect 31) In the image forming apparatus according to the aspect 1, the solvent cartridge is positioned below the developing cartridge in a state where the developing cartridge and the solvent cartridge are attached to the main casing.

(Aspect 32) In the image forming apparatus according to the aspect 31, the main casing has: a first opening through which the developing cartridge passes when the developing cartridge is attached to the main casing; and a second opening through which the solvent cartridge passes when the solvent cartridge is attached to the main casing, and the first opening and the second opening are positioned at one end portion of the main casing in a second direction crossing the first direction.

(Aspect 33) In the image forming apparatus according to the aspect 32, the developing cartridge and the solvent cartridge are detachably attachable to the main casing in the second direction.

(Aspect 34) The image forming apparatus according to the aspect 33 further includes a sheet cassette that can accommodate therein the sheet, the sheet cassette being detachably attachable to the main casing, the sheet cassette being positioned below the developing cartridge in a state where the sheet cassette is attached to the main casing.

(Aspect 35) In the image forming apparatus according to the aspect 34, the sheet cassette is detachably attachable to the main casing in the second direction.

(Aspect 36) In the image forming apparatus according to the aspect 34 or 35, the solvent cartridge is positioned below the sheet cassette in a state where the solvent cartridge and the sheet cassette are attached to the main casing.

(Aspect 37) In the image forming apparatus according to the aspect 34 or 35, the solvent cartridge is positioned within the sheet cassette in a state where the solvent cartridge and the sheet cassette are attached to the main casing.

(Aspect 38) In the image forming apparatus according to any one of the aspects 34 to 37, the sheet cassette includes a sheet handle, and the sheet handle is positioned at the one end portion in the second direction of the main casing in a state where the sheet cassette is attached to the main casing.

(Aspect 39) The image forming apparatus according to any one of the aspects 31 to 38 further includes an exposure unit that can expose the photosensitive drum to light. In this image forming apparatus, at least a portion of the exposure unit is positioned upward of the developing cartridge and the solvent cartridge in a state where the developing cartridge and the solvent cartridge are attached to the main casing.

(Aspect 40) In the image forming apparatus according to any one of the aspects 31 to 39, the solvent cartridge is positioned downward of the applicator in a state where the solvent cartridge is attached to the main casing.

(Aspect 41) The image forming apparatus according to the aspect 1, the applicator is positioned at one end portion of the main casing in a second direction crossing the first direction, the main casing has an opening through which the developing cartridge and the solvent cartridge pass when the developing cartridge and the solvent cartridge are attached to the main casing, the opening being positioned at another end portion in the second direction of the main casing. the image forming apparatus further includes a cover positioned at the another end portion in the second direction of the main casing, the cover being movable between: a closed position where the cover closes the opening; and an open position where the opening is opened. In this image forming apparatus, the developing cartridge and the solvent cartridge are positioned between the applicator and the cover in the second direction, and the solvent cartridge is positioned closer to the applicator than the developing cartridge is to the applicator in a state where the developing cartridge and the solvent cartridge are attached to the main casing and the cover is at the closed position.

(Aspect 42) The image forming apparatus according to the aspect 41 further includes a drum cartridge including the photosensitive drum and a drum frame, the drum cartridge being movable in the second direction between: an interior position where the drum cartridge is positioned inside the main casing; and an exterior position where the drum cartridge is positioned outside the main casing. In this image forming apparatus, the developing cartridge is detachably attachable to the drum frame, and the solvent cartridge is detachably attachable to the drum frame independently of the developing cartridge.

(Aspect 43) In the image forming apparatus according to the aspect 42, the photosensitive drum is positioned between the solvent cartridge and the cover in the second direction in a state where the developing cartridge, the drum cartridge, and the solvent cartridge are attached to the main casing and the cover is at the closed position.

(Aspect 44) The image forming apparatus according to the aspect 41 further includes a drawer that is not detachable from the main casing, the drawer being movable between: an interior position where the drawer is positioned inside the main casing; and an exterior position where the drawer is positioned outside the main casing. In this image forming apparatus, in a state where the drawer is at the exterior position, the developing cartridge is detachably attachable to the drawer, and, in a state where the drawer is at the exterior position, the solvent cartridge is detachably attachable to the drawer independently of the developing cartridge.

(Aspect 45) In the image forming apparatus according to the aspect 44, the developing cartridge includes the photosensitive drum, and the photosensitive drum is positioned between the applicator and the cover in the second direction and the solvent cartridge is positioned closer to the applicator than the photosensitive drum is to the applicator in the second direction in a state where the developing cartridge and the solvent cartridge are attached to the drawer, the drawer is at the interior position, and the cover is at the closed position.

(Aspect 46) In the image forming apparatus according to the aspect 1, the applicator is positioned at one end portion of the main casing in a second direction crossing the first direction, the main casing has an opening through which the developing cartridge and the solvent cartridge pass when the developing cartridge and the solvent cartridge are attached to the main casing, the opening being positioned above the developing cartridge and the solvent cartridge in a state where the developing cartridge and the solvent cartridge are attached to the main casing. The image forming apparatus further includes a cover positioned above the developing cartridge and the solvent cartridge in a state where the developing cartridge and the solvent cartridge are attached to the main casing, the cover being pivotally movable about a cover axis extending in the first direction, the cover being movable between: a closed position where the cover closes the opening; and an open position where the opening is opened. In this image forming apparatus, the solvent cartridge is positioned closer to the applicator than the developing cartridge is to the applicator in a state where the developing cartridge and the solvent cartridge are attached to the main casing and the cover is at the closed position.

(Aspect 47) In the image forming apparatus according to the aspect 46, the cover axis is positioned at the one end portion in the second direction of the main casing, and the cover axis is positioned farther away from the solvent cartridge than the applicator is from the solvent cartridge in the second direction in a state where the developing cartridge and the solvent cartridge are attached to the main casing.

(Aspect 48) In the image forming apparatus according to the aspect 46 or 47, the developing cartridge and the solvent cartridge are detachably attachable to the main casing in a third direction crossing the first direction and the second direction.

(Aspect 49) The image forming apparatus according to the aspect 48 further includes a drum cartridge including the photosensitive drum and a drum frame to which the developing cartridge is detachably attachable. In this image forming apparatus, the drum cartridge is detachably attachable to the main casing in the third direction.

(Aspect 50) In the image forming apparatus according to any one of the aspects 41 to 49, the transfer unit can convey the sheet toward the applicator in the second direction.

(Aspect 51) The image forming apparatus according to any one of the aspects 41 to 50 further includes a supply pipe allowing the solvent to be supplied from the solvent cartridge to the applicator therethrough. In this image forming apparatus, the supply pipe is positioned between the applicator and the solvent cartridge in the second direction in a state where the solvent cartridge is attached to the main casing.

(Aspect 52) According to aspect 52, an image forming apparatus includes: a main casing; a photosensitive drum; a developing cartridge; a transfer unit for transferring the toner that has been supplied onto the photosensitive drum to a sheet; an applicator; and a heater. The photosensitive drum is rotatable about a drum axis extending in a first direction. The developing cartridge includes a toner casing that can accommodate therein toner. the developing cartridge supplies the toner onto the photosensitive drum, the developing cartridge being detachably attachable to the main casing. The applicator applies solvent for dissolving toner to the toner that has been transferred to the sheet. The heater heats the sheet on which the solvent has been applied to the toner by the applicator. In this image forming apparatus, the main casing has an inlet port allowing the solvent in a solvent cartridge to enter the main casing therethrough in a state where the solvent cartridge is connected to the main casing, the inlet port being positioned on an outer surface of the main casing.

(Aspect 53) In the image forming apparatus according to the aspect 52, the inlet port is positioned on an upper surface of the main casing.

(Aspect 54) In the image forming apparatus according to the aspect 52 or 53, the main casing includes a discharge tray positioned on an upper surface of the main casing, the sheet that has moved past the applicator being discharged onto the discharge tray, and the inlet port is positioned away from the discharge tray in the first direction.

(Aspect 55) In the image forming apparatus according to the aspect 54, the inlet port is positioned away from the developing cartridge in the first direction.

(Aspect 56) In the image forming apparatus according to the aspect 54 or 55, the inlet port is positioned away from the applicator in the first direction.

(Aspect 57) The image forming apparatus according to any one of the aspects 52 to 56 further includes a pump pumping the solvent to the applicator.

(Aspect 58) The image forming apparatus according to the aspect 57 further includes a first circuit board positioned between the developing cartridge and the inlet port in the first direction. In this image forming apparatus, the first circuit board is electrically connected to the pump.

(Aspect 59) In the image forming apparatus according to any one of the aspects 52 to 58, the solvent cartridge includes: a solvent casing that can accommodate therein the solvent, the solvent casing having a discharge opening allowing the solvent to be discharged from the solvent casing therethrough; and a lid closing the discharge opening, and the main casing includes a protrusion extending through the lid in a state where the solvent cartridge is connected to the inlet port.

(Aspect 60) In the image forming apparatus according to the aspect 59, the solvent cartridge includes a sleeve positioned on an outer periphery of the discharge opening, the sleeve being inserted into the inlet port in a state where the solvent cartridge is connected to the inlet port.

(Aspect 61) In the image forming apparatus according to the aspect 60, the sleeve includes a first thread at an outer peripheral surface of the sleeve, and the main casing includes a second thread in threading engagement with the first thread in a state where the solvent cartridge is connected with the inlet port.

(Aspect 62) According to aspect 62, a drum cartridge includes: a photosensitive drum; and a solvent casing that can accommodate therein solvent that dissolves toner.

(Aspect 63) The drum cartridge according to the aspect 62 further includes a drum frame to which a developing cartridge is detachably attachable, the developing cartridge including a toner casing that can accommodate therein toner.

(Aspect 64) In the drum cartridge according to the aspect 63, the photosensitive drum is rotatable about a drum axis extending in a first direction, the solvent casing is positioned at one end portion of the drum frame in a second direction crossing the first direction, the developing cartridge is positioned at another end portion in the second direction of the drum frame in a state where the developing cartridge is attached to the drum frame, and the photosensitive drum is positioned between the solvent casing and the developing cartridge in the second direction in a state where the developing cartridge is attached to the drum frame.

(Aspect 65) The drum cartridge according to the aspect 64 further includes a transfer unit transferring the toner that has been supplied onto the photosensitive drum to a sheet.

(Aspect 66) In the drum cartridge according to the aspect 65, the drum cartridge is detachably attachable to a main casing accommodating therein an applicator applying the solvent to the toner that has been transferred to the sheet.

(Aspect 67) In the drum cartridge according to the aspect 66, at least a portion of the solvent casing is positioned between the photosensitive drum and the applicator in the second direction in a state where the drum cartridge is attached to the main casing.

(Aspect 68) The drum cartridge according to the aspect 66 or 67 further includes a waste solvent casing that can accommodate therein waste solvent discharged from the applicator.

(Aspect 69) In the drum cartridge according to the aspect 68, the waste solvent casing is positioned on an opposite side of the photosensitive drum from the solvent casing in the second direction.

(Aspect 70) The drum cartridge according to the aspect 68 or 69 further includes a charging unit charging a surface of the photosensitive drum. In this drum cartridge, the waste solvent casing is positioned on an opposite side of the photosensitive drum from the charging unit in a third direction crossing both the first direction and the second direction.

(Aspect 71) The drum cartridge according to the aspect 70 further includes a charge electrode electrically connected to the charging unit; and a tube connected to the waste solvent casing. In this drum cartridge, the charge electrode is positioned on an opposite side of the solvent casing from the tube in the first direction.

(Aspect 72) The drum cartridge according to any one of the aspects 68 to 70 further includes: a transfer electrode electrically connected to the transfer unit; and a tube connected to the waste solvent casing. In this drum cartridge, the transfer electrode is positioned on an opposite side of the solvent casing from the tube in the first direction.

(Aspect 73) In the drum cartridge according to any one of the aspects 68 to 72, the waste solvent casing supports the developing cartridge in a state where the developing cartridge is attached to the drum frame.

(Aspect 74) The drum cartridge according to any one of the aspects 68 to 73 further includes a sheet conveying roller for conveying the sheet toward the photosensitive drum and the transfer unit, the sheet conveying roller being rotatable about a conveying axis extending in the first direction.

(Aspect 75) In the drum cartridge according to the aspect 74, the waste solvent casing supports the sheet conveying roller.

(Aspect 76) In the drum cartridge according to any one of the aspects 65 to 75, the transfer unit is a transfer roller rotatable about a transfer axis extending in the first direction.

(Aspect 77) In the drum cartridge according to any one of the aspects 62 to 76, the solvent is applied to toner that has been transferred from the photosensitive drum to a sheet to dissolve the toner on the sheet.

(Aspect 78) According to aspect 78, a developing cartridge includes: a developing roller; and a casing. The casing includes: a toner casing that can accommodate therein toner; and a solvent casing that can accommodate therein solvent that dissolves the toner.

(Aspect 79) In the developing cartridge according to the aspect 78, the developing roller is rotatable about a developing axis extending in a first direction and positioned at one end portion of the casing in a second direction crossing the first direction, the solvent casing is positioned at another end portion in the second direction of the casing, and at least a portion of the toner casing is positioned between the developing roller and the solvent casing in the second direction.

(Aspect 80) The developing cartridge according to the aspect 79 further includes an agitator agitating toner in the toner casing. In this developing cartridge, the agitator is positioned between the developing roller and the solvent casing in the second direction.

(Aspect 81) In the developing cartridge according to any one of the aspects 78 to 80, the developing cartridge is detachably attachable to a drum cartridge including a photosensitive drum.

(Aspect 82) In the developing cartridge according to the aspect 81, the developing cartridge is detachably attachable to a main casing to which the drum cartridge is detachably attachable in a state where the developing cartridge is attached to the drum cartridge, the main casing accommodating therein: a transfer unit transferring toner on the photosensitive drum to a sheet; and an applicator applying the solvent to the toner that has been transferred to the sheet.

(Aspect 83) In the developing cartridge according to the aspect 82, the solvent casing is connected to a supply pipe of the drum cartridge for supplying the solvent to the applicator in a state where the developing cartridge is attached to the drum cartridge.

(Aspect 84) In the developing cartridge according to the aspect 82, the solvent casing is connected to a supply pipe in the main casing for supplying the solvent to the applicator in a state where the developing cartridge is attached to the main casing.

(Aspect 85) The developing cartridge according to the aspect 84 further includes a developing electrode electrically connected to the developing roller. In this developing cartridge, the developing roller is rotatable about a developing axis extending in a first direction, the supply pipe is connected to one end portion in the first direction of the developing cartridge in a state where the developing cartridge is attached to the main casing, and the developing electrode is positioned at another end portion in the first direction of the developing cartridge.

(Aspect 86) The developing cartridge according to the aspect 84 or 85 further includes a storage medium having an electrical contact surface. In this developing cartridge, the developing roller is rotatable about a developing axis extending in a first direction, the supply pipe is connected to one end portion in the first direction of the developing cartridge in a state where the developing cartridge is attached to the main casing, and the electrical contact surface is positioned at another end portion in the first direction of the developing cartridge.

(Aspect 87) In the developing cartridge according to the aspect 86, the storage medium stores therein information related to the developing cartridge.

(Aspect 88) In the developing cartridge according to the aspect 86 or 87, the storage medium is positioned at the another end portion in the first direction of the developing cartridge.

(Aspect 89) In the developing cartridge according to any one of the aspects 78 to 88, the solvent is applied to toner that has been transferred to a sheet to dissolve the toner on the sheet.

What is claimed is:

1. An image forming apparatus comprising:

a main casing;

a photosensitive drum rotatable about a drum axis extending in a first direction;

a developing cartridge comprising a toner casing that can accommodate therein toner, the developing cartridge supplying the toner onto the photosensitive drum, the developing cartridge being detachably attachable to the main casing;

a transfer unit for transferring the toner that has been supplied onto the photosensitive drum to a sheet;

a solvent cartridge comprising a solvent casing that can accommodate therein solvent for dissolving the toner, the solvent cartridge being detachably attachable to the main casing independently of the developing cartridge, the solvent cartridge being positioned away from the developing cartridge in the first direction in a state where the developing cartridge and the solvent cartridge are attached to the main casing; and an applicator applying the solvent to the toner that has been transferred to the sheet, wherein at least a portion of the solvent cartridge is juxtaposed with the developing cartridge in the first direction in a state where the developing cartridge and the solvent cartridge are attached to the main casing.

2. The image forming apparatus according to claim 1, wherein the main casing has:

a first opening through which the developing cartridge passes when the developing cartridge is attached to the main casing; and a second opening through which the solvent cartridge passes when the solvent cartridge is attached to the main casing.

3. The image forming apparatus according to claim 2, further comprising:

a first cover movable between:

a first closed position where the first cover closes the first opening; and a first open position where the first opening is opened; and a second cover provided independently of the first cover, the second cover being movable between:

a second closed position where the second cover closes the second opening; and a second open position where the second opening is opened.

4. The image forming apparatus according to claim 3, wherein the first opening is positioned at one end portion of the main casing in a second direction crossing the first direction, wherein the second opening is positioned at one end portion in the first direction of the main casing, wherein the developing cartridge is attachable to the main casing in the second direction, and wherein the solvent cartridge is attachable to the main casing in the first direction.

5. The image forming apparatus according to claim 3, wherein the first opening and the second opening are positioned at one end portion of the main casing in a second direction crossing the first direction, and wherein the developing cartridge and the solvent cartridge are attachable to the main casing in the second direction.

6. The image forming apparatus according to claim 5, wherein the second cover includes a first guide guiding the solvent cartridge when the solvent cartridge is attached to the main casing in a state where the second cover is at the second open position.

7. The image forming apparatus according to claim 5, wherein the solvent casing has a discharge opening allowing the solvent to be discharged therethrough, the discharge opening being positioned at one end portion in the second direction of the solvent casing, and wherein the solvent cartridge includes a first handle positioned at another end portion in the second direction of the solvent casing, the first handle being positioned closer to the second cover than the discharge opening is to the second cover in the second direction.

8. The image forming apparatus according to claim 7, wherein the second cover makes contact with the solvent cartridge in a state where the solvent cartridge is attached to the main casing and the second cover is at the second closed position.

9. The image forming apparatus according to claim 1, further comprising a sheet cassette that can accommodate therein the sheet, the sheet cassette being detachably attachable to the main casing independently of the solvent cartridge, the sheet cassette being positioned below the developing cartridge in a state where the sheet cassette is attached to the main casing.

10. The image forming apparatus according to claim 9, wherein the solvent cartridge is positioned away from the sheet cassette in the first direction in a state where the solvent cartridge and the sheet cassette are attached to the main casing.

11. The image forming apparatus according to claim 10, wherein the solvent cartridge is juxtaposed with the sheet cassette in the first direction in a state where the solvent cartridge and the sheet cassette are attached to the main casing.

12. The image forming apparatus according to claim 1, wherein the solvent cartridge is positioned downward of the applicator in a state where the solvent cartridge is attached to the main casing.

13. The image forming apparatus according to claim 1, further comprising a pump for pumping the solvent from the solvent cartridge to the applicator.

14. The image forming apparatus according to claim 13, further comprising a first circuit board juxtaposed with the solvent cartridge in a second direction crossing the first direction in a state where the solvent cartridge is attached to the main casing, wherein the first circuit board is electrically connected to the pump.

15. The image forming apparatus according to claim 14, further comprising:

a second circuit board positioned away from the first circuit board in the first direction; and a charging unit charging a surface of the photosensitive drum, wherein the second circuit board applies a voltage to the charging unit.

16. The image forming apparatus according to claim 15, wherein the applicator is a spraying device of an electrostatic spraying type, and wherein the second circuit board supplies electric power to the applicator.

17. The image forming apparatus according to claim 15, wherein the developing cartridge is positioned between the solvent cartridge and the second circuit board.

18. The image forming apparatus according to claim 1, further comprising a discharge tray onto which the sheet that has moved past the applicator is discharged, wherein the discharge tray is positioned above the developing cartridge in a state where the developing cartridge is attached to the main casing.

19. The image forming apparatus according to claim 18, further comprising an operation panel positioned away from the discharge tray in the first direction, wherein the operation panel is positioned above the solvent cartridge in a state where the solvent cartridge is attached to the main casing.

20. An image forming apparatus comprising:

a main casing;

a photosensitive drum rotatable about a drum axis extending in a first direction;

a developing cartridge comprising a toner casing that can accommodate therein toner, the developing cartridge supplying the toner onto the photosensitive drum, the developing cartridge being detachably attachable to the main casing;

a transfer unit for transferring the toner that has been supplied onto the photosensitive drum to a sheet;

a solvent cartridge comprising a solvent casing that can accommodate therein solvent for dissolving the toner, the solvent cartridge being detachably attachable to the main casing independently of the developing cartridge, the solvent cartridge being positioned away from the developing cartridge in the first direction in a state where the developing cartridge and the solvent cartridge are attached to the main casing;

an applicator applying the solvent to the toner that has been transferred to the sheet, wherein the main casing includes:

a first opening through which the developing cartridge passes when the developing cartridge is attached to the main casing; and a second opening through which the solvent cartridge passes when the solvent cartridge is attached to the main casing;

wherein the image forming apparatus further comprises:

a first cover movable between:

a first closed position where the first cover closes the first opening; and a first open position where the first opening is opened;

a second cover provided independently of the first cover, the second cover being movable between:

a second closed position where the second cover closes the second opening; and a second open position where the second opening is opened, wherein the first opening and the second opening are positioned at one end portion of the main casing in a second direction crossing the first direction, and wherein the developing cartridge and the solvent cartridge are attachable to the main casing in the second direction.

21. An image forming apparatus comprising:

a main casing;

a photosensitive drum rotatable about a drum axis extending in a first direction;

a developing cartridge comprising a toner casing that can accommodate therein toner, the developing cartridge supplying the toner onto the photosensitive drum, the developing cartridge being detachably attachable to the main casing;

a transfer unit for transferring the toner that has been supplied onto the photosensitive drum to a sheet;

a solvent cartridge comprising a solvent casing that can accommodate therein solvent for dissolving the toner, the solvent cartridge being detachably attachable to the main casing independently of the developing cartridge, the solvent cartridge being positioned away from the developing cartridge in the first direction in a state where the developing cartridge and the solvent cartridge are attached to the main casing;

an applicator applying the solvent to the toner that has been transferred to the sheet;

a pump for pumping the solvent from the solvent cartridge to the applicator; and a first circuit board juxtaposed with the solvent cartridge in a second direction crossing the first direction in a state where the solvent cartridge is attached to the main casing, wherein the first circuit board is electrically connected to the pump.

* * * * *